(12) United States Patent
Twito

(10) Patent No.: US 11,950,551 B2
(45) Date of Patent: Apr. 9, 2024

(54) MODULAR MULTI-TIERED PLANTER KIT

(71) Applicant: Israel Twito, Petach Tikva (IL)

(72) Inventor: Israel Twito, Petach Tikva (IL)

( * ) Notice: Subject to any disclaimer, the term of this patent is extended or adjusted under 35 U.S.C. 154(b) by 660 days.

(21) Appl. No.: 16/987,359

(22) Filed: Aug. 6, 2020

(65) Prior Publication Data

US 2020/0359568 A1  Nov. 19, 2020

Related U.S. Application Data

(63) Continuation-in-part of application No. PCT/IL2019/050153, filed on Feb. 7, 2019.

(30) Foreign Application Priority Data

Feb. 8, 2018 (IL) .......................................... 257435

(51) Int. Cl.
*A01G 9/02* (2018.01)
*A01G 27/00* (2006.01)

(52) U.S. Cl.
CPC ........... *A01G 9/023* (2013.01); *A01G 27/005* (2013.01)

(58) Field of Classification Search
CPC ...... A01G 9/023; A01G 31/06; A01G 27/005; A01G 9/025; A01G 9/022; A01G 31/04; A01G 9/028; A01G 9/1423; A01G 9/0297; A01G 9/045; A47G 7/041; A47G 7/04; A47F 7/0078; B62B 2202/70
USPC .............................. 47/83, 82, 62 R, 59 R, 47
See application file for complete search history.

(56) References Cited

U.S. PATENT DOCUMENTS

| 3,550,319 | A | * | 12/1970 | Gaines, Jr. | ............. | A01G 31/02 47/79 |
| 3,772,827 | A | * | 11/1973 | Ware | ..................... | A01G 9/022 D6/558 |
| 3,992,809 | A | * | 11/1976 | Chew | ..................... | A01G 31/02 47/62 R |
| 4,514,930 | A | * | 5/1985 | Schorr | .................... | A01G 31/02 47/60 |
| 7,827,733 | B2 | * | 11/2010 | DiMaggio | .............. | A01G 9/023 47/39 |
| 2003/0005625 | A1 | | 1/2003 | Reichert | | |
| 2009/0183427 | A1 | | 7/2009 | Dimaggio | | |
| 2009/0211154 | A1 | | 8/2009 | Dimaggio | | |

(Continued)

FOREIGN PATENT DOCUMENTS

| CN | 206481676 U | 9/2017 |
| CN | 206641061 U | 11/2017 |

(Continued)

*Primary Examiner* — Jeffrey R Larsen
(74) *Attorney, Agent, or Firm* — Rodney J. Fuller; BOOTH UDALL FULLER, PLC

(57) ABSTRACT

A modular multi-tiered planter kit that comprises two support elements that are fitted for positioning on a surface, perpendicular to the surface and spaced from each other, a plurality of planter assemblies that are fitted for connection in a disassemblable mounting, with the two support elements in a multi-tier configuration, wherein they each extend in an essentially horizontal direction, in the gap between the two support elements, wherein the kit is characterized in that once mounted as stated, the planter assemblies each comprise a unified planter element that serves in each of the planter assemblies, and the planter assemblies comprise one or more from the group of various types of planter assemblies.

19 Claims, 77 Drawing Sheets

(56) References Cited

U.S. PATENT DOCUMENTS

| | | | |
|---|---|---|---|
| 2011/0258925 A1 | 10/2011 | Baker | |
| 2012/0073195 A1* | 3/2012 | Crosby | A01G 9/02 47/66.7 |
| 2013/0340338 A1* | 12/2013 | Lin | A01G 31/02 47/62 R |
| 2015/0068122 A1* | 3/2015 | Juncal | A01G 31/02 47/62 A |
| 2016/0081279 A1* | 3/2016 | Lai | A01G 27/005 47/79 |
| 2016/0360712 A1* | 12/2016 | Yorio | A01G 31/06 |
| 2018/0352762 A1* | 12/2018 | Jones | A01G 9/0297 |
| 2020/0396917 A1* | 12/2020 | Olesen | A01G 31/02 |

FOREIGN PATENT DOCUMENTS

| | | |
|---|---|---|
| CN | 108040671 A | 5/2018 |
| CN | 108307860 A | 7/2018 |
| EP | 2368464 A1 | 9/2011 |
| JP | 2012170505 A | 9/2012 |
| JP | 2014027909 A | 2/2014 |
| JP | 3202251 U | 1/2016 |
| WO | 2014134662 A1 | 9/2014 |
| WO | 2014140664 A1 | 9/2014 |
| WO | 2017203543 A1 | 11/2017 |

\* cited by examiner

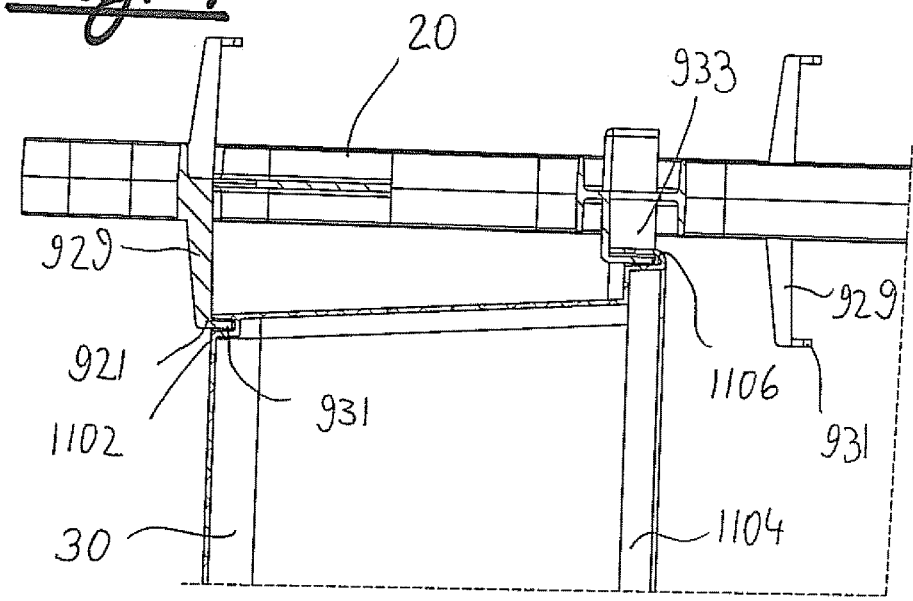
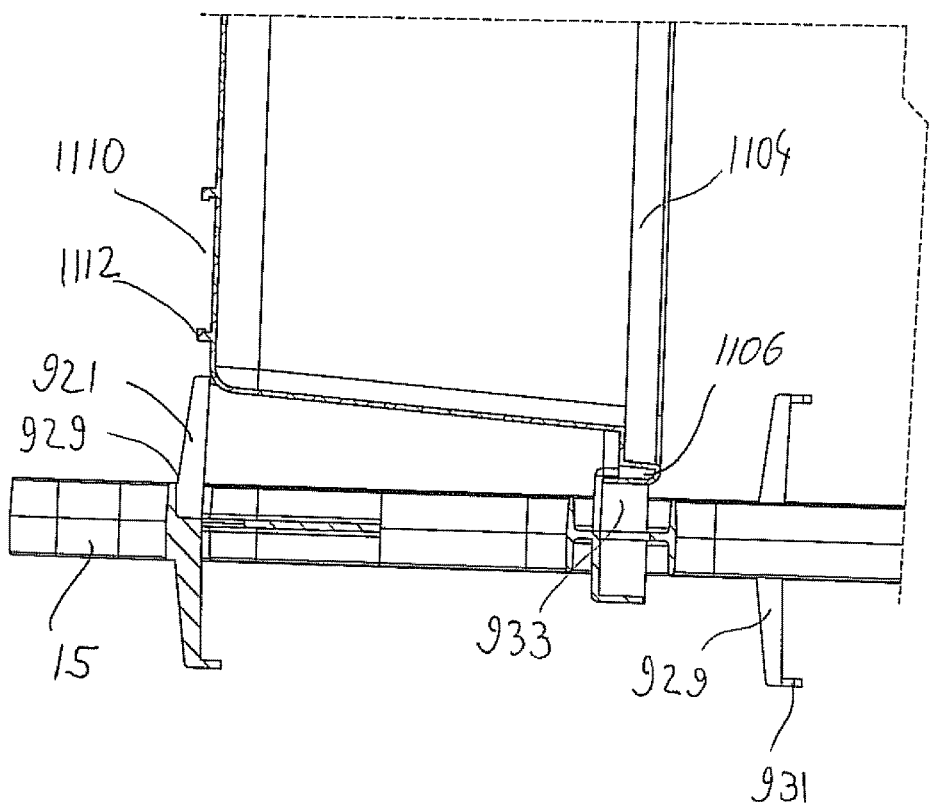
Fig. 14

Fig. 19a
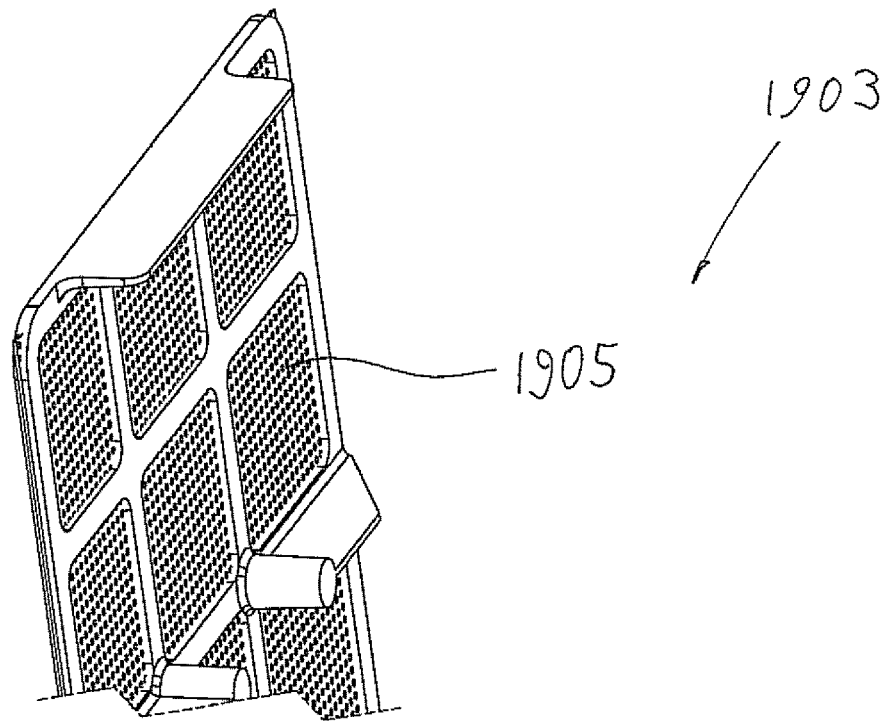
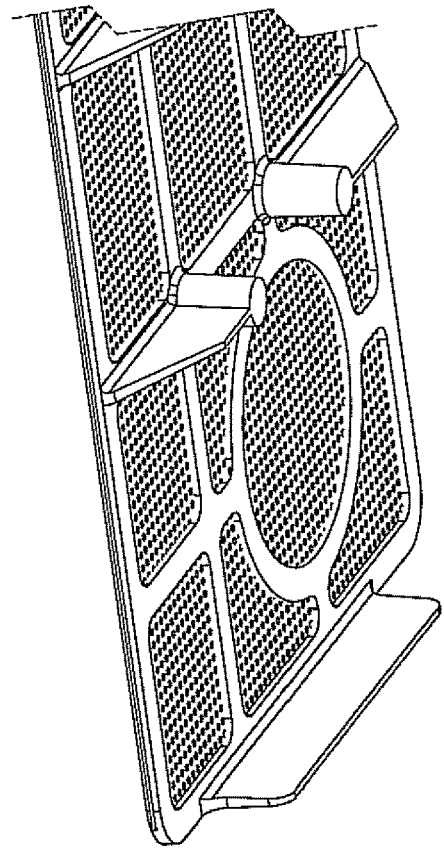

SECTION

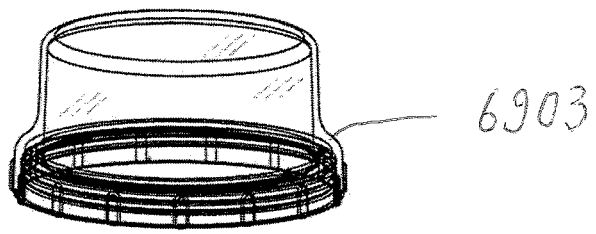
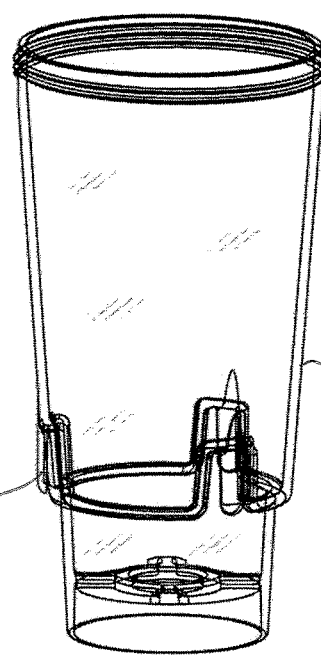
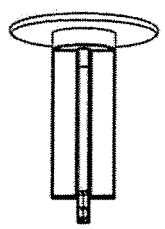
Fig. 69c

US 11,950,551 B2

MODULAR MULTI-TIERED PLANTER KIT

CROSS-REFERENCE TO RELATED APPLICATIONS

This application is a continuation-in-part of International Application No. PCT/IL2019/050153, filed Feb. 7, 2019, which claims the benefit of and priority to Israel Patent Application No. 257435, filed Feb. 8, 2018, the contents of each of which are hereby incorporated by reference in their entireties.

FIELD OF THE INVENTION

The invention that is the subject of the patent application is in the field of means used for gardening and growing plants—pots, planters and greenhouses, especially in the field of these means intended for the household market—gardening enthusiasts as opposed to horticulturalists.

BACKGROUND OF THE INVENTION

The growing urbanization of large populations of people living cities in high rises juxtaposed with the desire to "return to nature" and eat organic food has boosted the trend of growing ornamental plants, herbs and vegetables in flowerpots, planters and household greenhouses by people who are not professional gardeners or horticulturalists, but enthusiasts wishing to take advantage of the limited space on the balconies of their small apartments for growing and cultivating plants by themselves as a hobby or way for families to spend time together. At the same time, this population, which has already become accustomed and skilled in assembling furniture and household items (e.g. IKEA products), is not deterred by "do it yourself" (DIY) challenges to which it is exposed on specialized marketing networks, and are even eager to do this in their spare time.

Therefore, prior to the present invention, there was a demand for self-assembly kits that will enable this population to fulfill its aspirations of growing ornamental plants, herbs and vegetables at home. At the same time and from the point of view of planners, manufacturers and distributors of potted plants, planters and home greenhouses, properly addressing this need calls for a design that is scalable, with a minimum of components, relatively inexpensive, and utilizes existing and proven technologies (e.g. mass production by injection molding of plastic components). The design should also enable packaging, shipping, storage and marketing of a compact kit (when disassembled) and its simple and quick assembly on-site by the end customer on the balcony of his apartment in a residential high-rise or in the yard of a single-story home (without requiring technicians or other professionals).

SUMMARY OF THE INVENTION

The invention, which is the subject of the patent application, addresses the challenges described above.

In one aspect, the invention is embodied in a modular multi-tiered planter kit. A kit whose basic elements comprise two support elements that are suitable for placing on a surface (e.g. on a balcony floor of an apartment or in the yard of a home), perpendicular to the surface and spaced from each other, as well as a number of planter assemblies that are fitted for connection in a disassemblable mounting, with the two support elements in a multi-tier configuration, each extending in an essentially horizontal direction in the gap between the two support elements.

The kit according to the invention is characterized in that once mounted as said; it offers the customer a variety of design and usage options. The modular multi-tiered kit according to the invention can be marketed and mounted in a wide array of different types of planter assemblies that can be mounted in conjunction or separately, which include different plant growth substrates (e.g. soil, mixture, substrate bags, water (for hydroponic cultivation)).

In a modular multi-tiered planter kit according to the invention, the various types of planter assemblies all comprise a unified planter element that is used in each of the planter assemblies, but as stated, this element may make up a "building block" and be used in a wide array of diverse planter assemblies. The group comprises:

A first-type planter assembly, each of which comprises, in addition to the unified planter element, also elements that are mounted on it and are disassemblable—a multiple-opening base spacer element and a drainage bowl element (for efficient drainage of excess irrigation water);

A second-type planter assembly, each planter comprising, in addition to the unified planter element, also an element that is mounted on it and is disassemblable—a cover element that is formed with at least one bracket that enables fitting it with a bottle of water inside, and with at least one bracket to enable fitting a pot plant inside (in a manner that enable semi-automatic irrigation of the planter and hydroponic growth);

A third-type planter assembly, each planter comprising, in addition to the unified planter element, an element that is mounted on it and is disassemblable—an elevated cover element that is formed with at least one bracket to enable fitting a bottle of water inside, and with at least one bracket for fitting a pot plant inside, whereby once water is filled in the unified planter element, the upper level of the water will be close to the bottom of the pot plant (to enable semi-automatic irrigation of the planter and hydroponic growth). Moreover, in addition to hydroponic cultivation of pot plants, the planter assembly can also be used for raising aquarium fish (once the planter is made of a transparent material and made usable as an aquarium);

A fourth-type planter assembly, each planter comprising, in addition to the unified planter element, elements that are mounted on it in a disassemblable fashion—a cover element that is formed with at least one bracket to enable fitting a water bottle inside, and with at least one bracket for fitting a pot plant inside; an internal water container element that is suitable for fitting inside the unified planter element while leaving a gap between them; whereby once the upper water level in the container will be close to the bottom of the potted plant, and in a way that by means of a pump assembly, which is also mountable inside the unified planter element next to the internal water container, circulating of the flow of water from the bottle that collected in the gap, to the internal water container will be enabled (which also enables semi-automatic irrigation of the pot plants and can also serve for raising aquarium fish, for example, once the planter and the internal container are both made of transparent material and made usable as an aquarium);

A fifth-type planter assembly, each of which comprises, in addition to the unified planter element, an assembly that is mounted on it and is disassemblable—an add-on planter assembly that is mounted and extends next to and parallel to the unified planter element (in a way that enables, for example, preliminary sprouting next to and parallel to the plant to be grown or that is already growing in the unified planter element).

Moreover, a modular multi-tiered planter kit according to the invention can also comprise multiple side planters that are fitted for mounting on the support elements, also in a multi-tier configuration, while they are positioned on the outer side of the support elements. In another and additional aspect, the side planter assemblies may be of a type that also allows for retrieving from time to time an inner basket from them, in a way that allows for manual access to the roots growing inside.

In another and additional aspect, a modular multi-tiered planter kit may also comprise a coverage means for removable cover of the mounted kit, and an array of spacer means which are mountable in a disassemblable fashion on the planter assemblies, so that from the time the coverage means is spread and the kit is covered by it, the coverage means is positioned for contact with the array of the spacer means, and is therefore spaced from the mounted kit (which may impart to the kit according to the invention a quasi-greenhouse capacity and protect the plants growing inside it from the ravages of the weather).

In another and additional aspect, a modular multi-tiered planter kit according to the invention may also comprise means for physically drawing the boundaries between various plants sprouting from the planter assemblies in the kit.

In another and additional aspect, a modular multi-tiered planter kit according to the invention may also comprise a system for irrigating the planter assemblies mounted therein (of the various types). An irrigation system that as usual comprises a water storage container, a pumping device for pumping water from the container, and an array of pipes for routing the pumped water to the plant growth substrates in the planter assemblies. However, the irrigation system according to the invention is characterized in that the water container is formed in a way that is mountable in the modular multi-tiered planter kit in a similar fashion as the way in which the planter assembly is mounted in the kit, and a unified planter element may be used as said container.

In another and additional aspect, the invention is embodied in a water bottle that is mountable for example and as aforesaid in a modular multi-tiered planter kit according to the invention, in the second-type, third-type and fourth-type planter assemblies, and comprises a mechanism that enables turning the bottle completely upside down, as needed to mount it, without water leaking from it, and it opens by itself to the passage of water from it, once it is mounted.

In another aspect, the unified planter element that serves all the different planter assemblies indicated above, from the first type to the fifth type (inclusive), is designed differently than the unified design, which, as stated, serves as a "building block" in all the aforesaid planter assemblies. A different design that does not detract from the planter's ability to similarly connect in a disassemblable mounting with the two support elements in a modular multi-tiered mounting according to the invention, parallel to a unified planter element (one or more), parallel to said planter assemblies of the first to fifth (inclusive) or separately and independently.

The different planter may be used in another and additional assembly of planters—a sixth-type planter assembly. A sixth-type planter assembly, wherein each planter comprising a planter element, wherein both ends are formed similar to the unified planter element (in a manner, as stated, that enables its disassemblable connection to the two support elements), but has a depression along its length, and on which a cover element is mounted in a disassemblable manner, and is formed with at least one bracket that from the time the cover element is mounted on the planter, is positioned at one end of the planter element and allows for mounting a water bottle inside it, and with at least one bracket that allows for mounting a pot plant inside it; an internal water container that is suitable for mounting inside the planter element; and an electrically-powered pump that is suitable for mounting at the said one end of the planter element and is connected for pumping of water flowing from said bottle, and streams them through a pipe system that extends from said one end of the planter element, along the planter element, to the other end of said planter element, and into said internal water container element.

Other aspects, other configurations and advantages of the modular multi-tiered planter kit will be described below. It should be borne in mind that the configurations described below may be combined with other configurations in different ways, which are at least consistent with one of the principles of the invention described below, and the terminology used here should not be construed as limiting in any way.

BRIEF DESCRIPTION OF THE ATTACHED FIGURES

Different aspects of at least one embodiment of the invention that is the subject of the patent application will be described below, with reference to the accompanying figures (while no scale should be attributed to them). The figures are presented for illustrative purposes only and for facilitating an understanding of the different aspects of the invention and the possible configurations for its actual aspect. The figures are part of the description, but should not be construed as limiting the invention in any way. In the figures, an identical or similar element that is visually depicted in several figures could be tagged by uniform numbering. For clarity, not every element was tagged in each of the figures. In the following figures:

Figure 3:
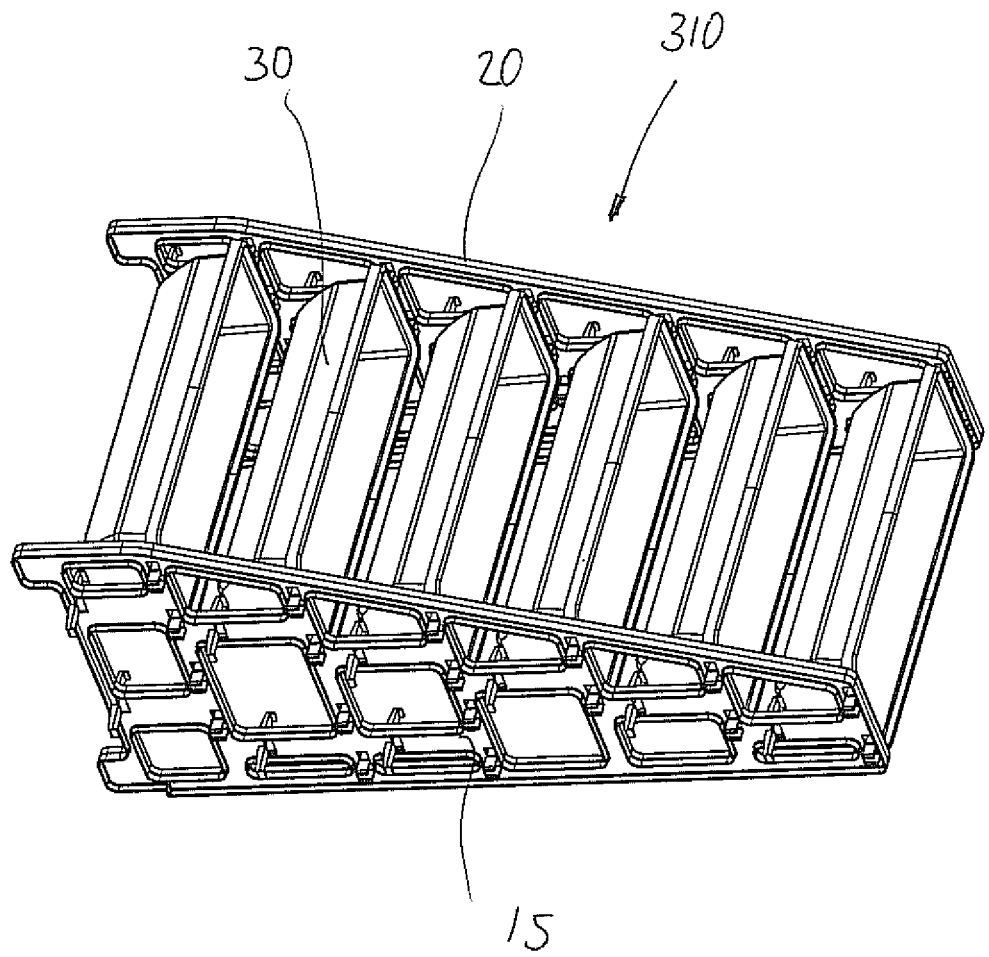
FIG. 3 is a perspective view of an example of a modular multi-tiered planter kit according to the invention, wherein it is mounted (assembled) from two support elements and multiple unified planter elements.
Figure 8:
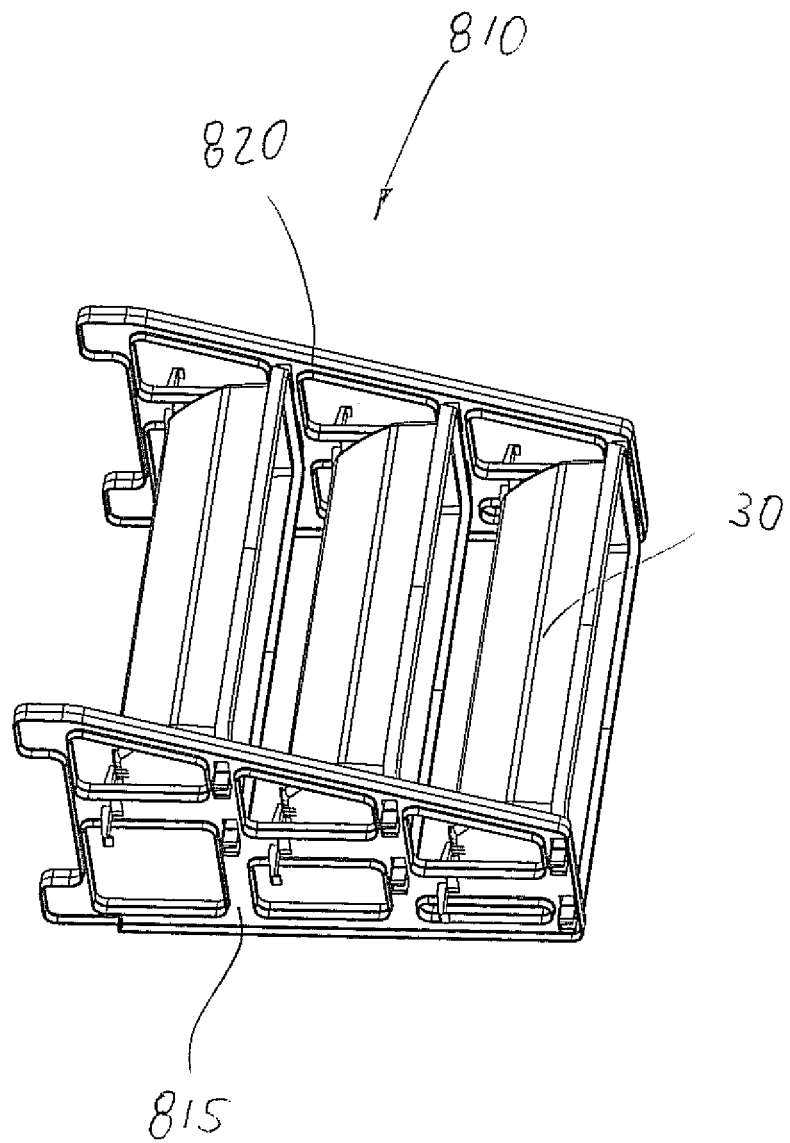

FIG. 8 is a perspective view of another example of a modular multi-tiered planter kit according to the invention, which similarly to the example kit illustrated in FIG. 3, is also illustrated wherein it is assembled from two support elements and a number of unified planter elements. However, it is of a different height, therefore making it possible to assemble a varying number of tiers of planter assemblies.

Figure 9:
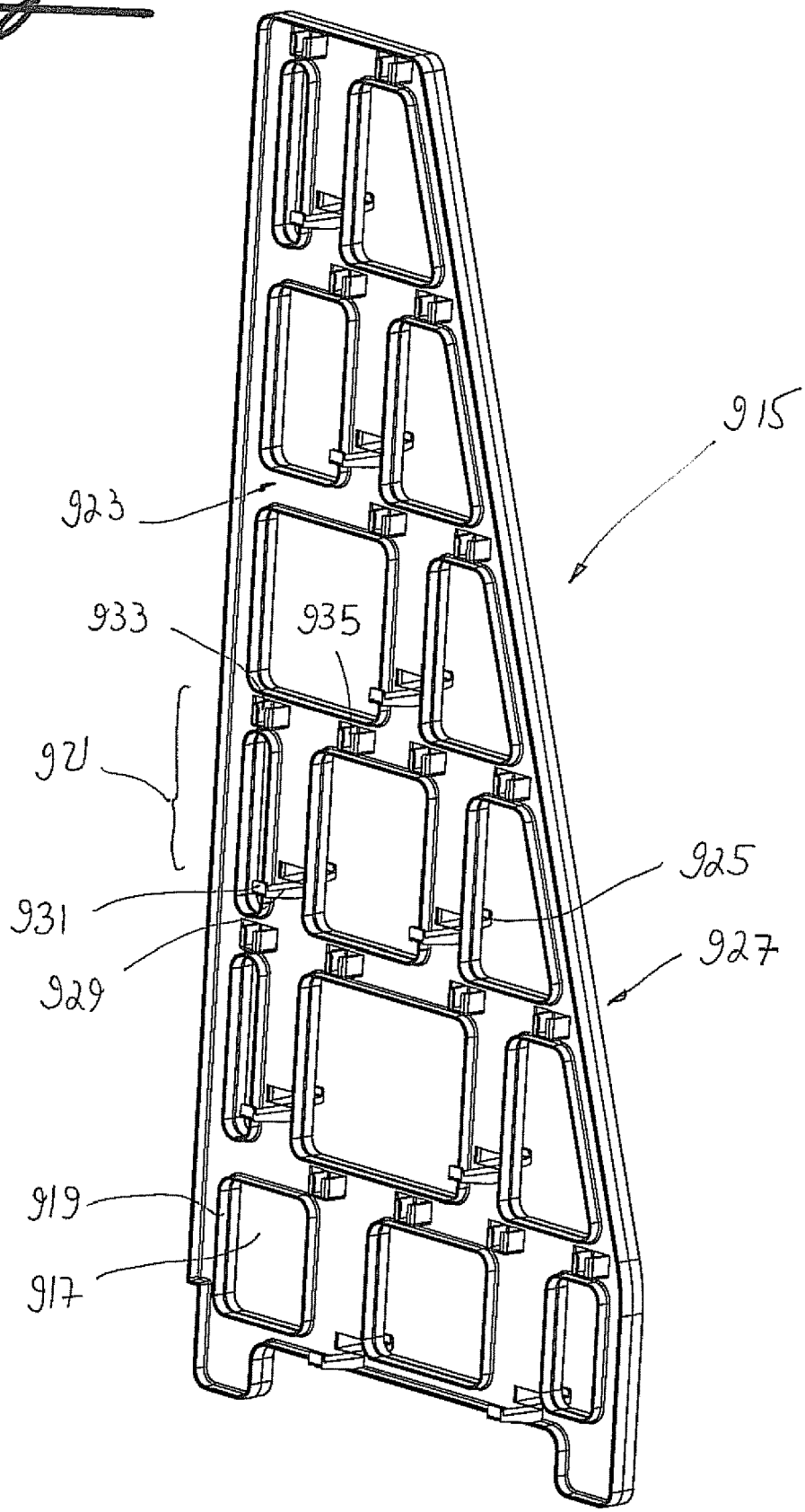

FIG. 9 is a perspective view of an example of a support element used in a modular multi-tiered planter kit according to the invention.

Figure 10:
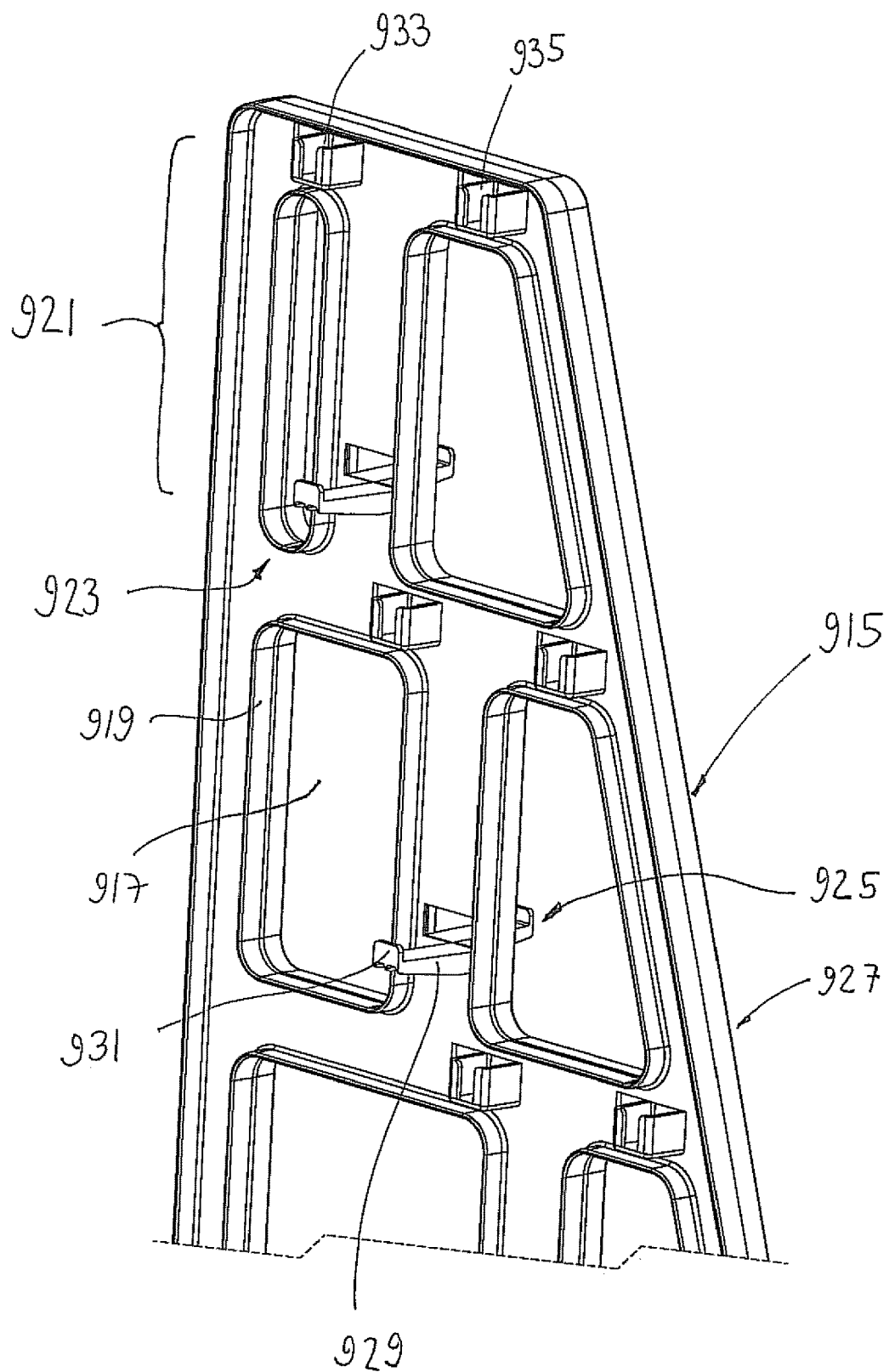

FIG. 10 is a zoom-in perspective view of the support element illustrated in FIG. 9.

Figure 11:
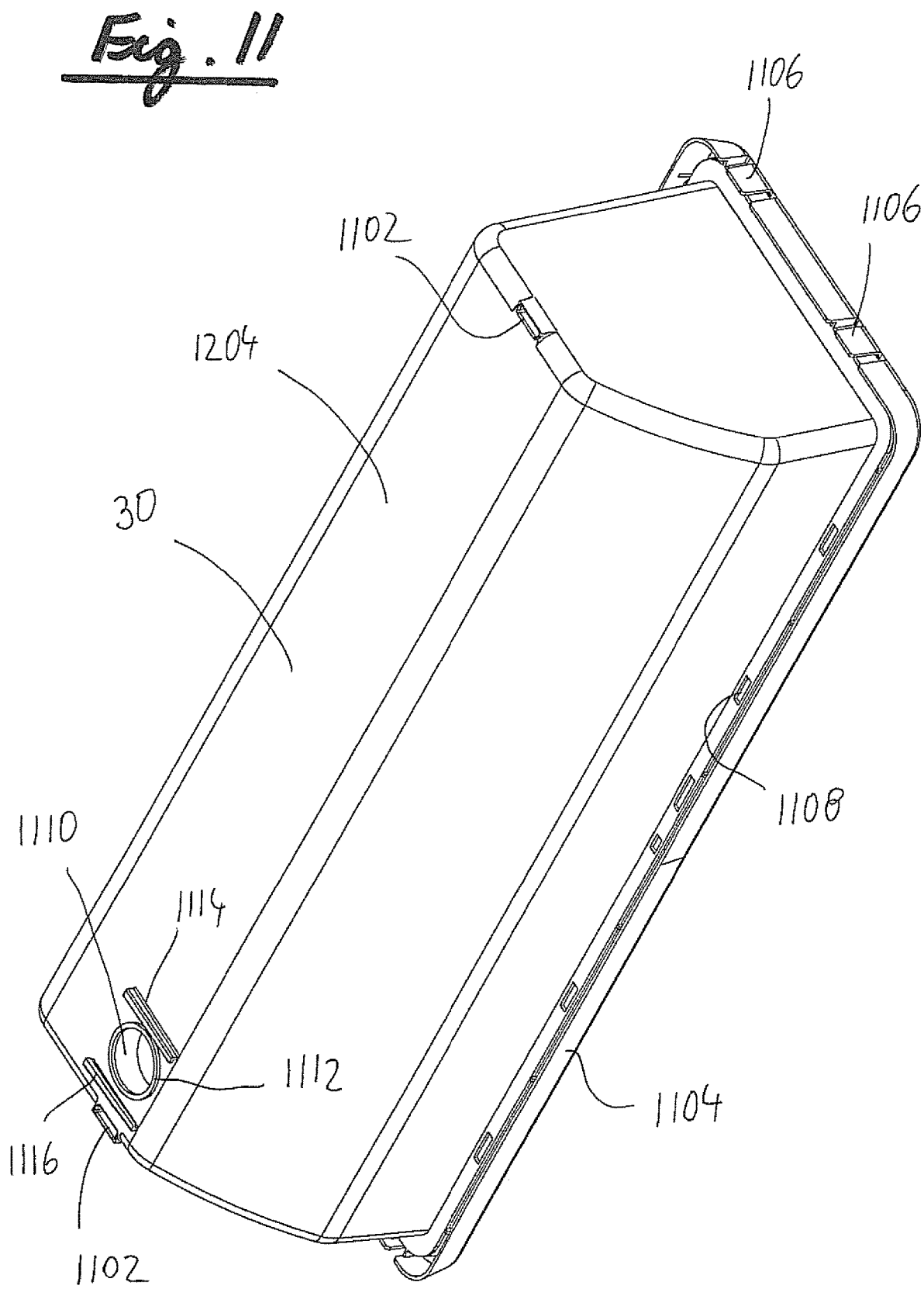

FIG. 11 is a perspective view of an example of a unified planter element that could be used in a modular multi-tiered planter kit according to the invention, either in a stand-alone mounting or as part of the various types of planter assemblies.

Figure 12:
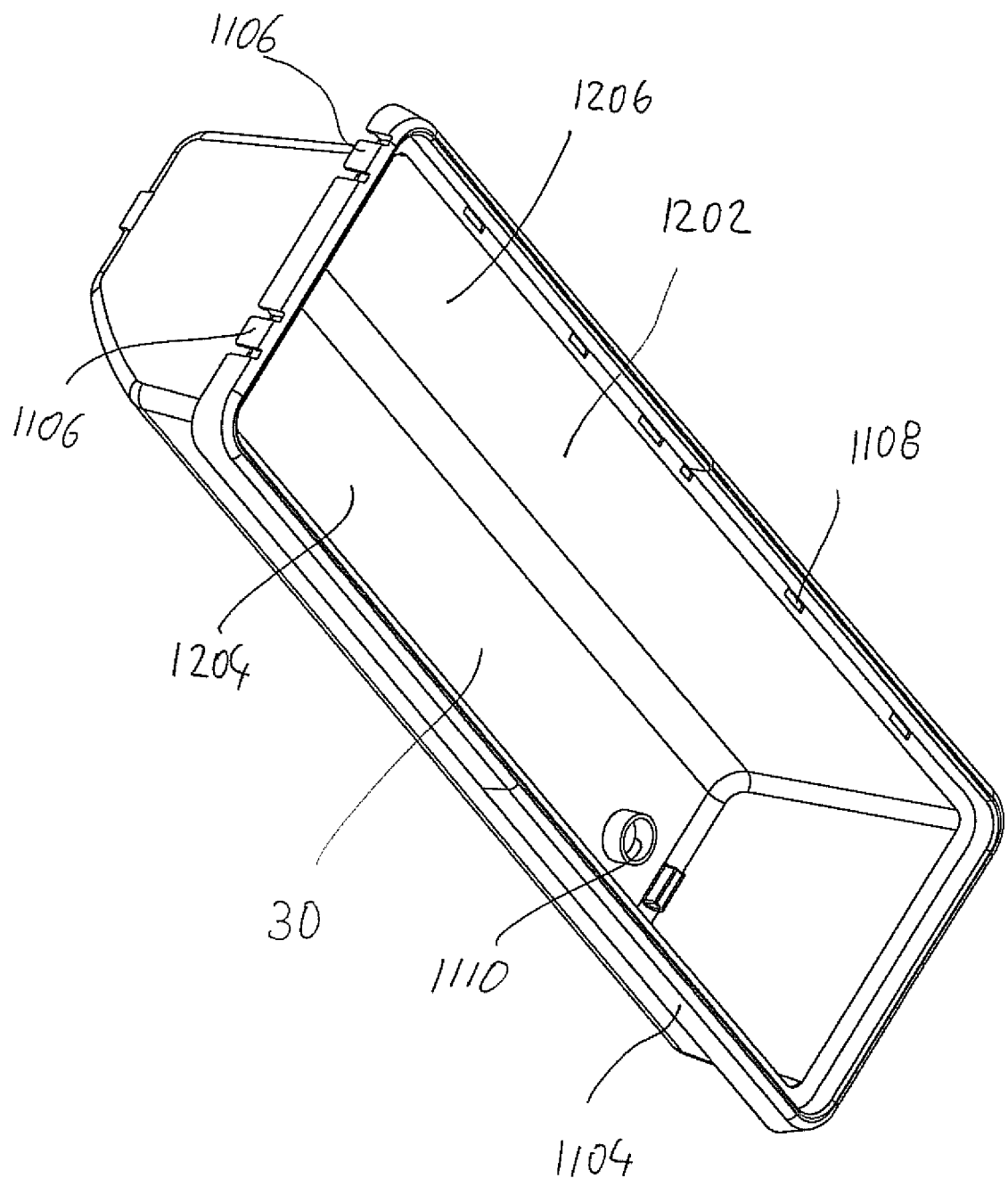

FIG. 12 is a perspective view from another angle of the unified planter element illustrated in FIG. 11.

Figure 13:
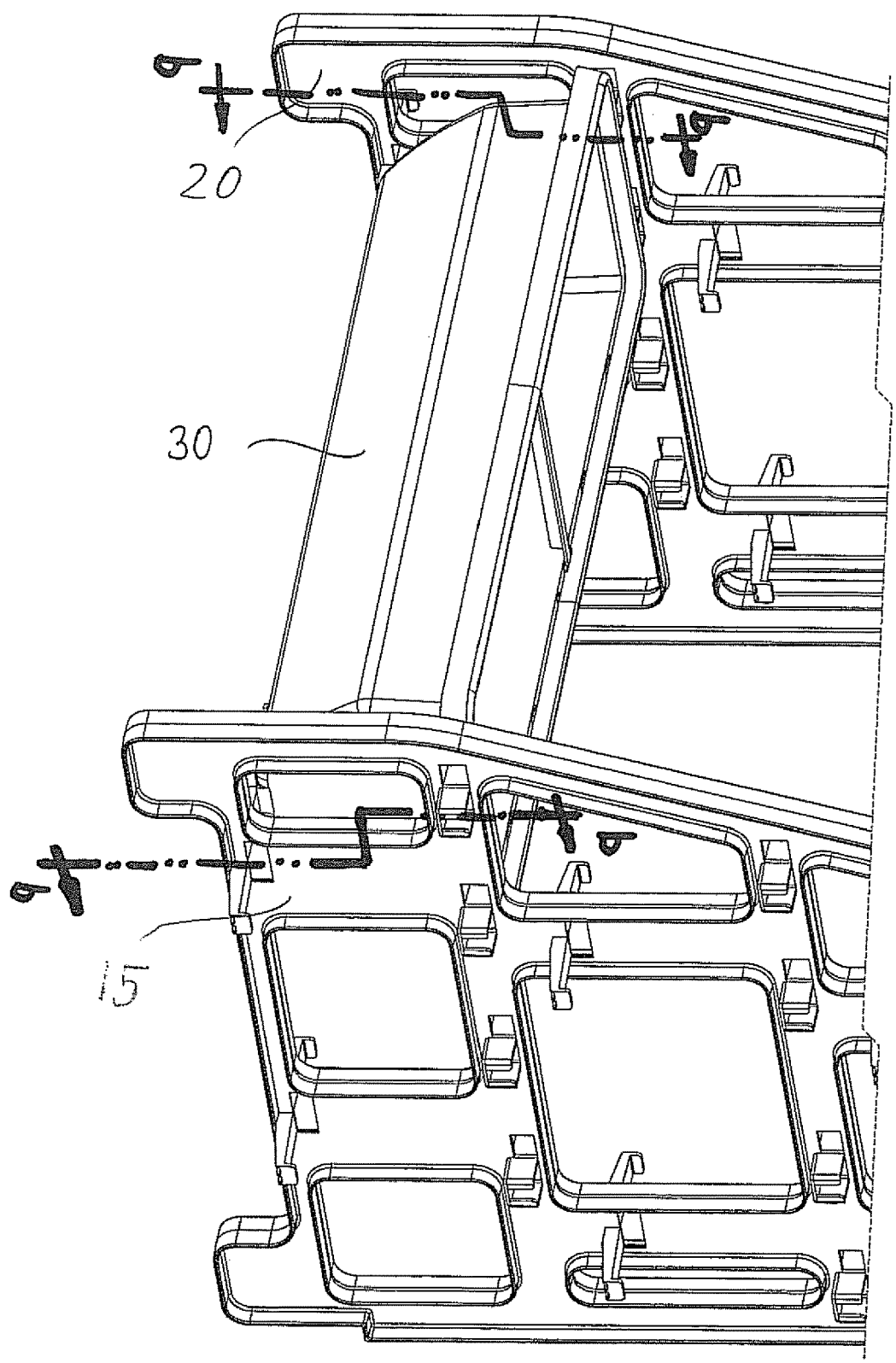

FIG. 13 is a perspective view of a connection of the example unified planter element illustrated in FIG. 11, which could be used in a modular multi-tiered planter kit according to the invention, either in a stand-alone mounting or as part of the various types of planter assemblies, in a disassemblable mounting with two support elements in a modular multi-tiered planter kit according to the invention.

FIG. 14 is a view of b-b cross-section marked in FIG. 13.

Figure 15:
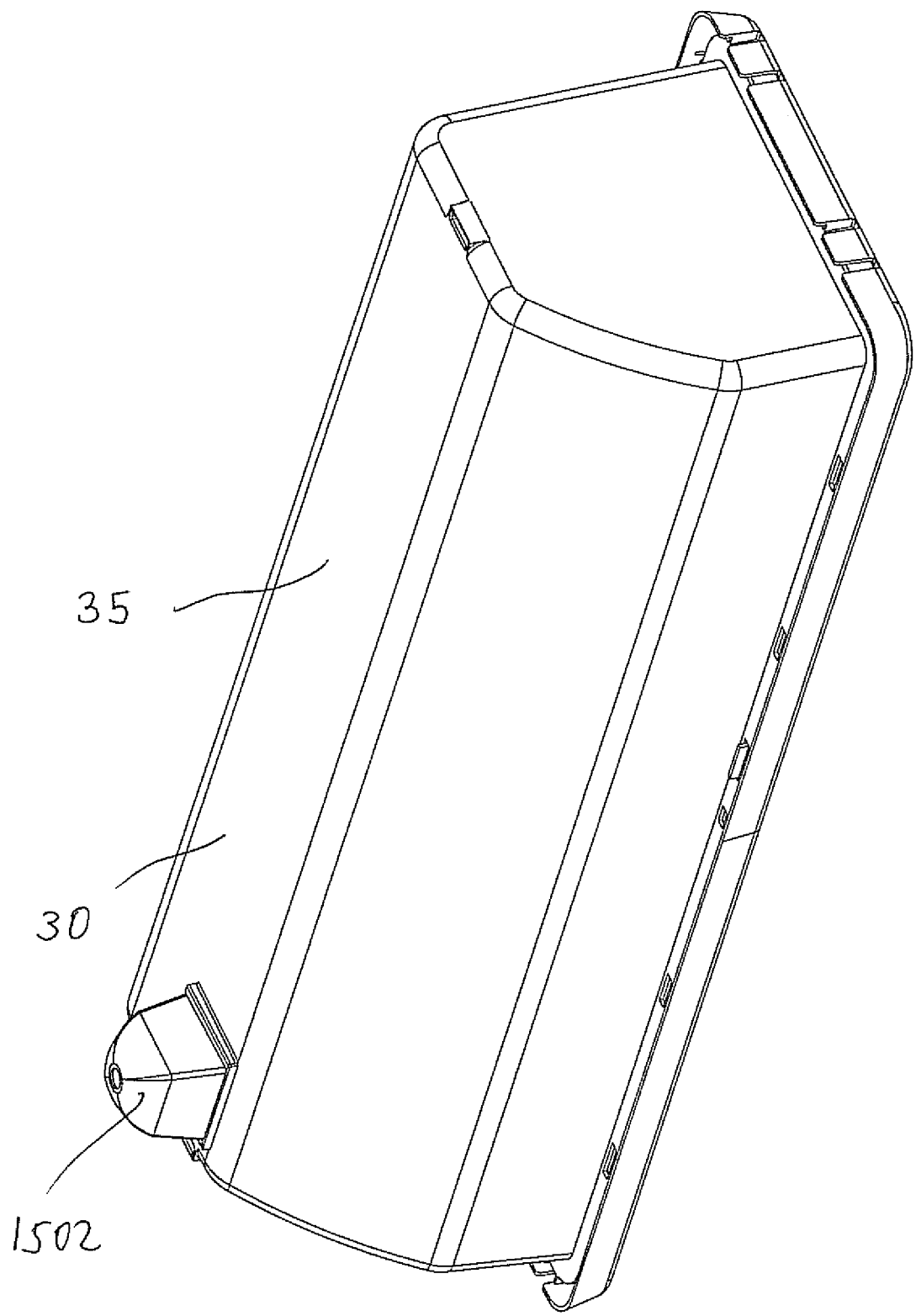

FIG. 15 is a perspective view of one example of a first-type planter assembly, which is fitted for connection in a disassemblable mounting fashion, in modular multi-tiered planter kit according to the invention.

Figure 16:
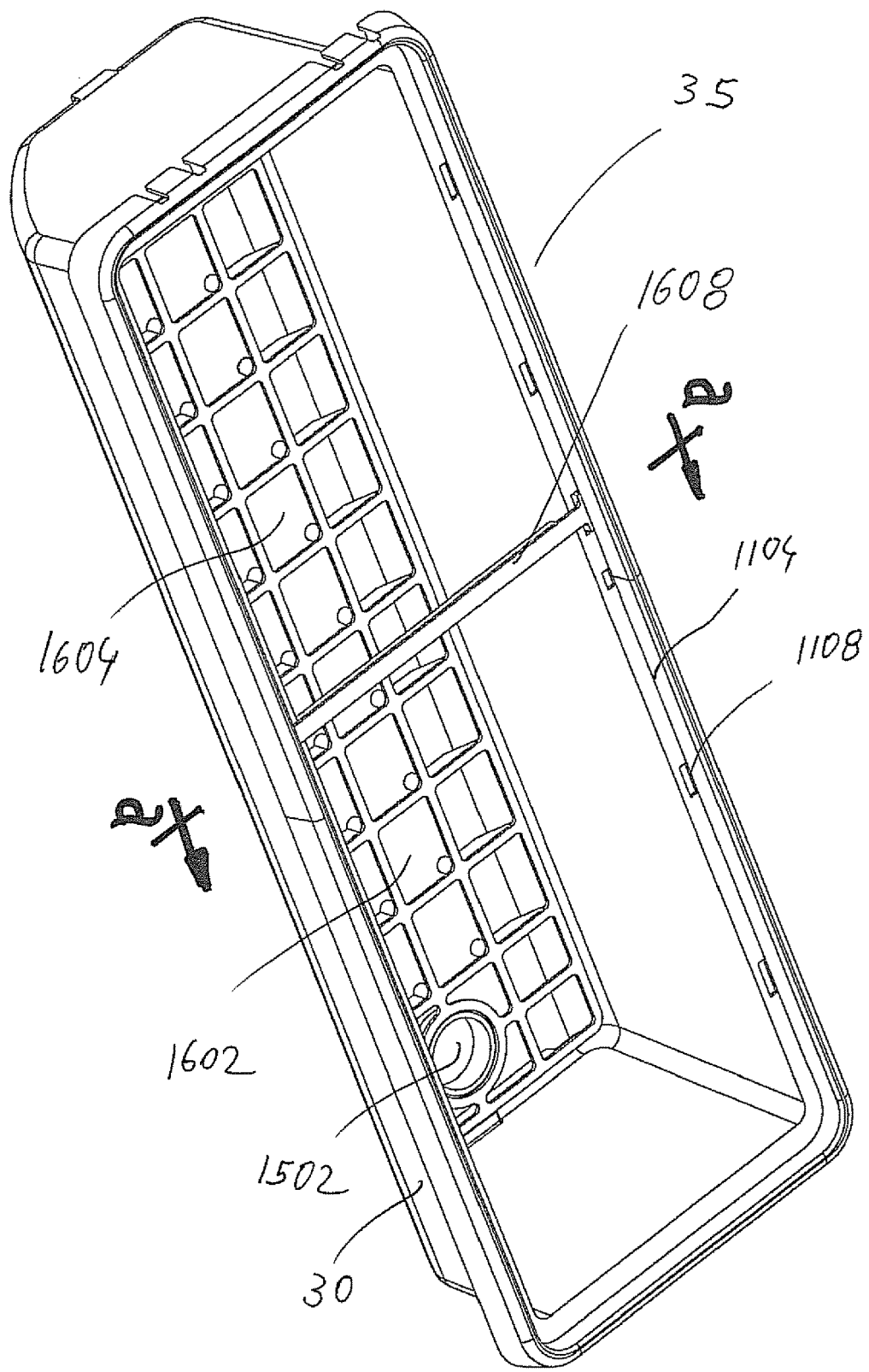

FIG. 16 is a perspective view from another angle of the example planter assembly illustrated in FIG. 11.

Figure 17:
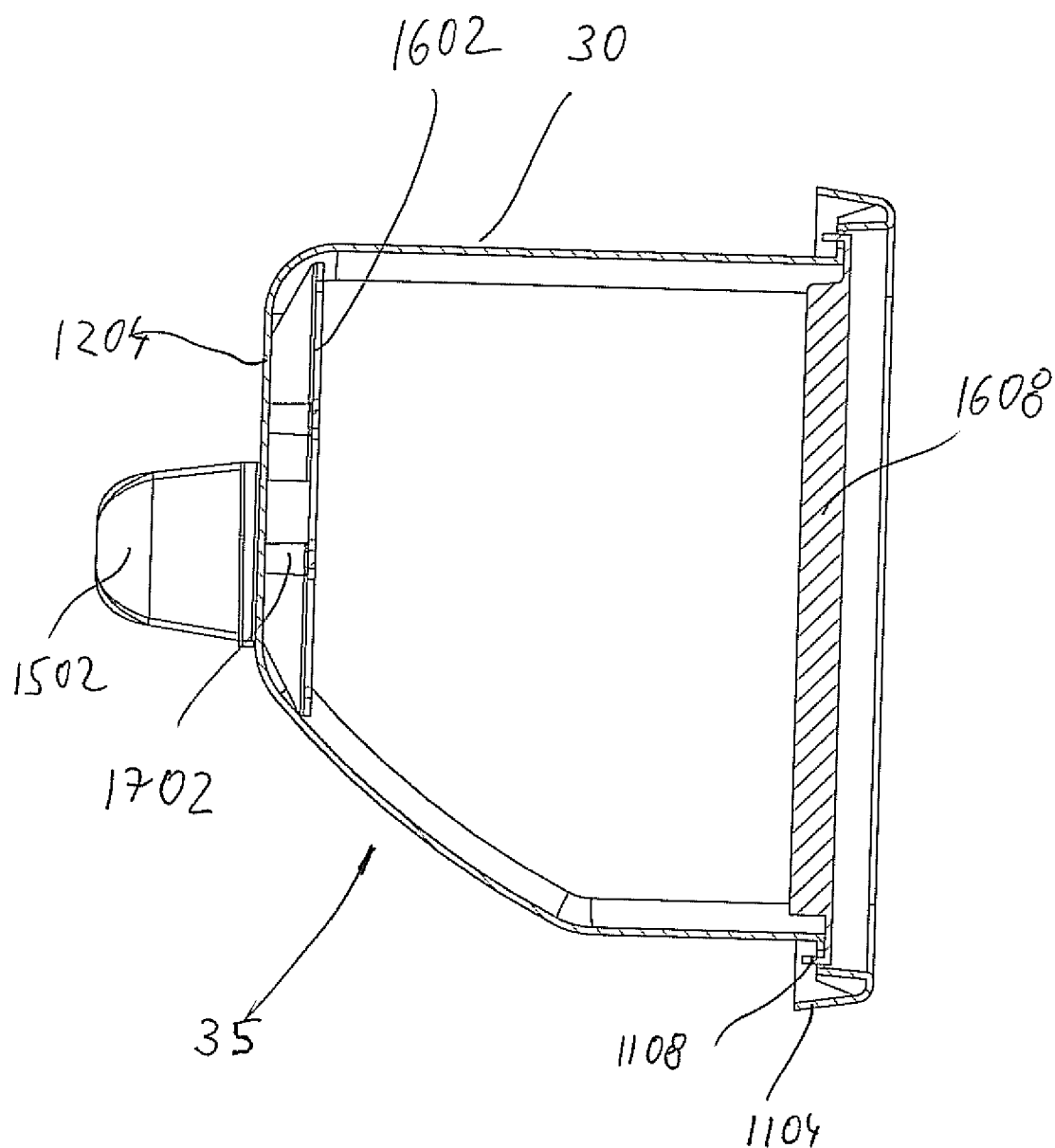

FIG. 17 is a view of a-a cross-section marked in FIG. 16.

Figure 18:
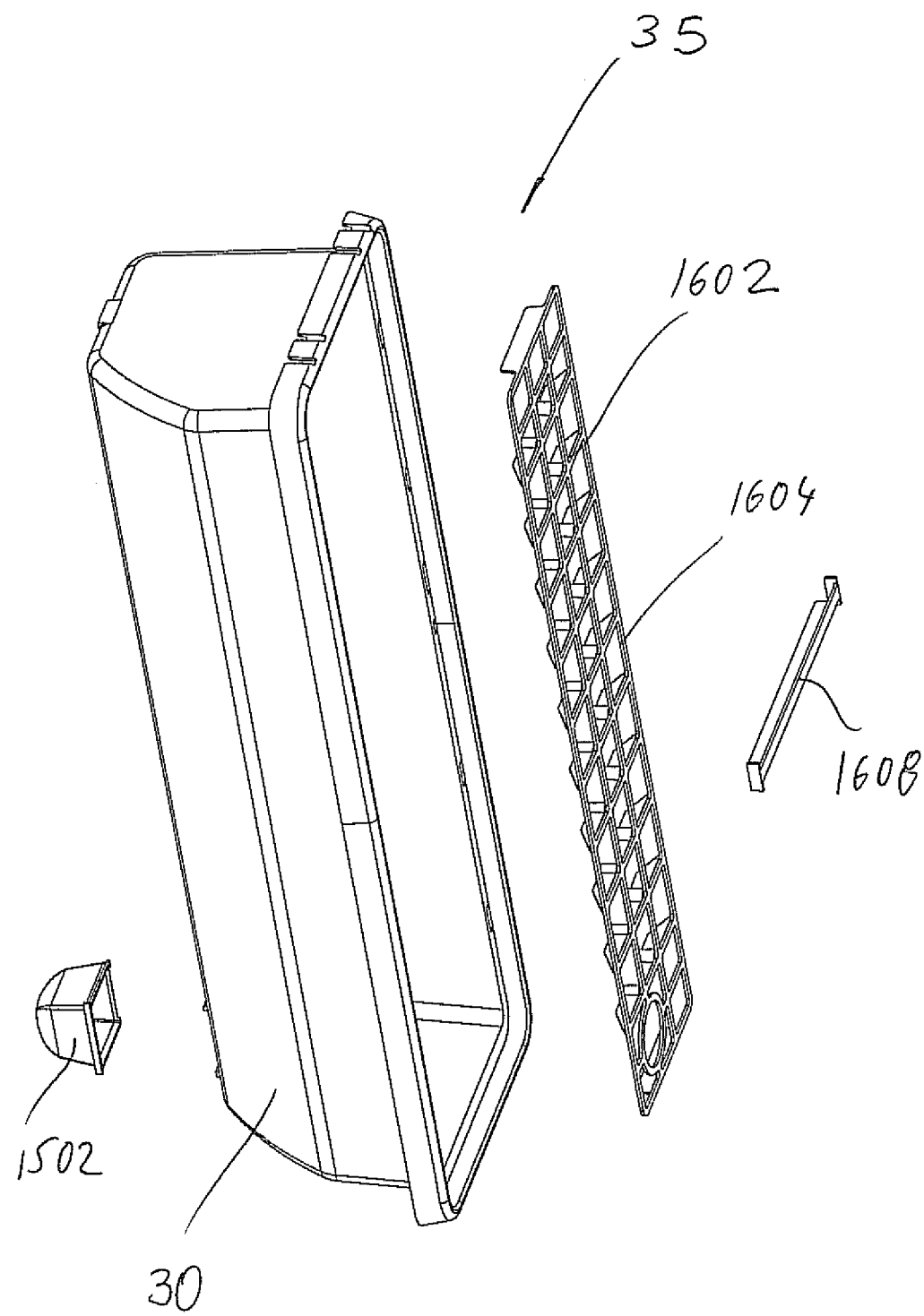

FIG. 18 is an "exploded" perspective view of elements of the example planter assembly illustrated in FIG. 11.

Figure 19:
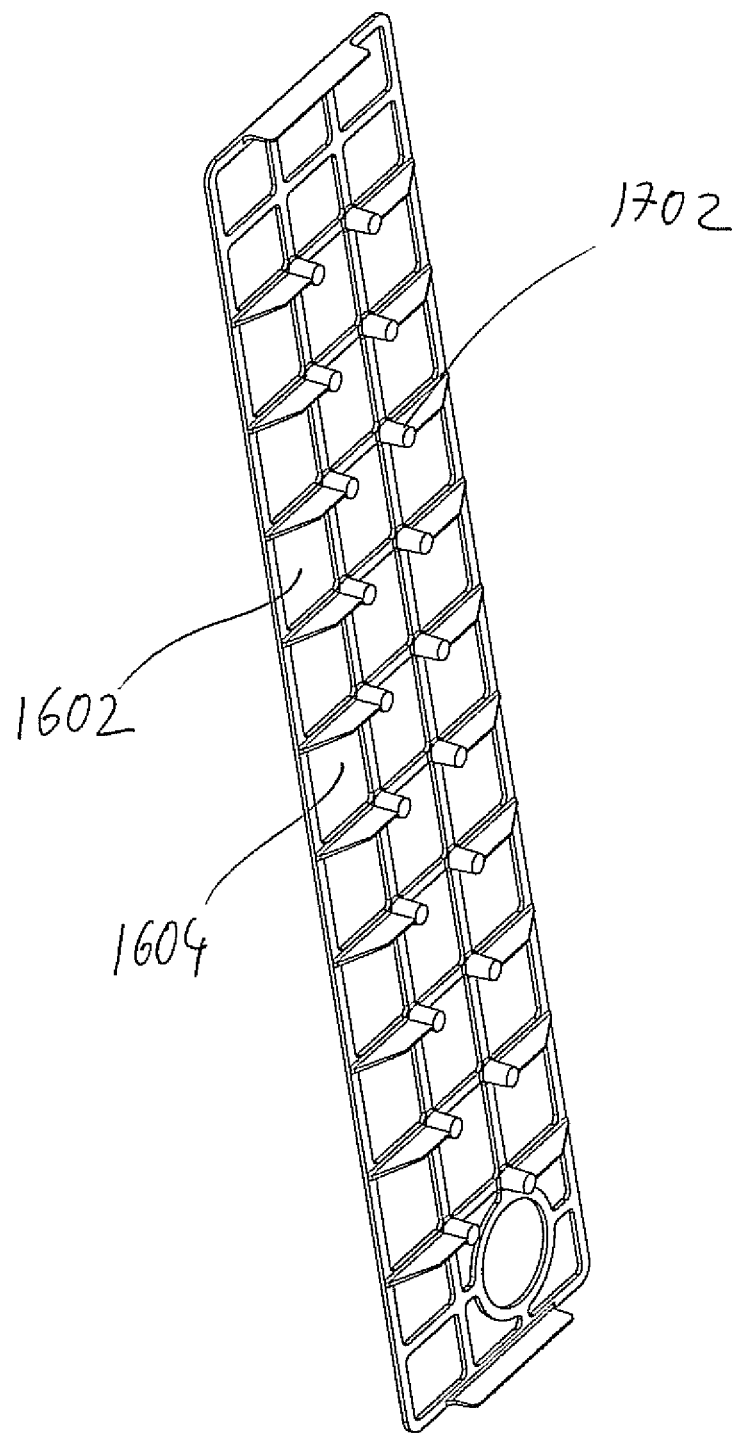

FIG. 19 is a perspective view of a multiple-opening base spacer element that is mounted in the example planter assembly illustrated in FIG. 11 (or in a unified planter element in general).

FIG. 19a is perspective view of another configuration of a multiple-opening base spacer element that could be mounted in the example planter assembly illustrated in FIG. 11 (or in a unified planter element in general).

Figure 20:
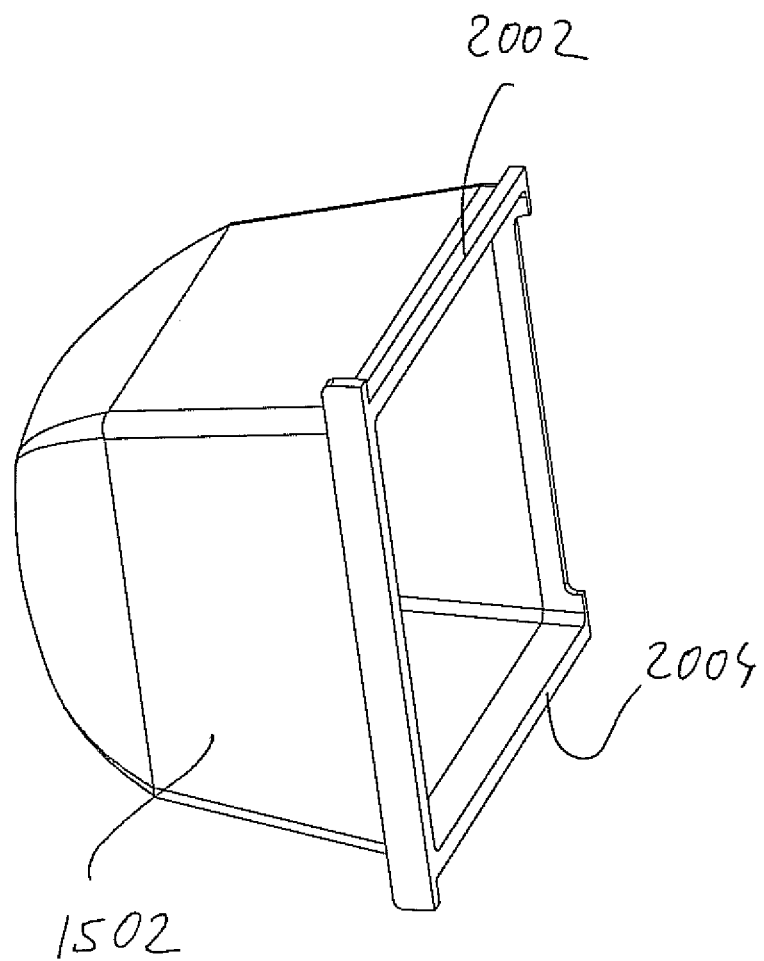

FIG. 20 is a perspective view of a drainage bowl element that is mounted in the example planter assembly illustrated in FIG. 11.

Figure 21:
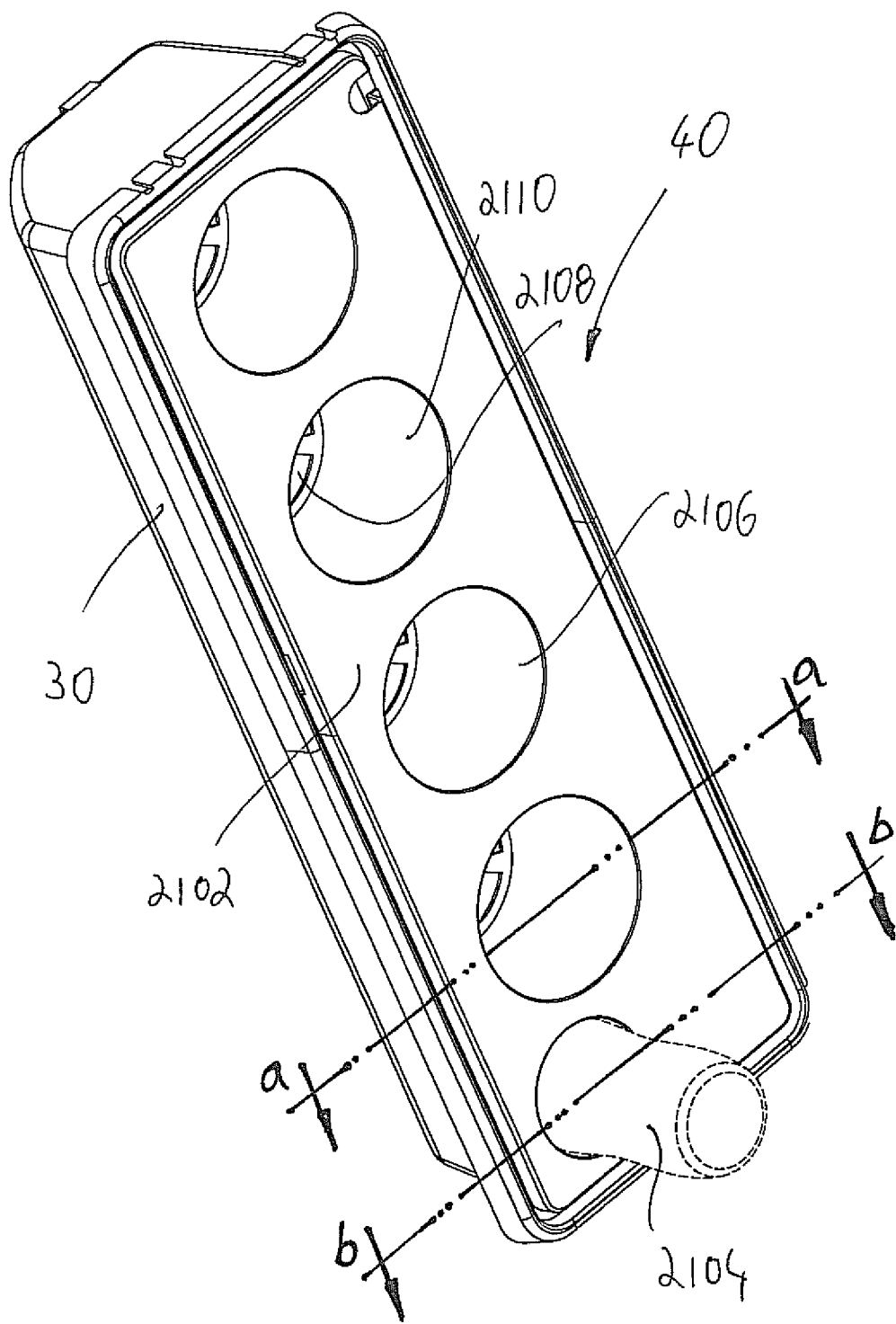

FIG. 21 is a perspective view of one example of a second-type planter assembly, which is fitted for connection in a disassemblable fashion, in a modular multi-tiered planter kit according to the invention.

Figure 22:
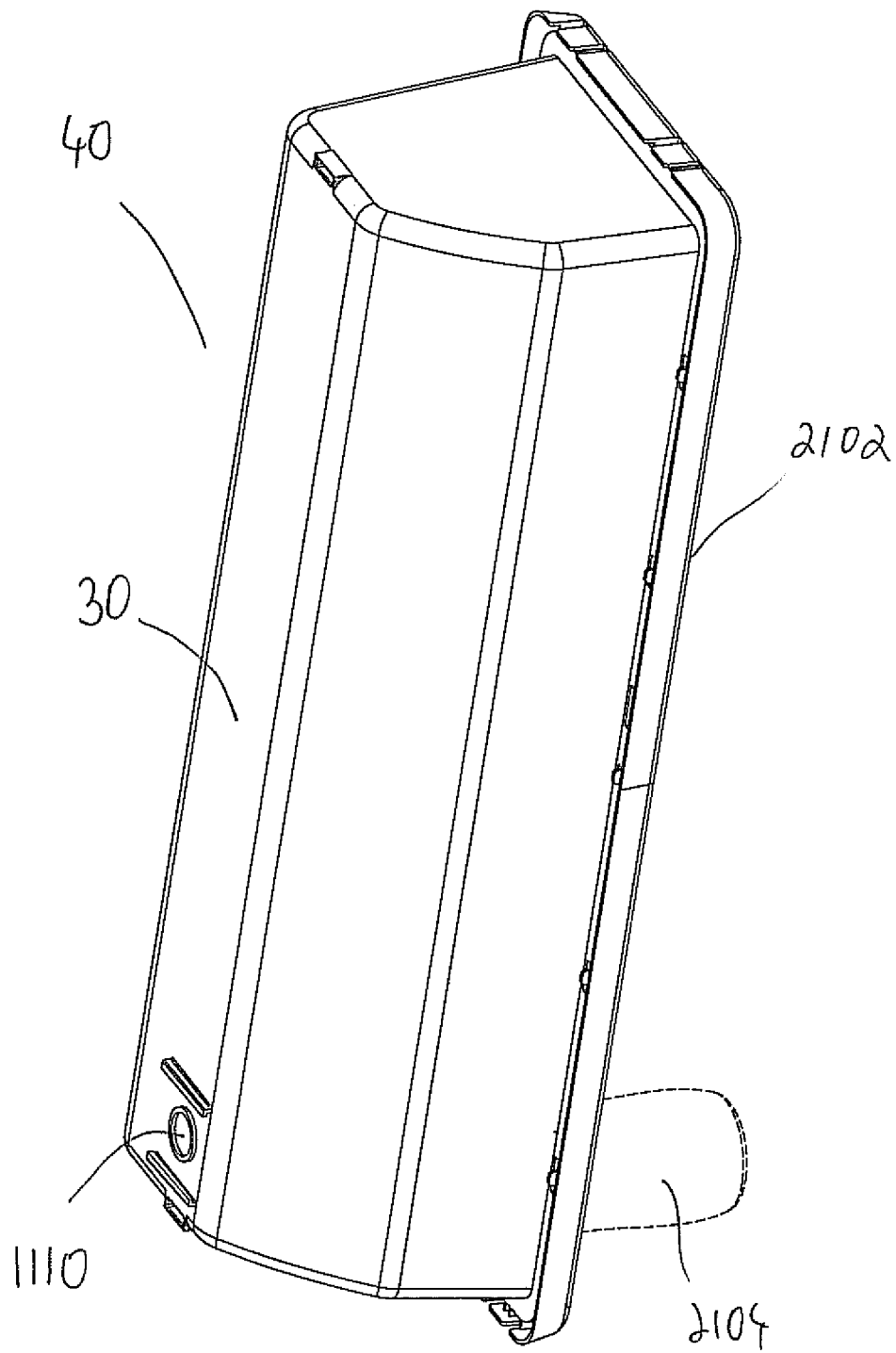

FIG. 22 is a perspective view from another angle of the example planter assembly illustrated in FIG. 21.

Figure 23:
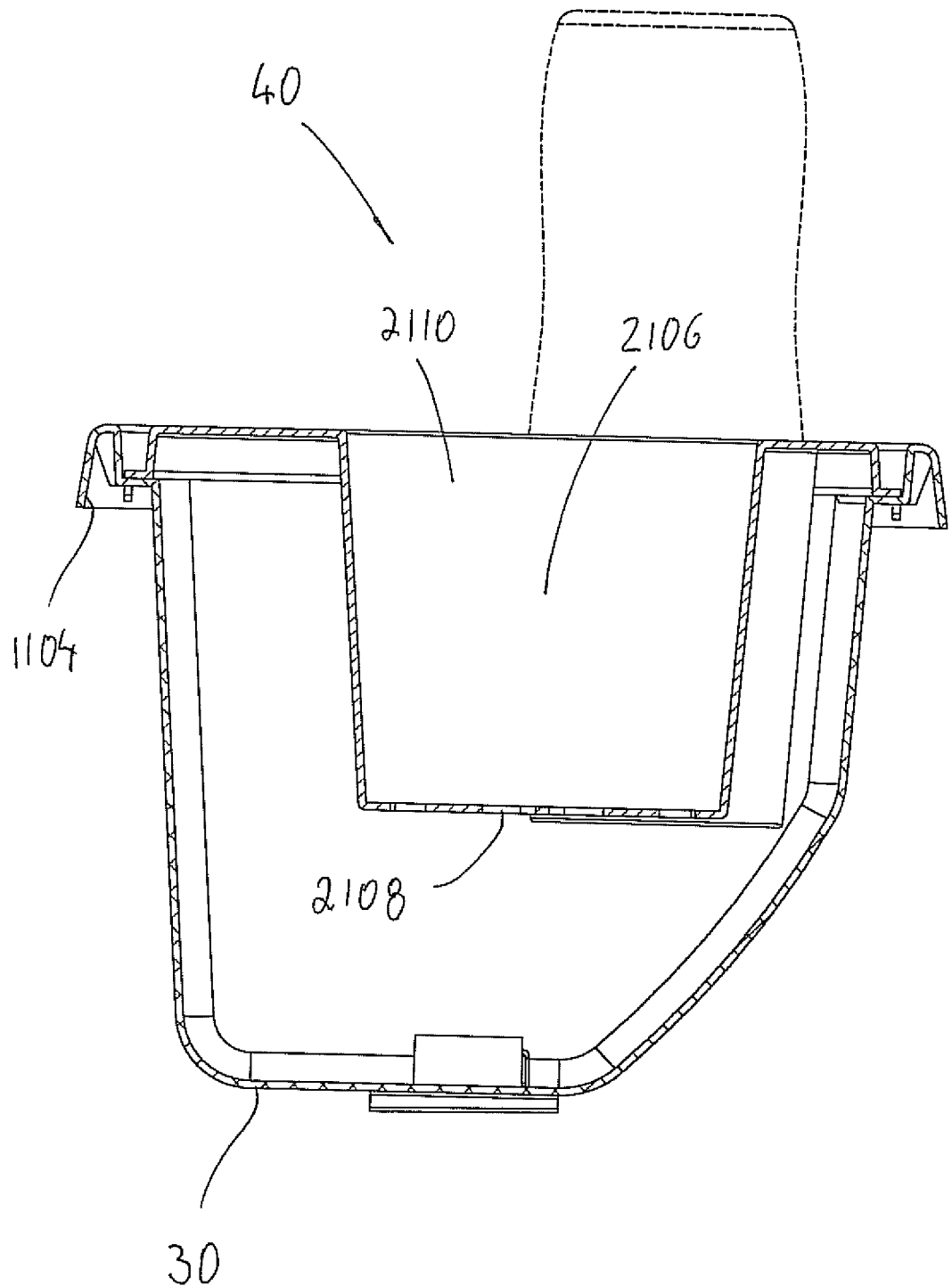

FIG. 23 is a view of a-a cross-section marked in FIG. 21.

Figure 24:
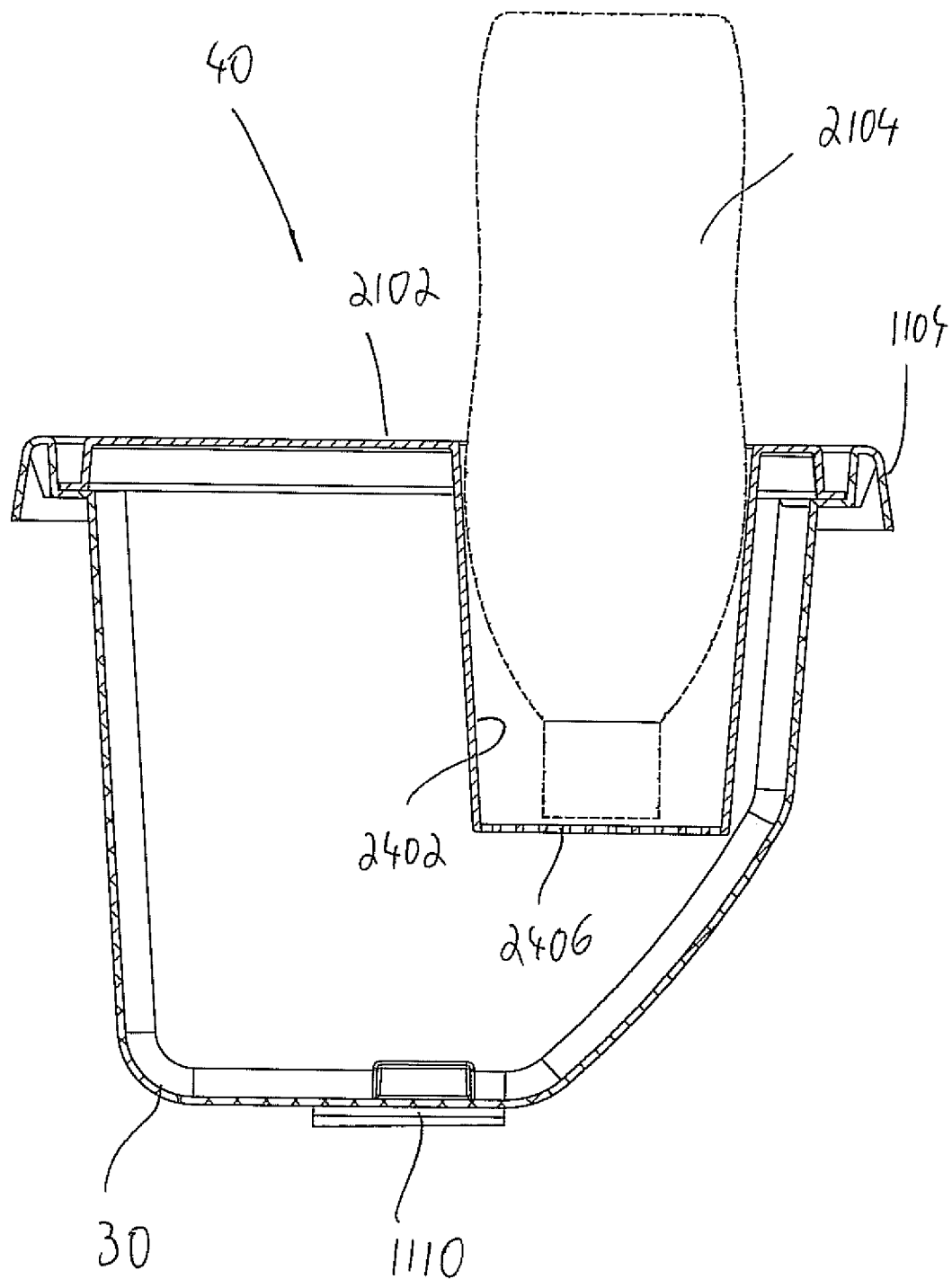

FIG. 24 is a view of b-b cross-section marked in FIG. 21.

Figure 25:
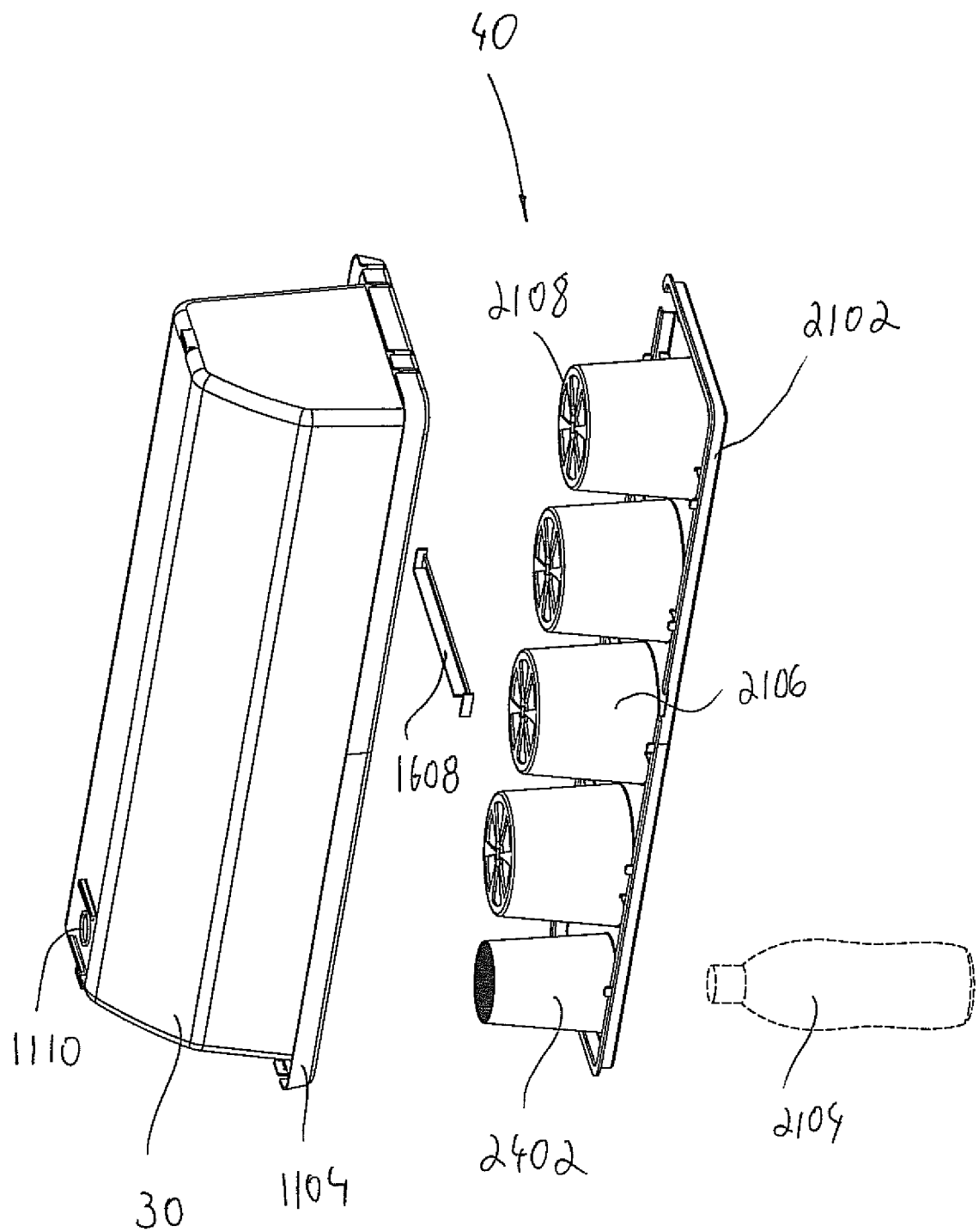

FIG. 25 is an "exploded" perspective view of elements of the example planter assembly illustrated in FIG. 21.

Figure 26:
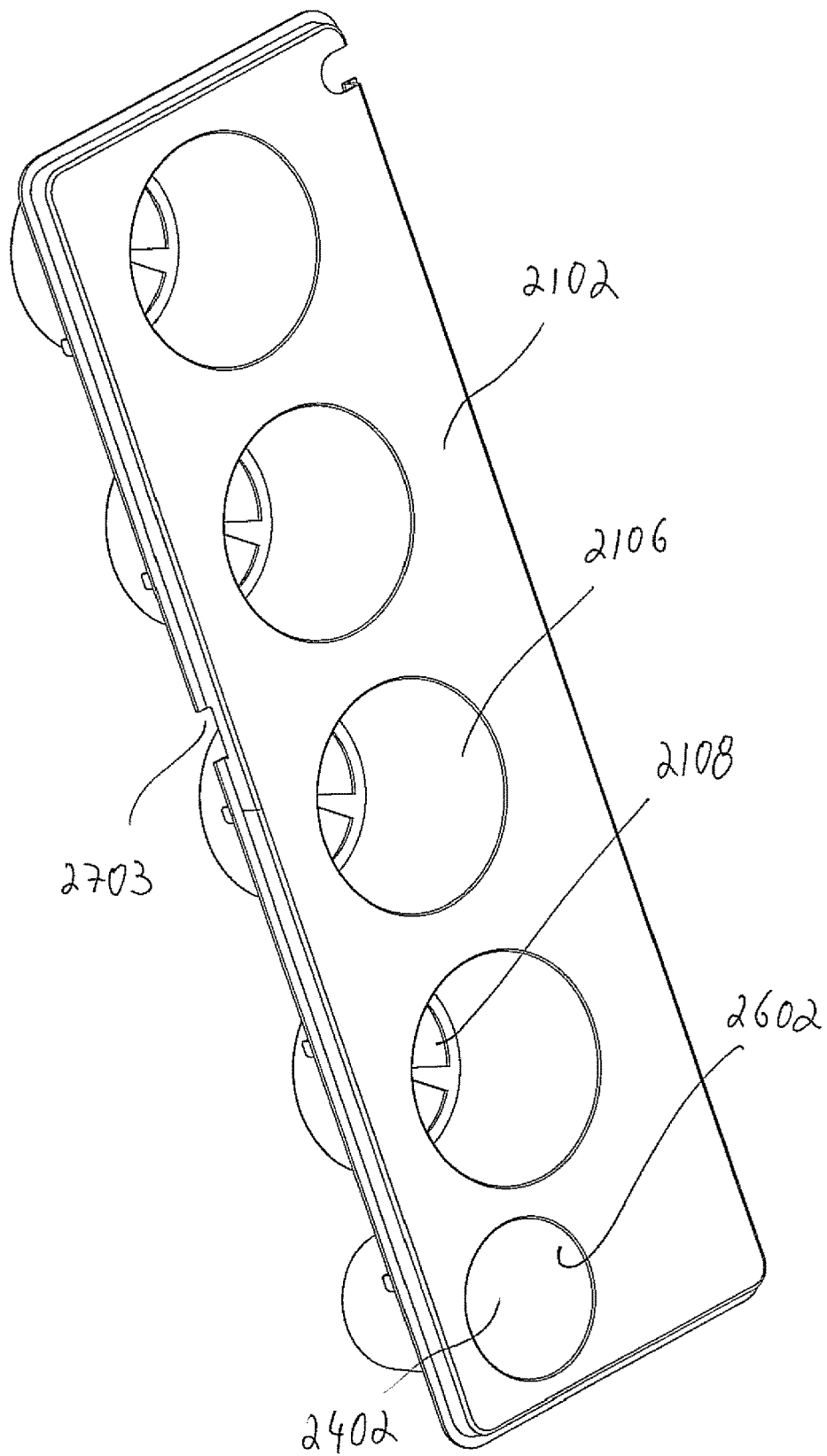

FIG. 26 is a perspective view of a cover element that is mounted in the example planter assembly illustrated in FIG. 21.

Figure 27:
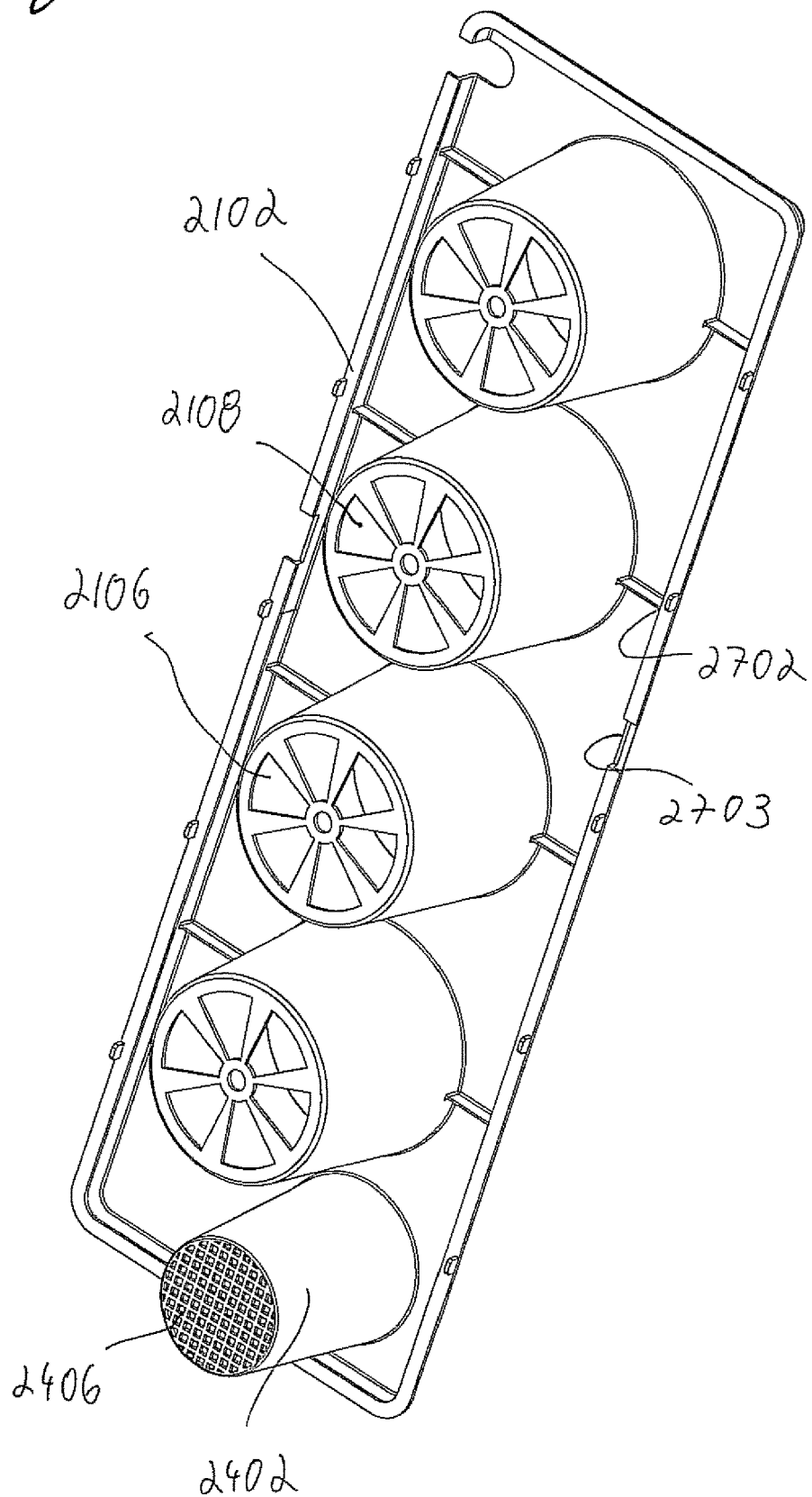

FIG. 27 is a perspective view from another angle of a cover element mounted in the example planter assembly illustrated in FIG. 21.

Figure 28:
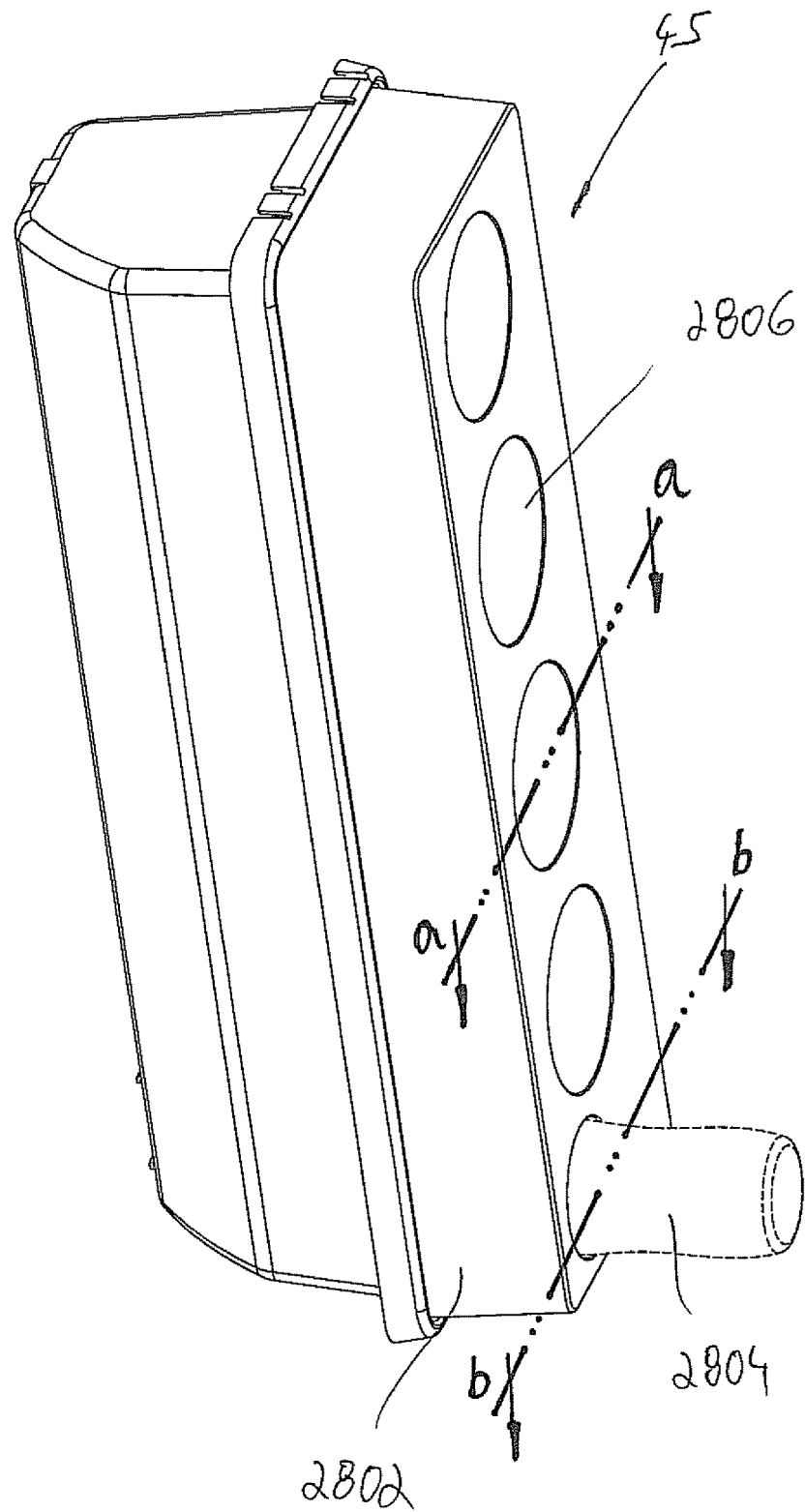

FIG. 28 is a perspective view of one example of a third-type planter assembly, which is suitable for connection in a disassemblable fashion, in modular multi-tiered planter kit according to the invention.

Figure 29:
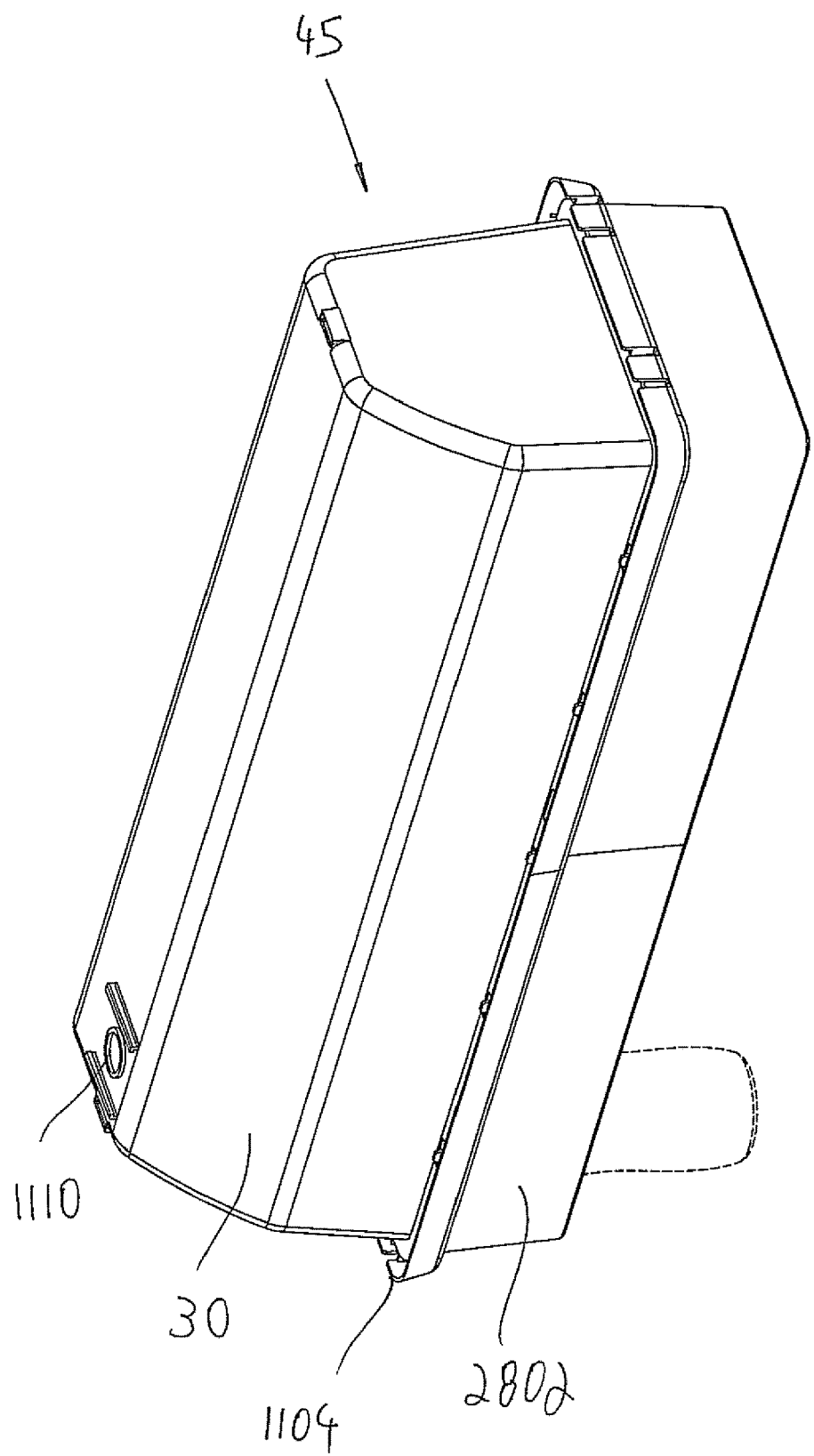

FIG. 29 is a perspective view from another angle of the example planter assembly illustrated in FIG. 28.

Figure 30:
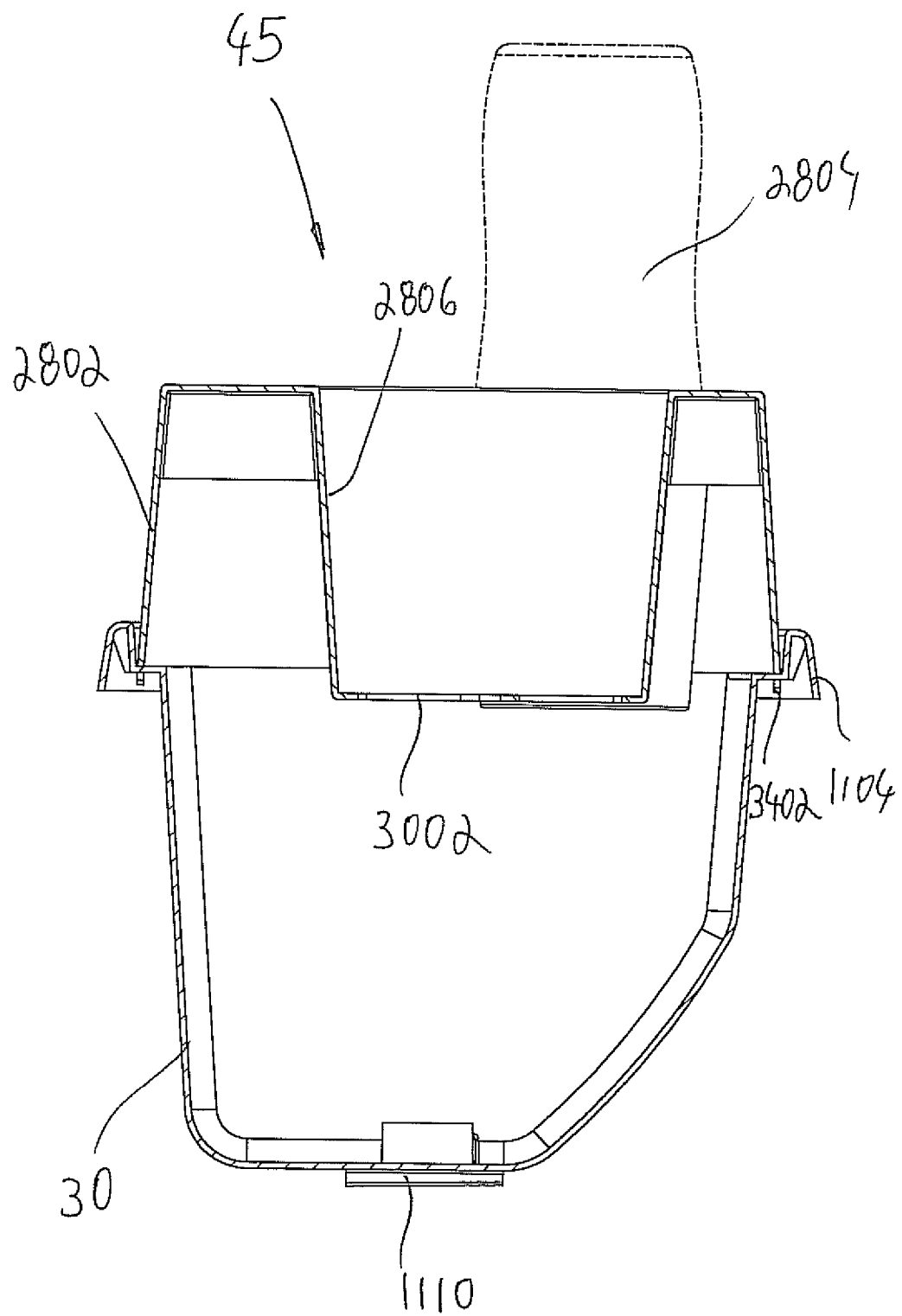

FIG. 30 is a view of a-a cross-section marked in FIG. 28.

Figure 31:
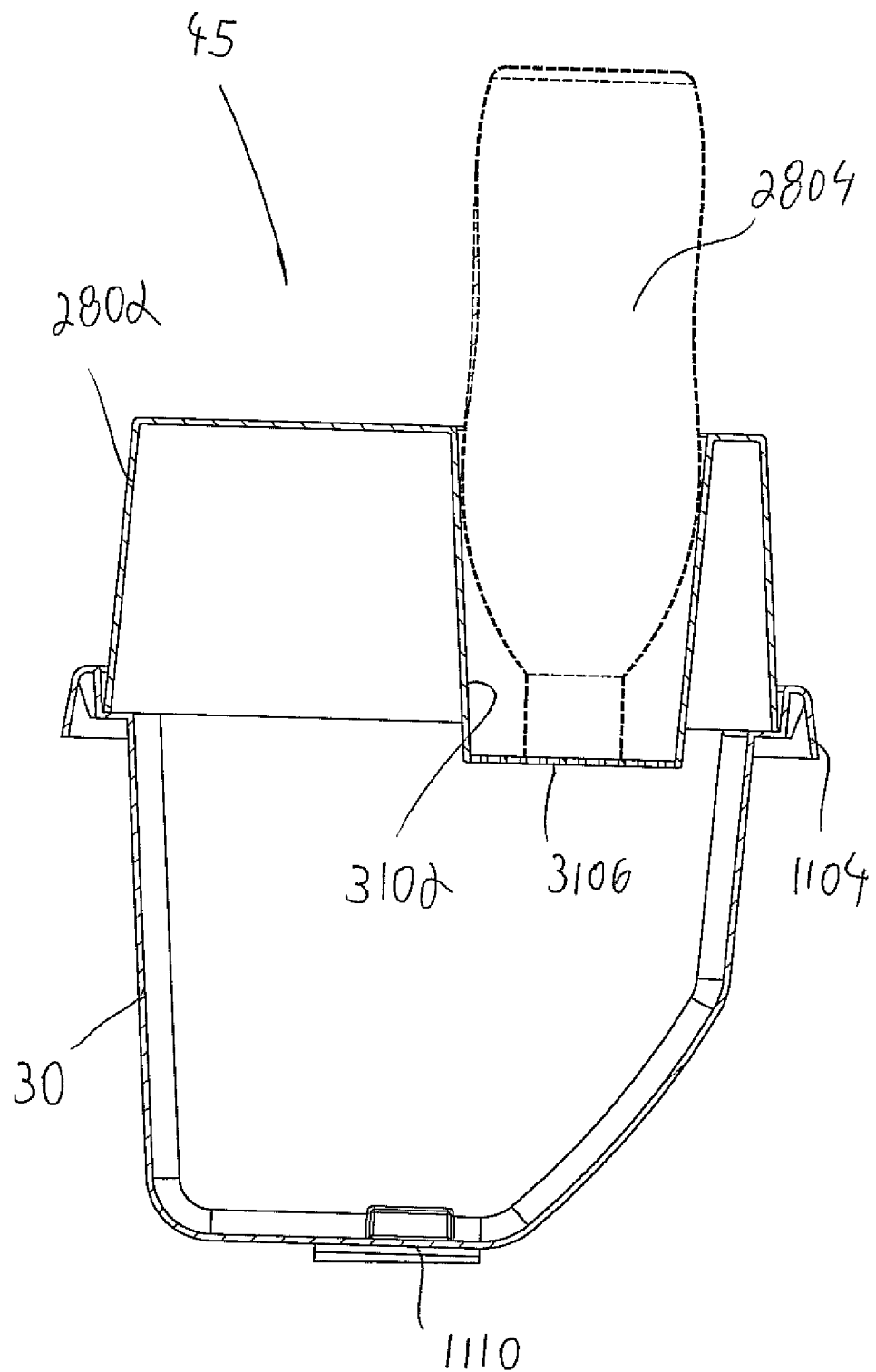

FIG. 31 is a view of b-b cross-section marked in FIG. 28.

Figure 32:
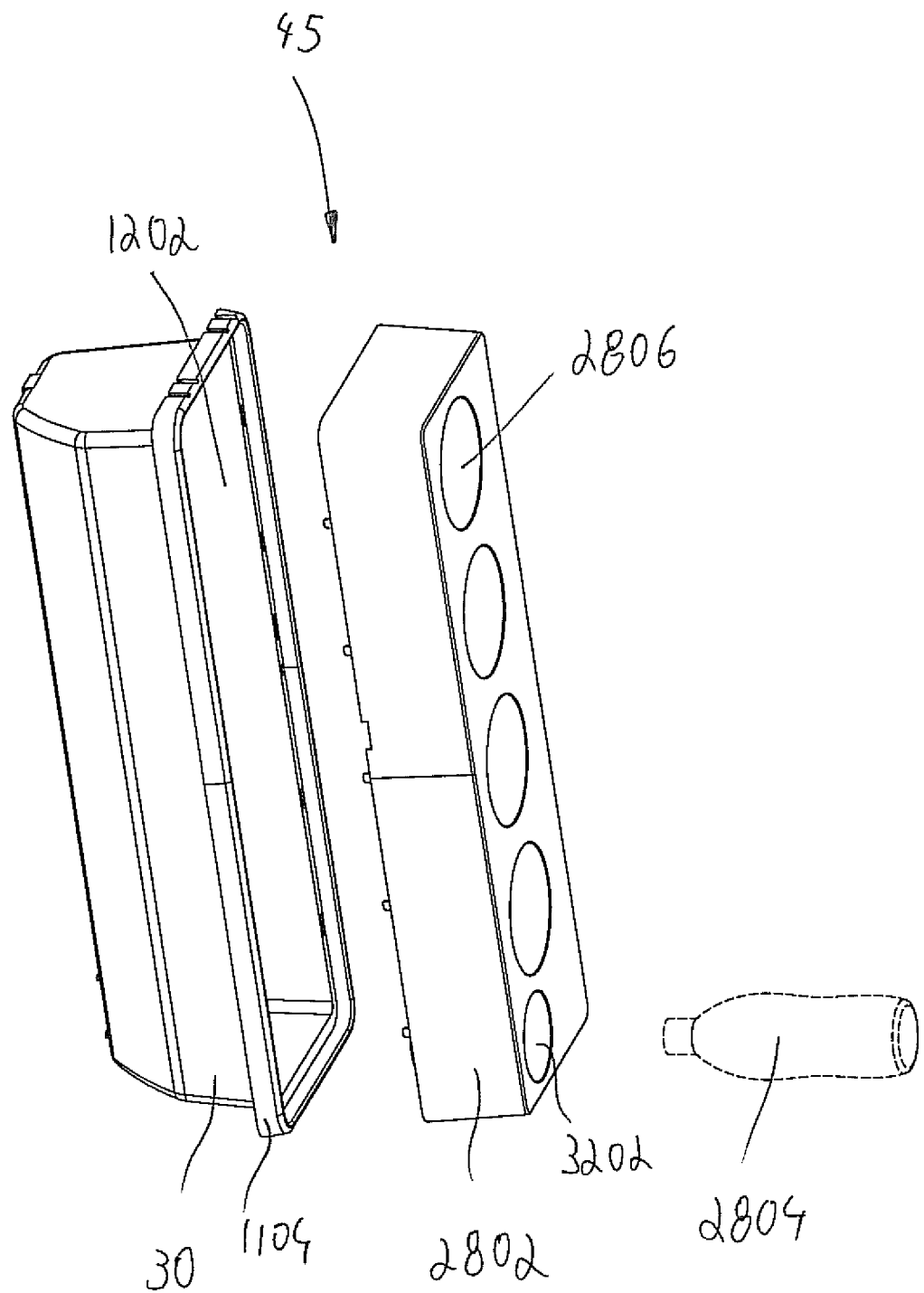

FIG. 32 is an "exploded" perspective view of elements of the example planter assembly illustrated in FIG. 28.

Figure 33:
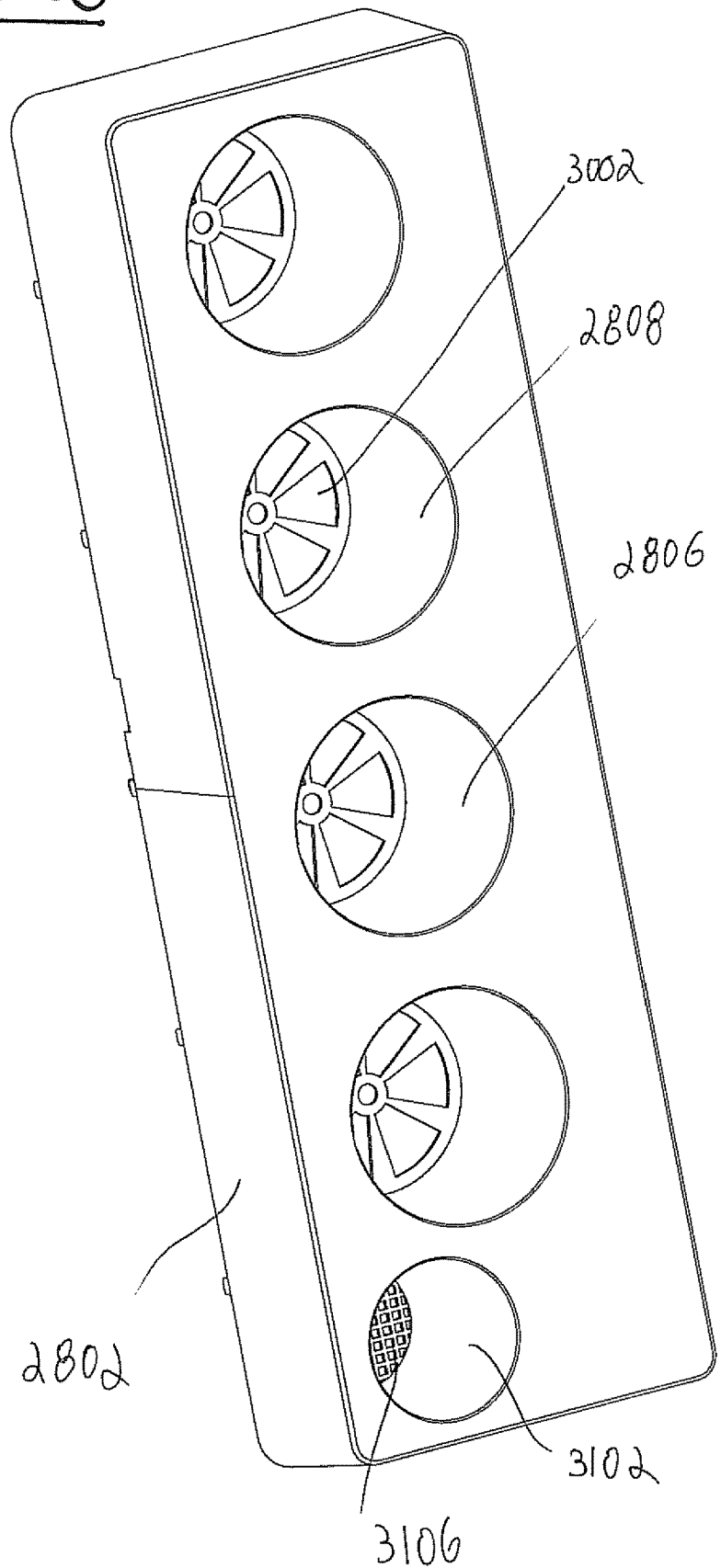

FIG. 33 is a perspective view of an elevated cover element that is mounted in the example planter assembly illustrated in FIG. 28.

Figure 34:
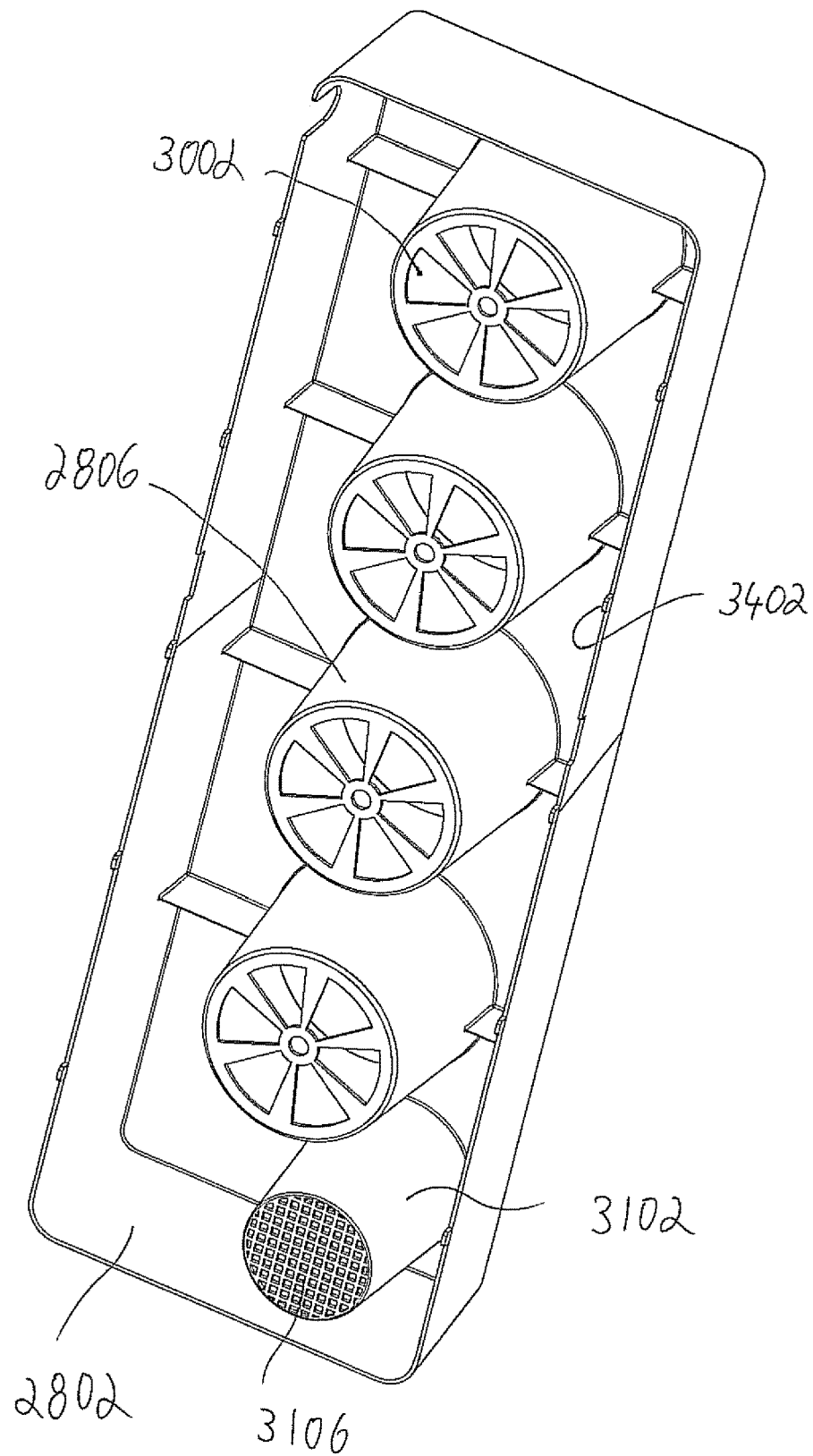

FIG. 34 is a perspective view from another angle of an elevated cover element mounted in the example planter assembly illustrated in FIG. 28.

Figure 35:
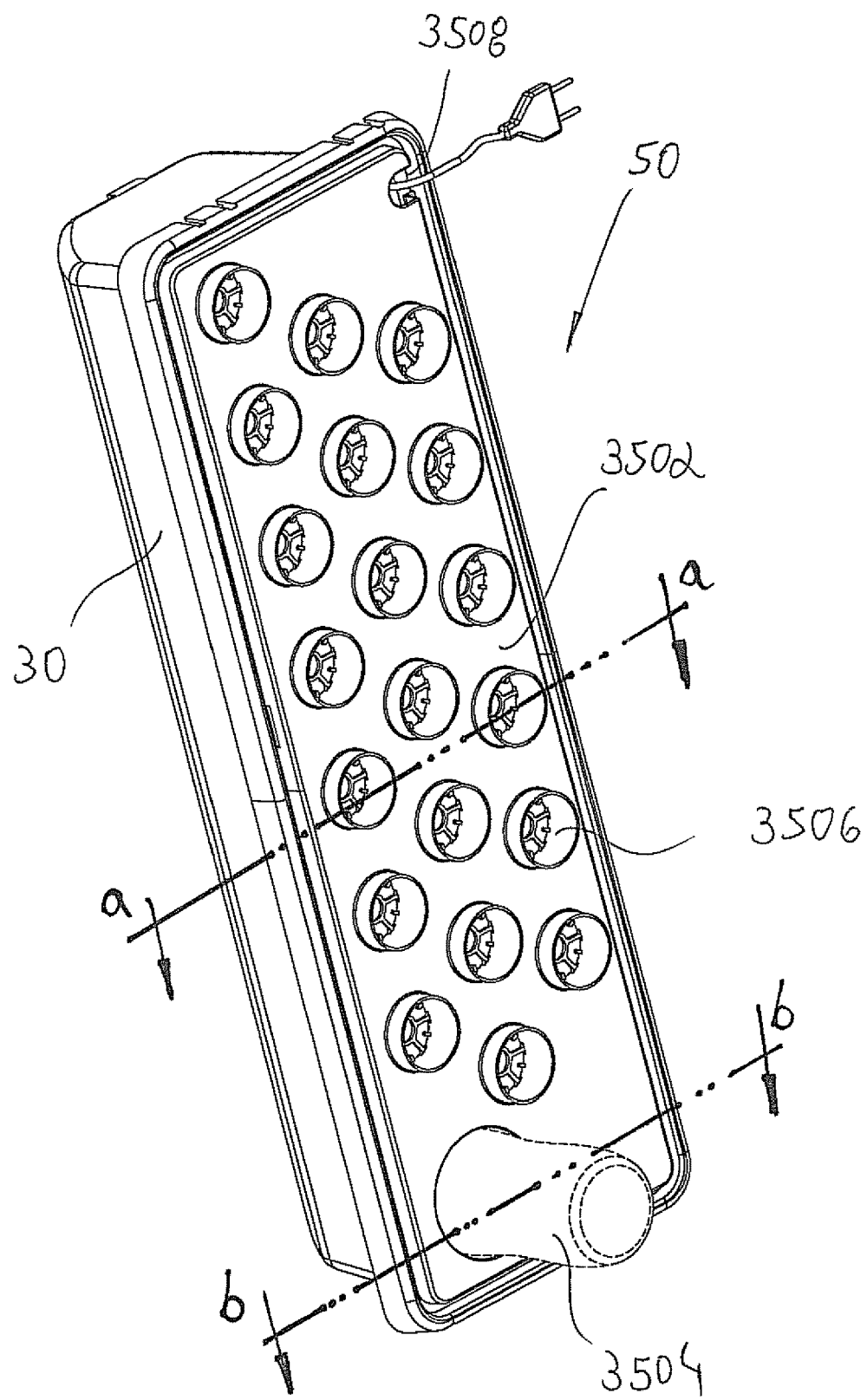

FIG. 35 is a perspective view of one example of a fourth-type planter assembly, which is fitted for connection in a disassemblable fashion, in modular multi-tiered planter kit according to the invention.

Figure 36:
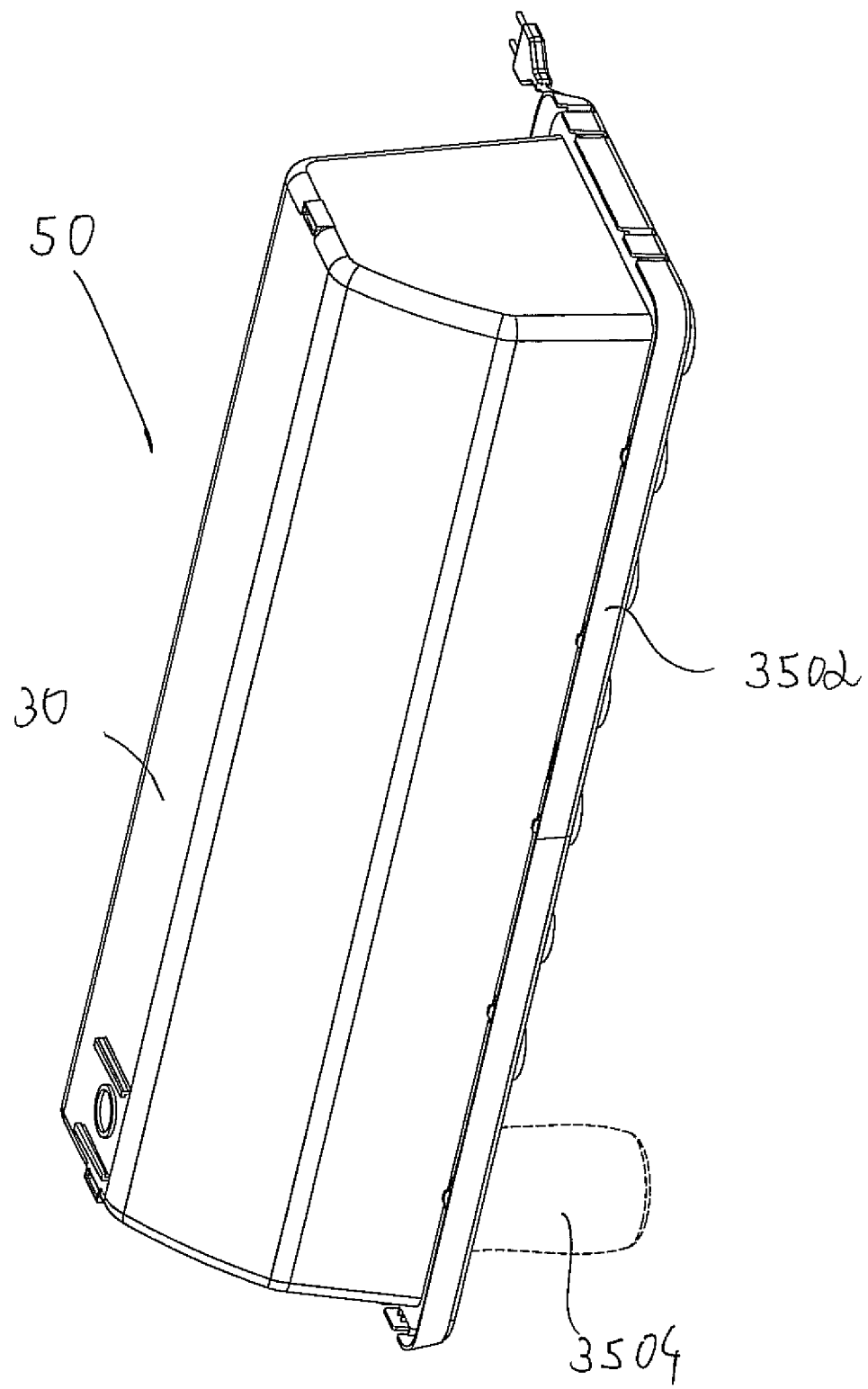

FIG. 36 is a perspective view from another angle of the example planter assembly illustrated in FIG. 35.

Figure 37:
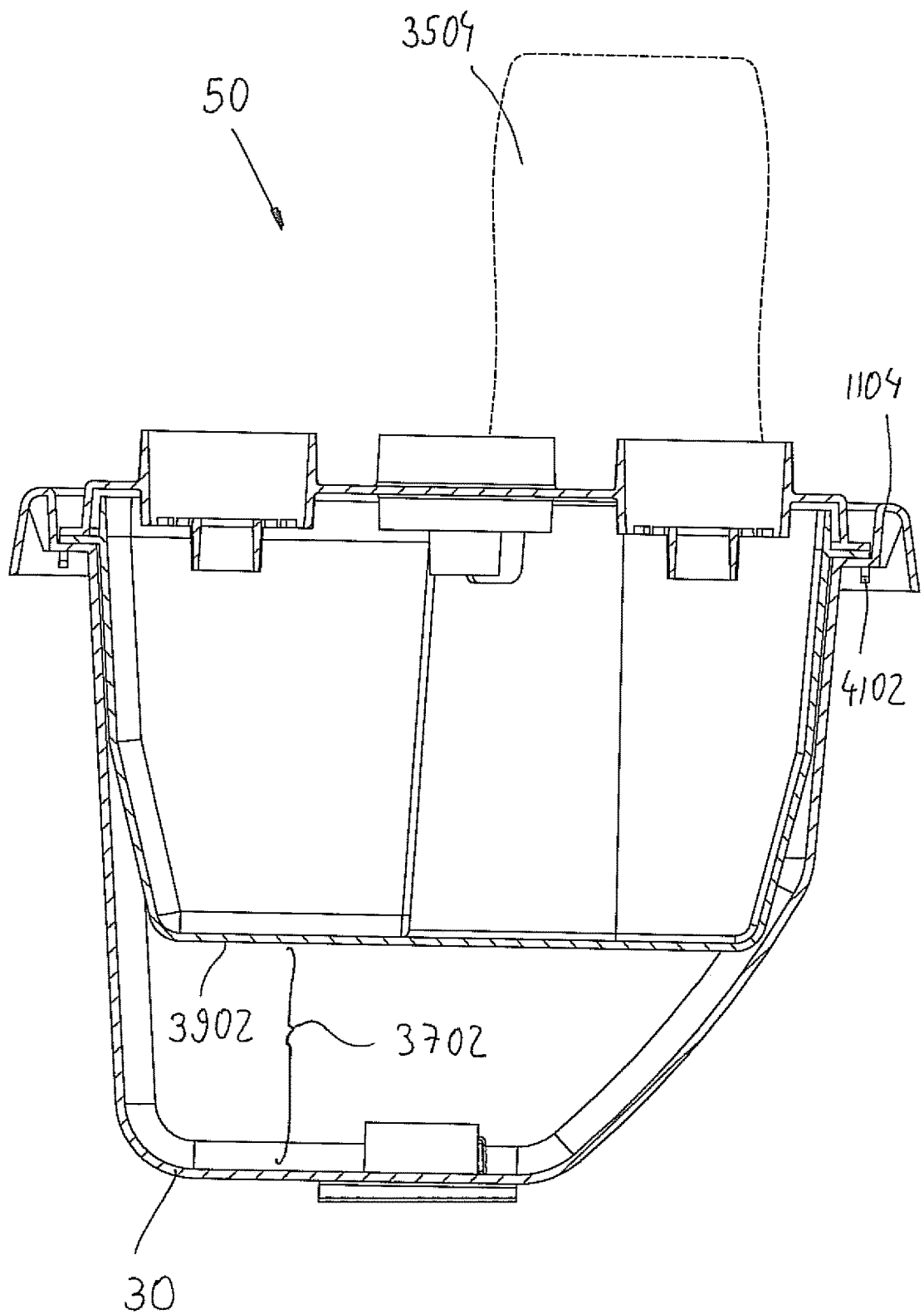

FIG. 37 is a view of a-a cross-section marked in FIG. 35.

Figure 38:
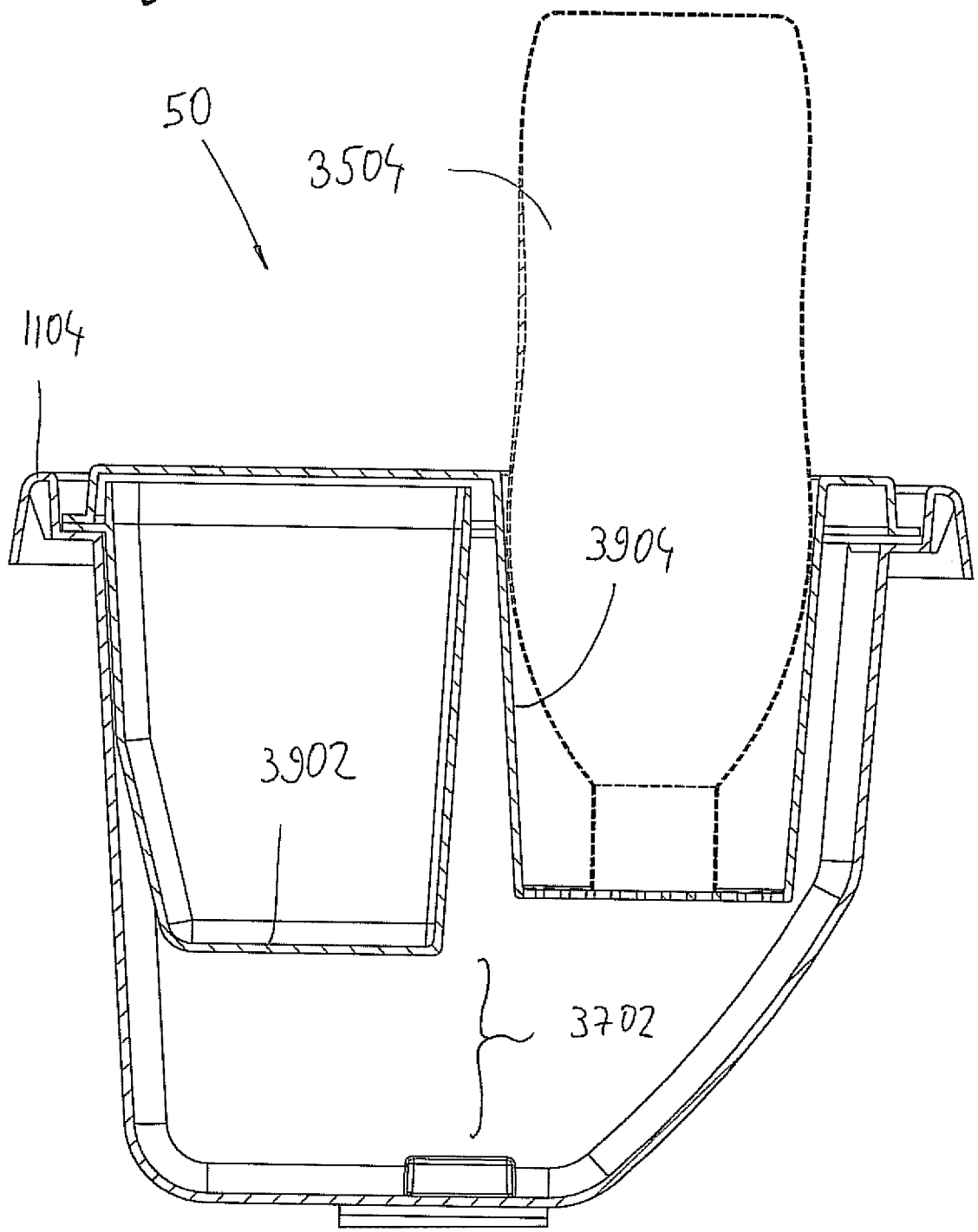

FIG. 38 is a view of b-b cross-section marked in FIG. 35.

Figure 39:
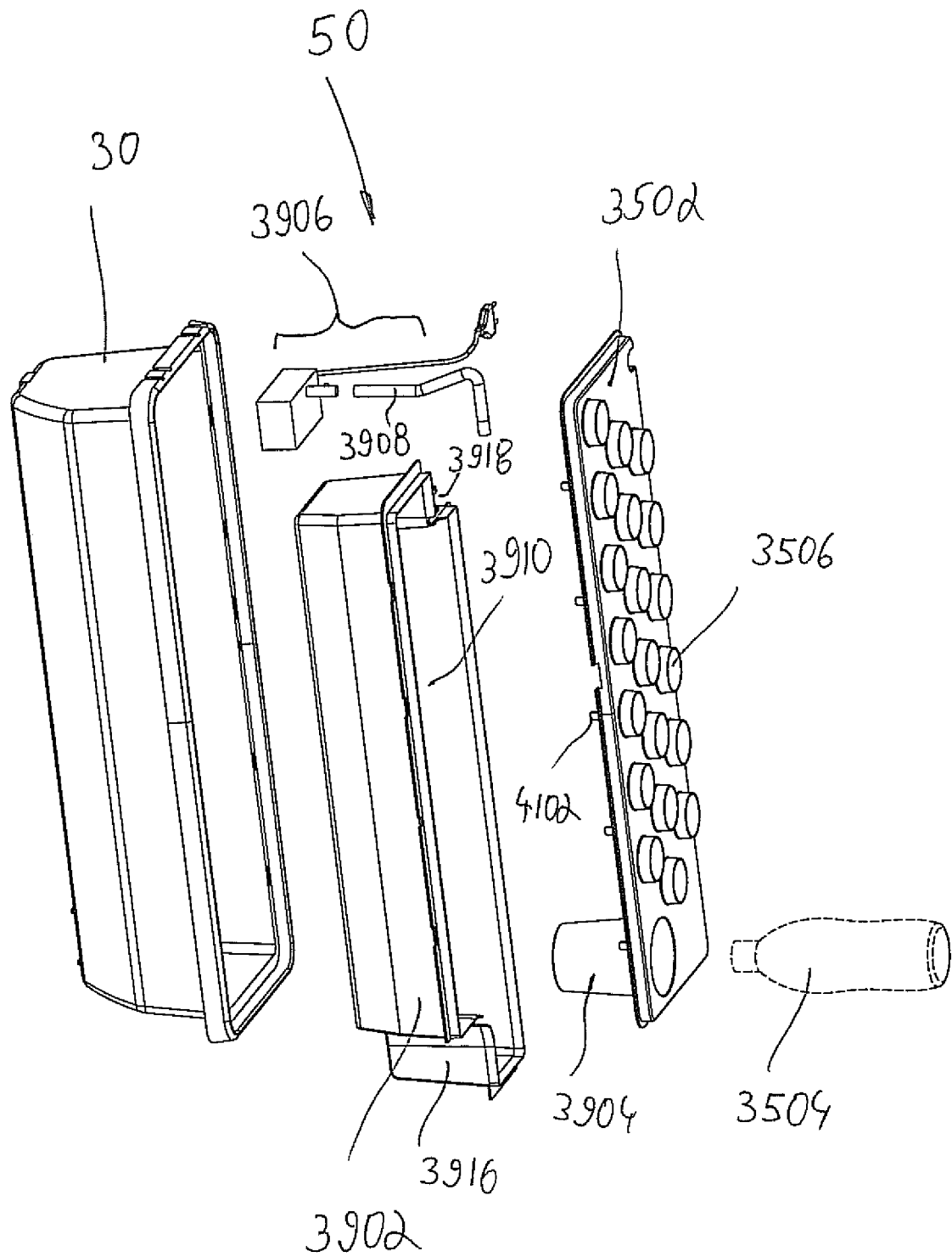

FIG. 39 is an "exploded" perspective view of elements of the example planter assembly illustrated in FIG. 35.

Figure 40:
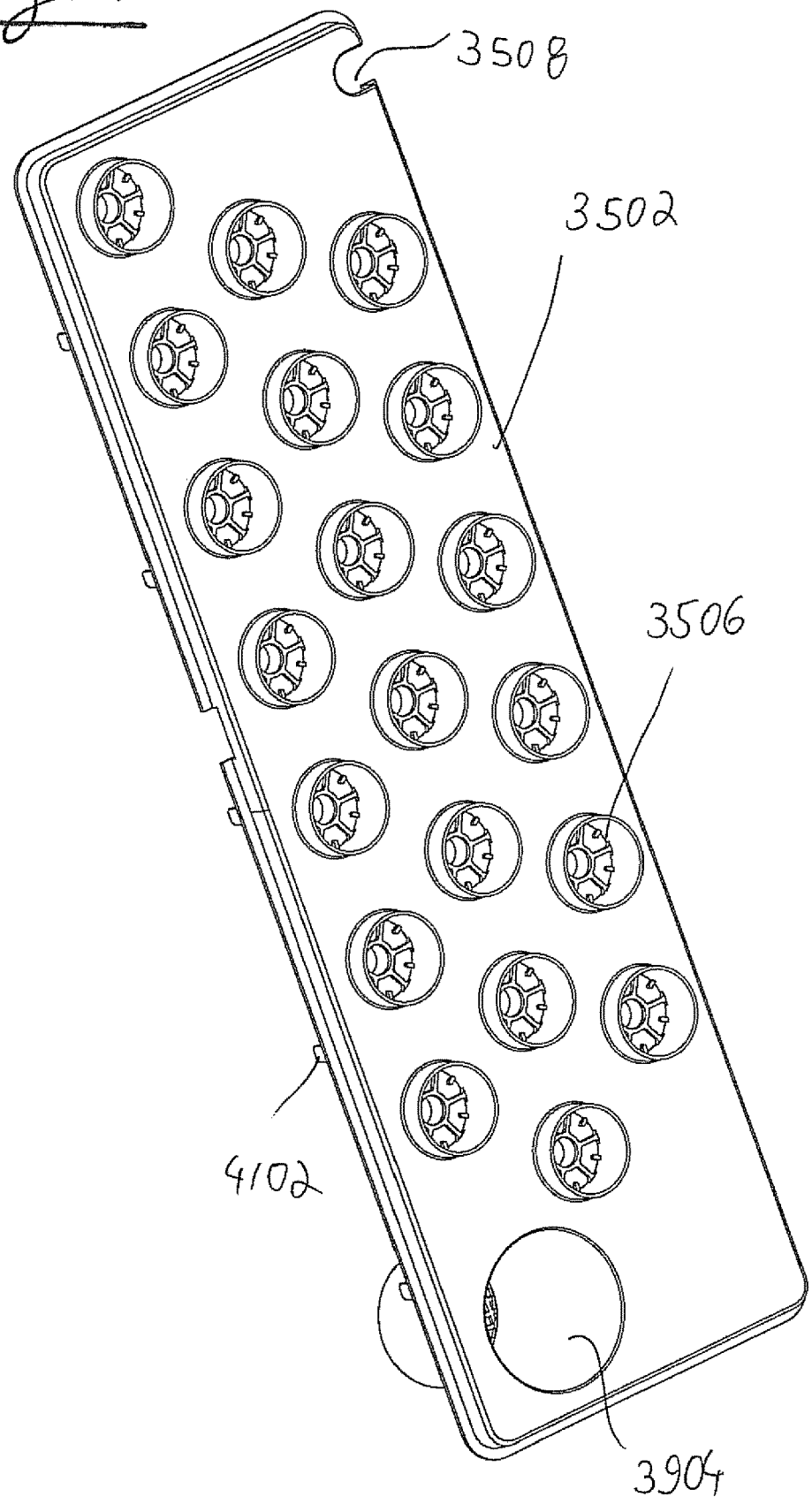

FIG. 40 is a perspective view of a cover element that is mounted in the example planter assembly illustrated in FIG. 35.

Figure 41:
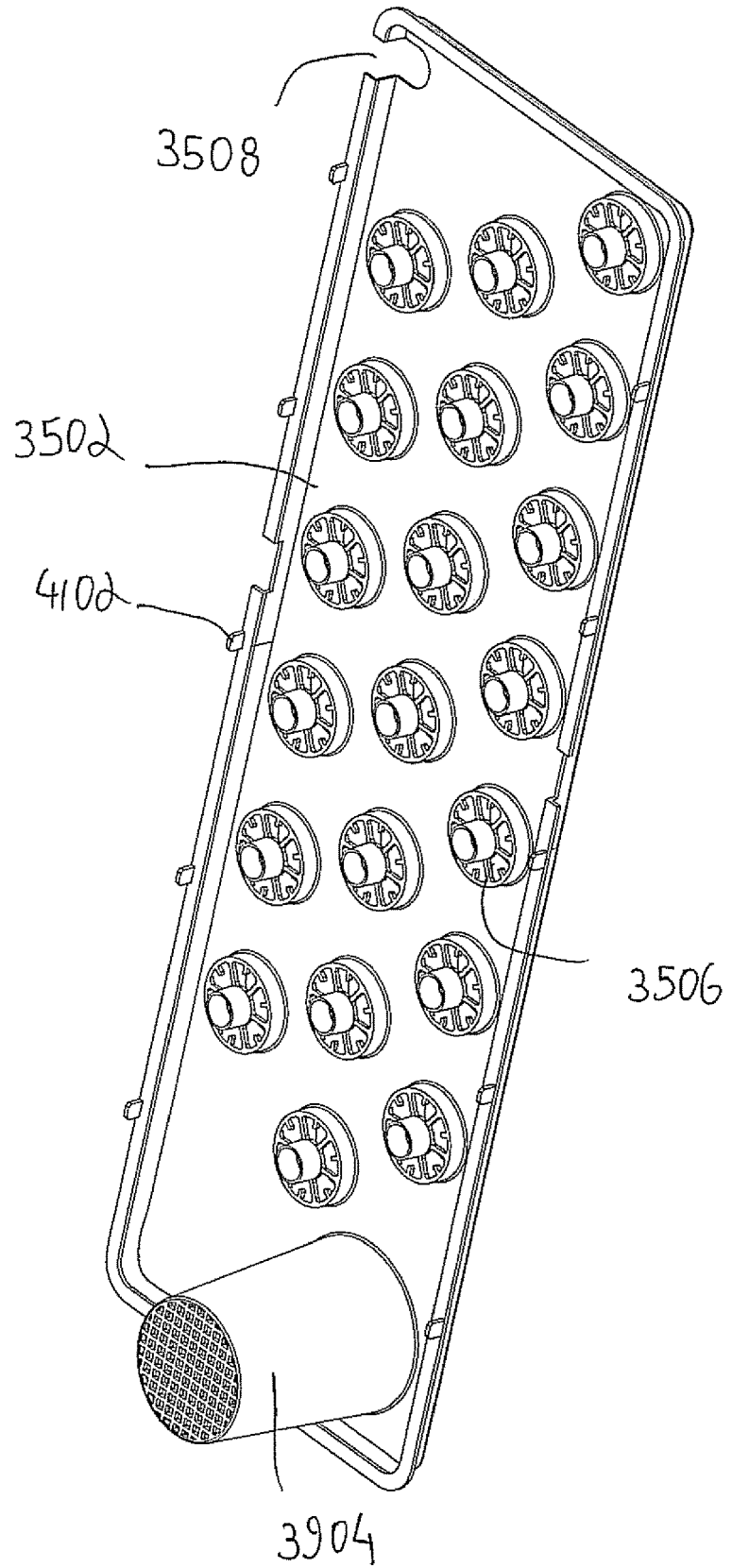

FIG. 41 is a perspective view from another angle of a cover element that is mounted in the example planter assembly illustrated in FIG. 35.

Figure 42:
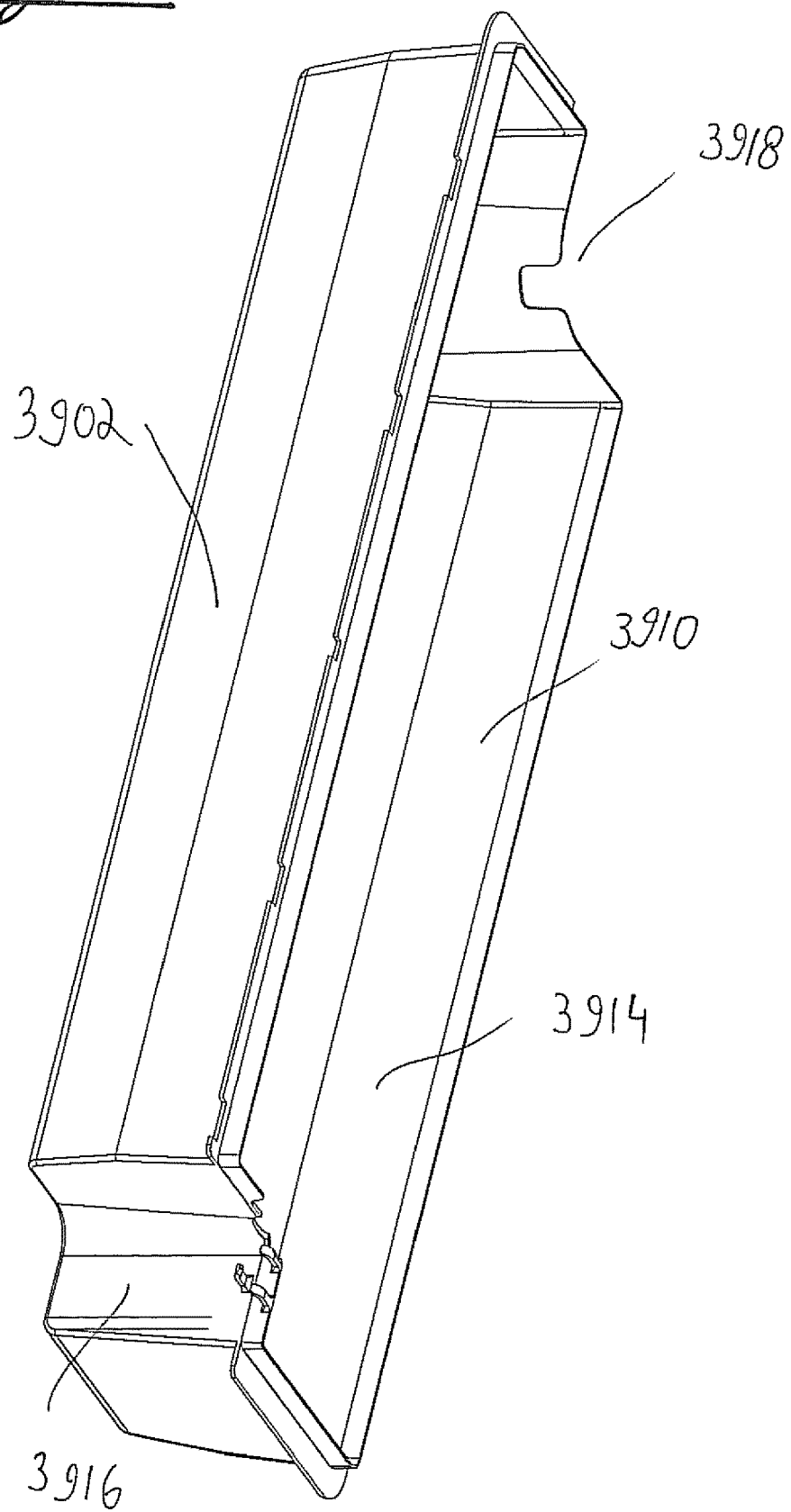

FIG. 42 is a perspective view of an internal water container that is mounted in the example planter assembly illustrated in FIG. 35.

Figure 43:
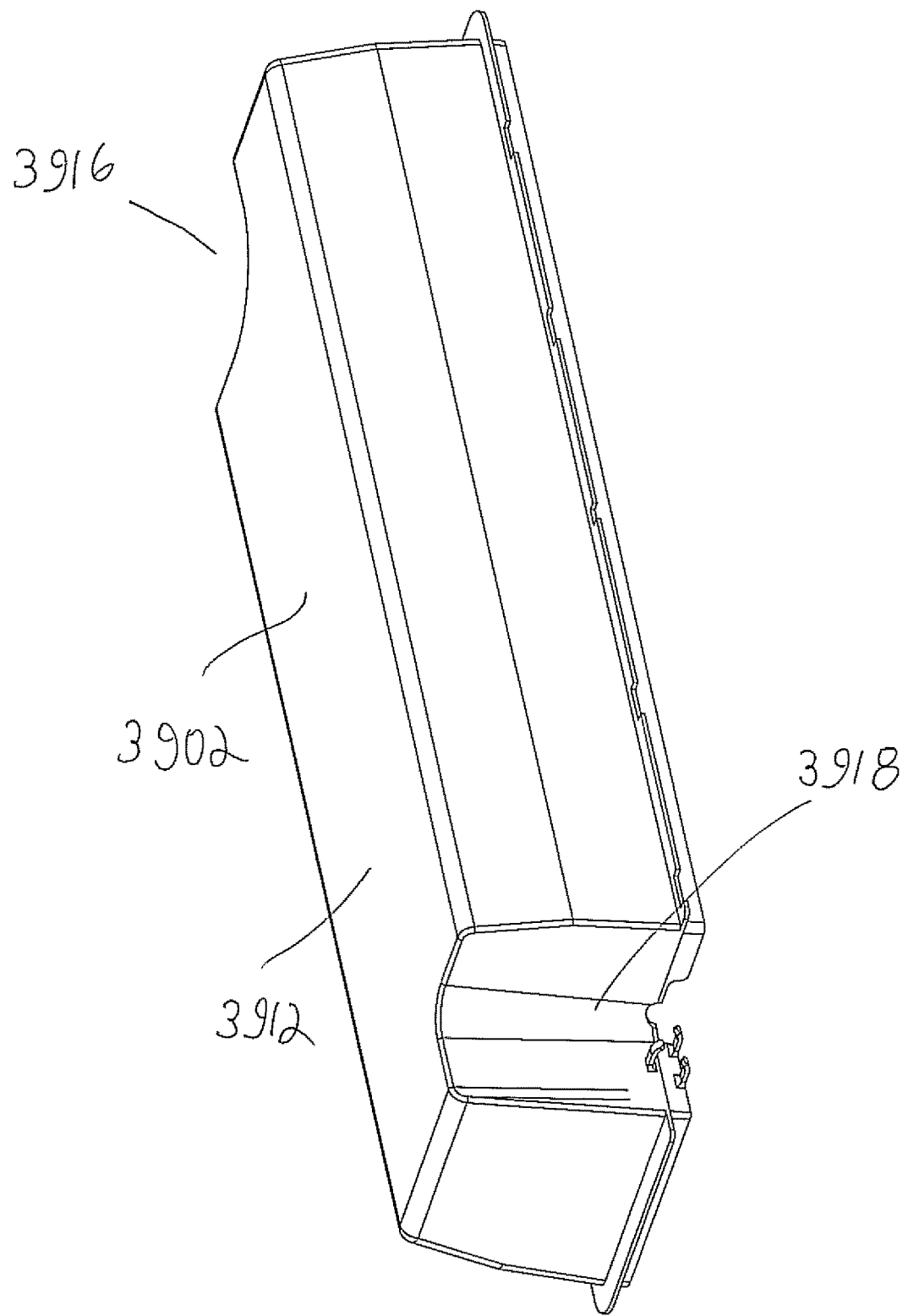

FIG. 43 is a perspective view from another angle of an internal water container that is mounted in the example planter assembly illustrated in FIG. 35.

Figure 44:
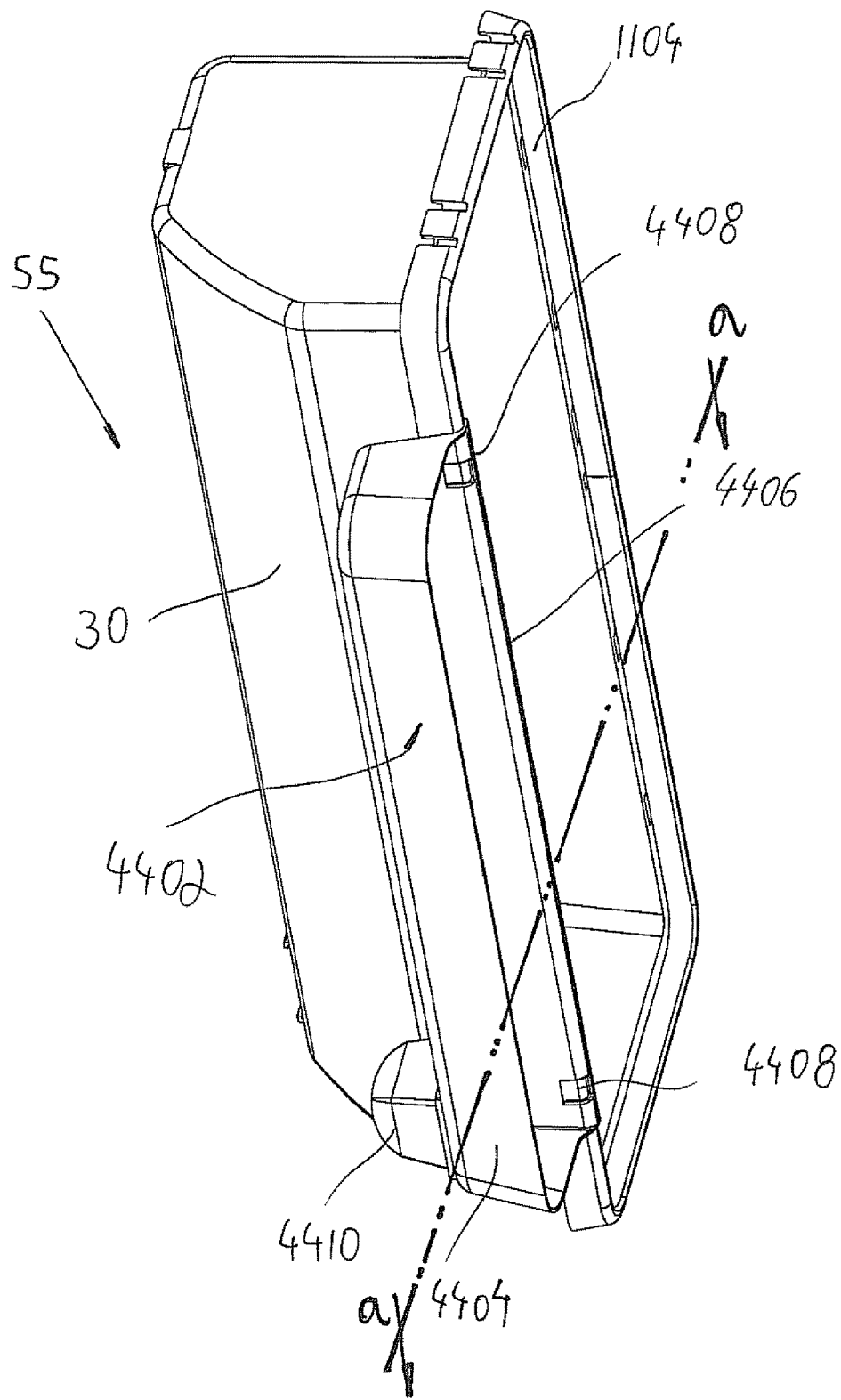

FIG. 44 is a perspective view of one example of a fifth-type planter assembly, which is fitted for connection in a disassemblable fashion, in modular multi-tiered planter kit according to the invention.

Figure 45:
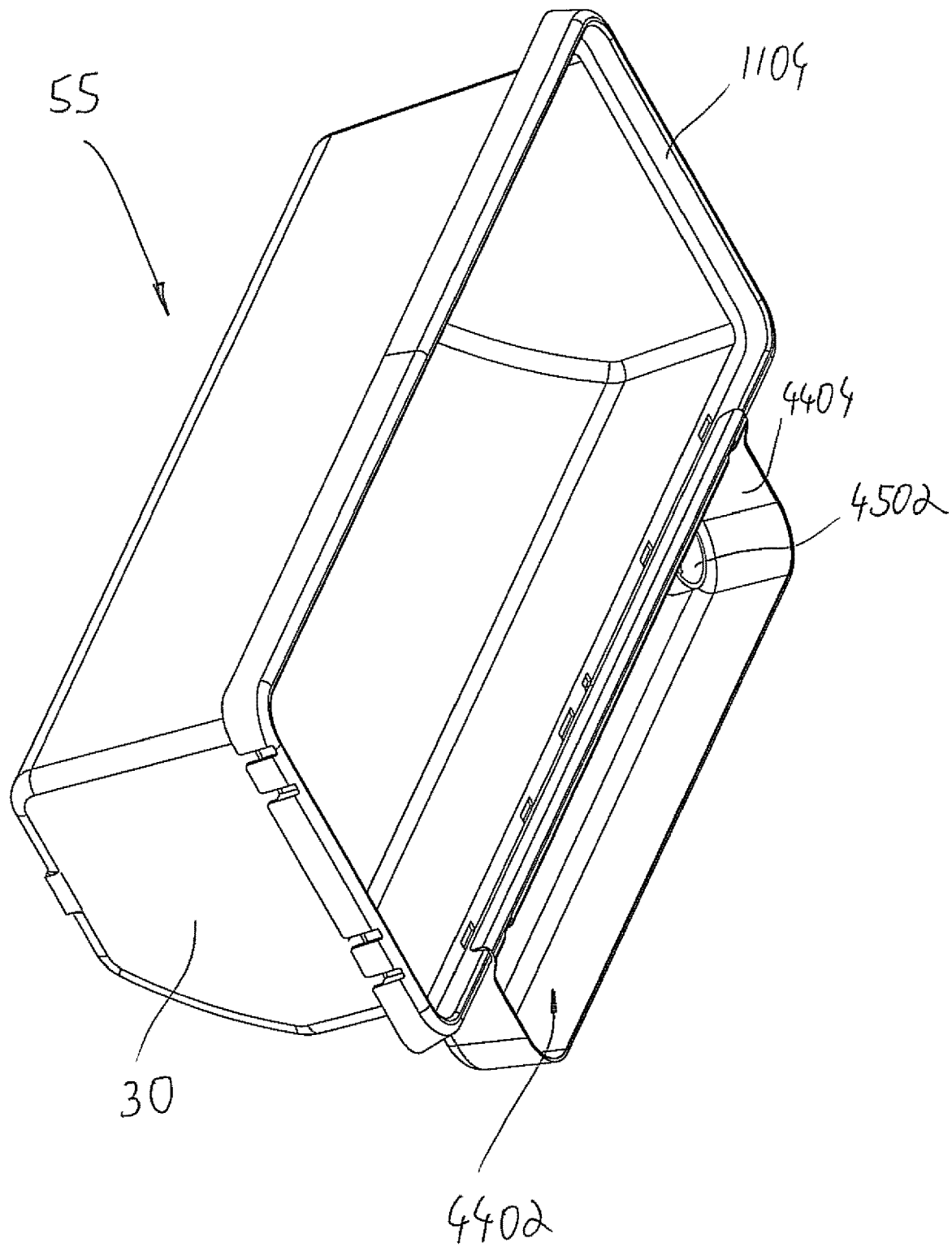

FIG. 45 is a perspective view from another angle of the example planter assembly illustrated in FIG. 44.

Figure 46:
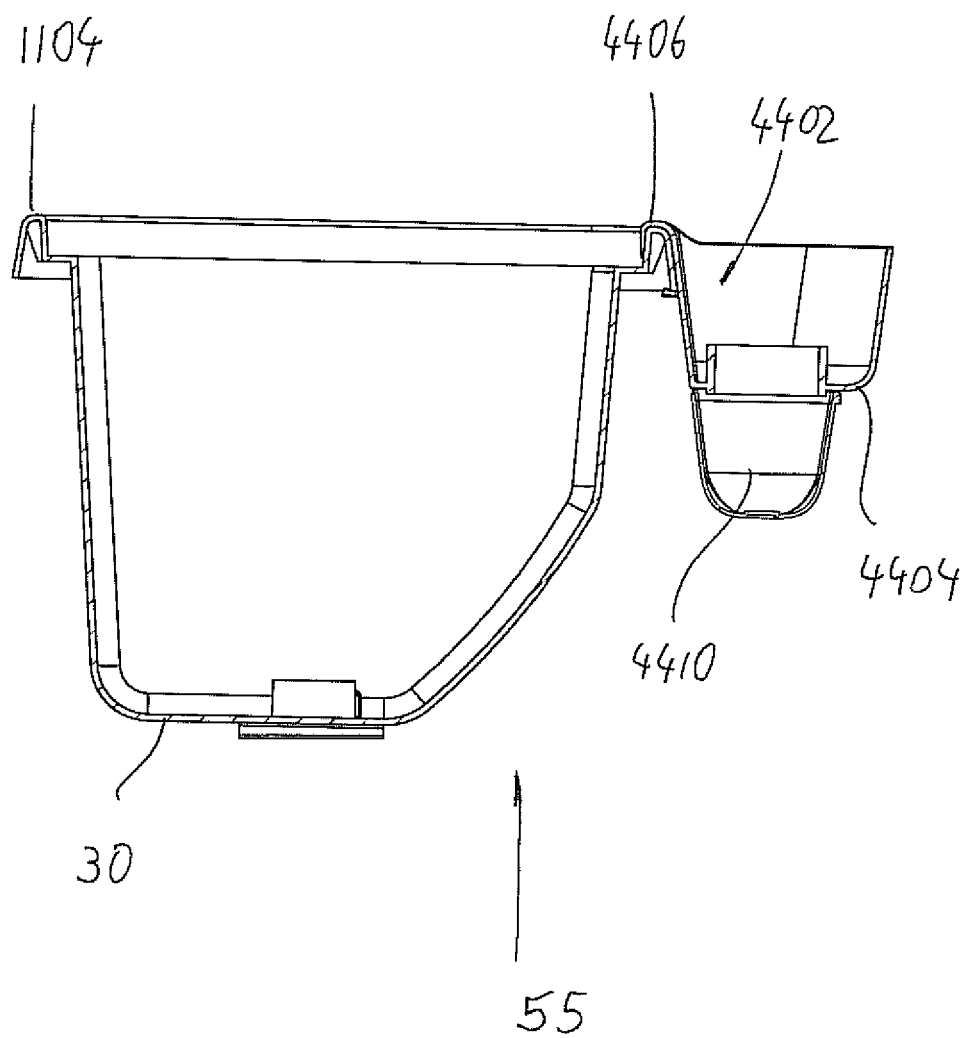

FIG. 46 is a view of a-a cross-section marked in FIG. 44.

Figure 47:
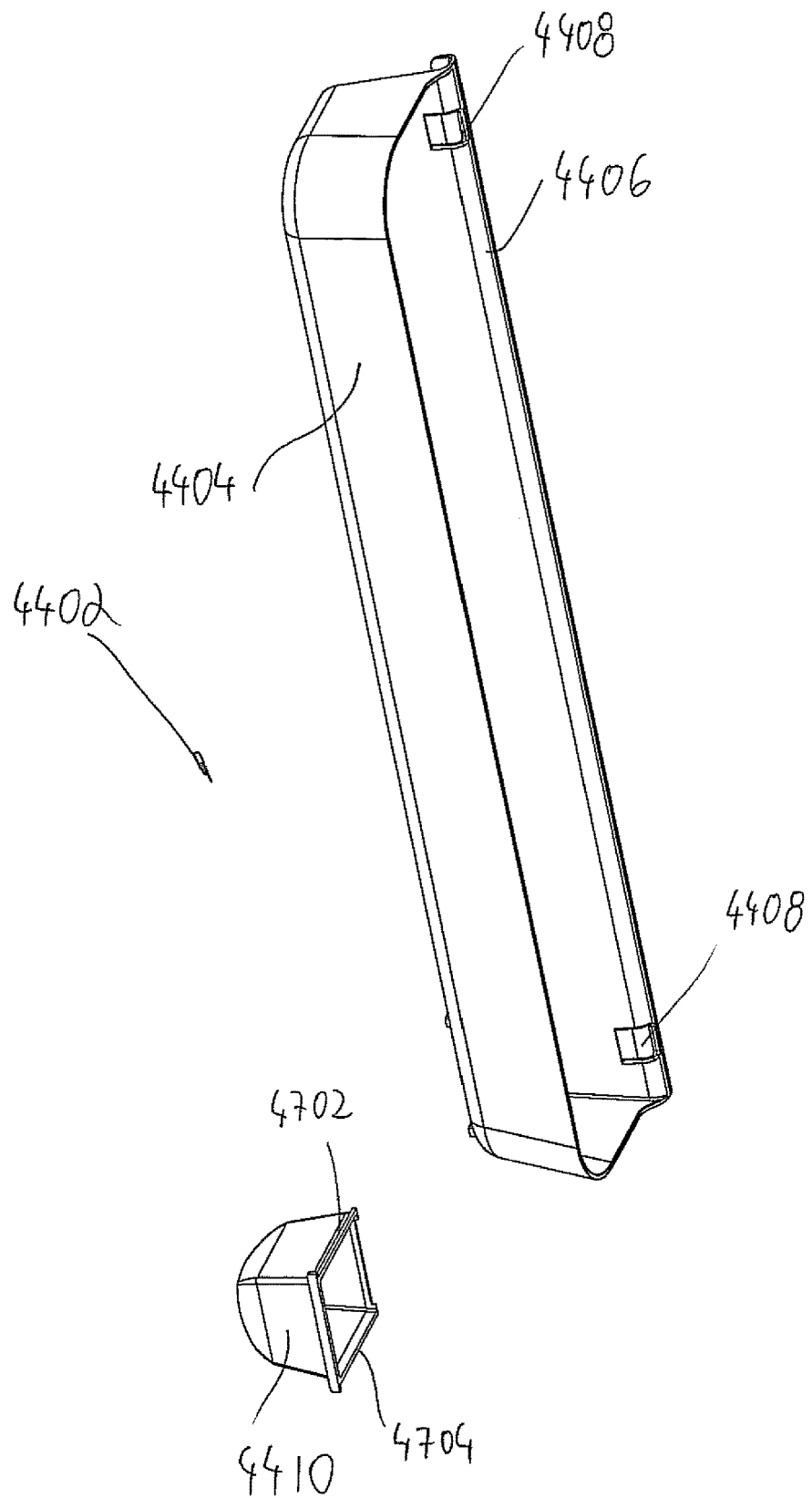

FIG. 47 is an "exploded" perspective view of elements of an example add-on planter assembly mounted in the planter assembly illustrated in FIG. 44.

Figure 48:
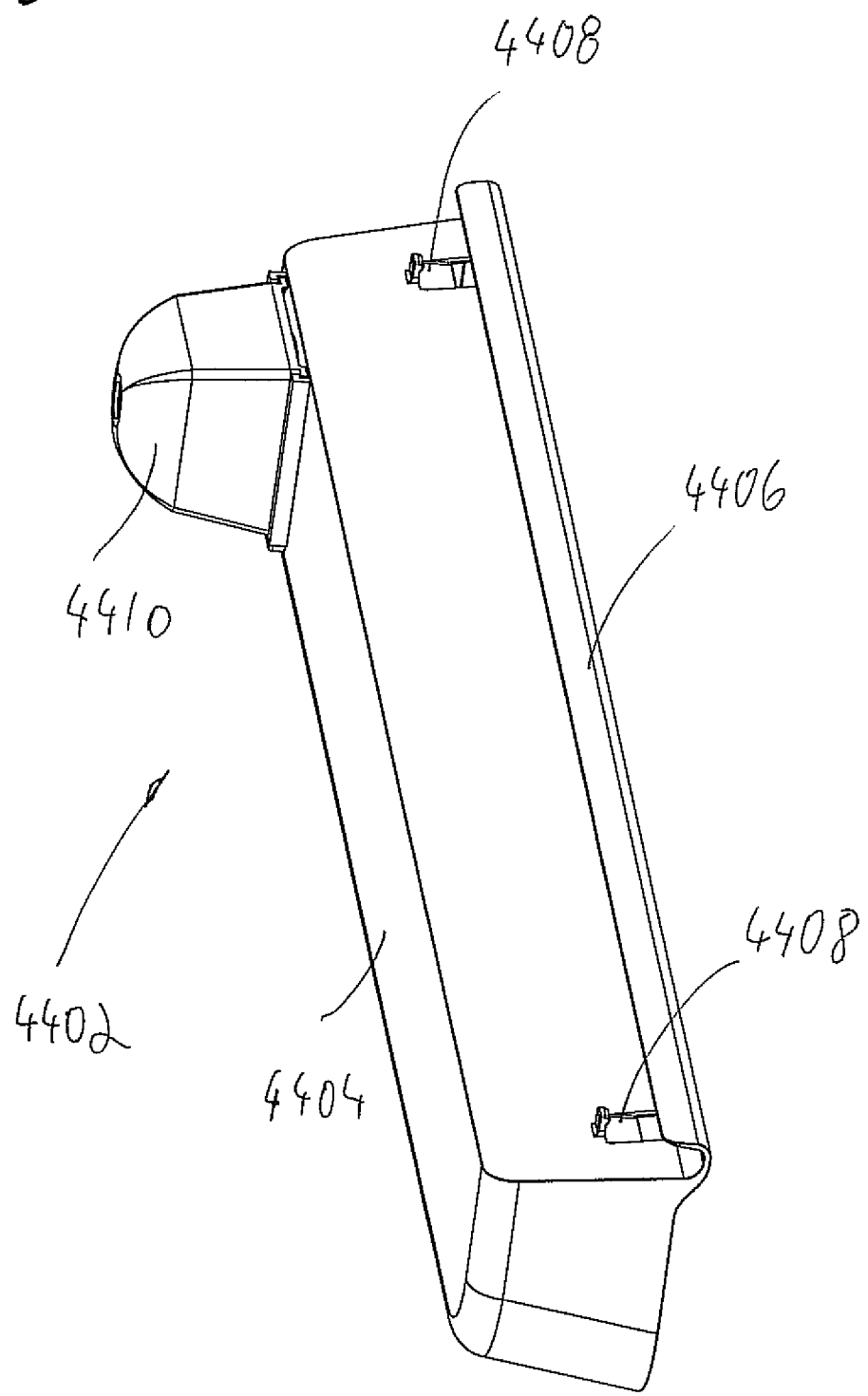

FIG. 48 is a perspective view of an add-on planter assembly that is mounted in the planter assembly illustrated in FIG. 44.

Figure 49:
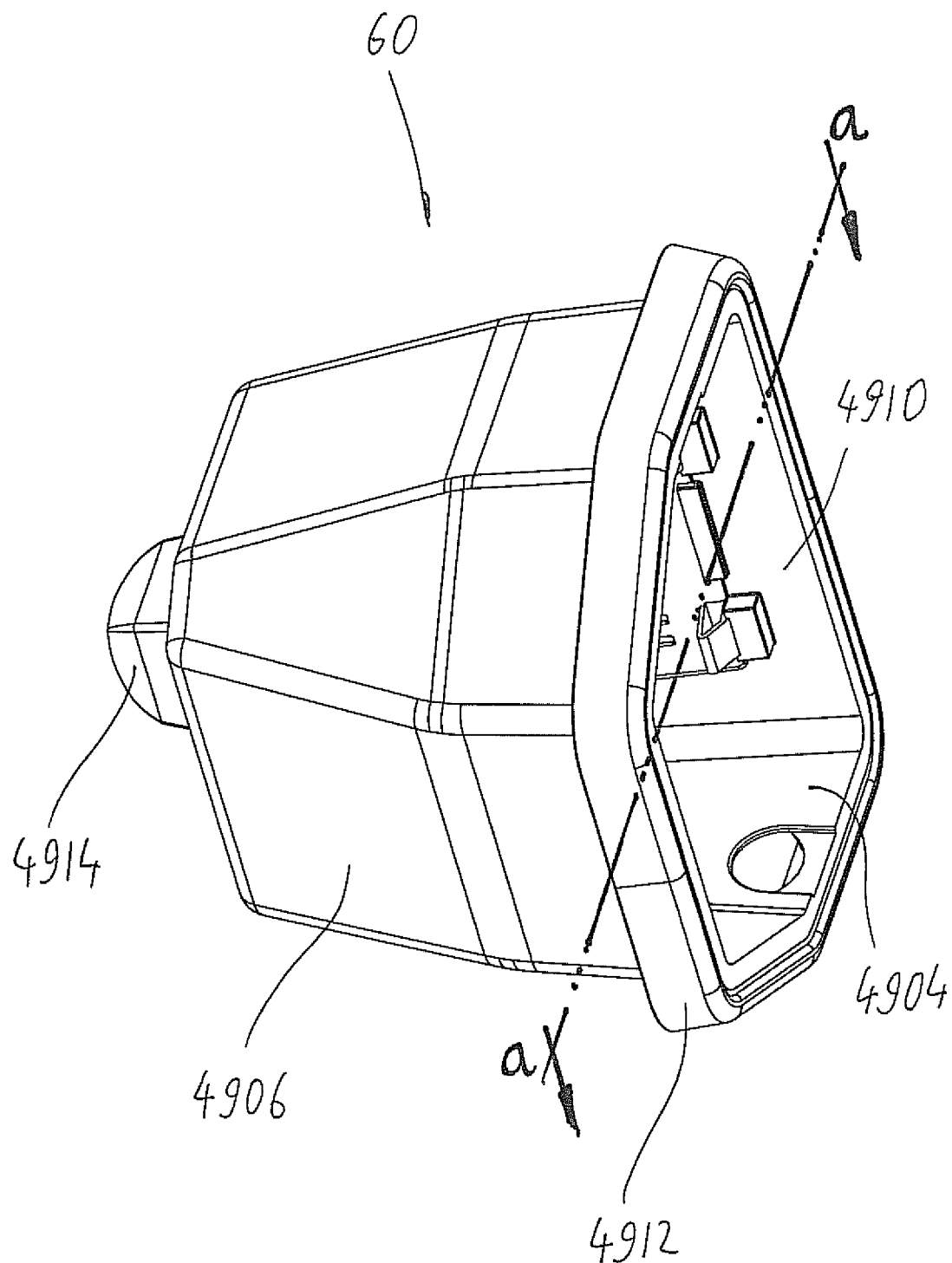

FIG. 49 is a perspective view of one example of a side planter assembly, which is fitted for connection in a disassemblable fashion, in modular multi-tiered planter kit according to the invention.

Figure 50:
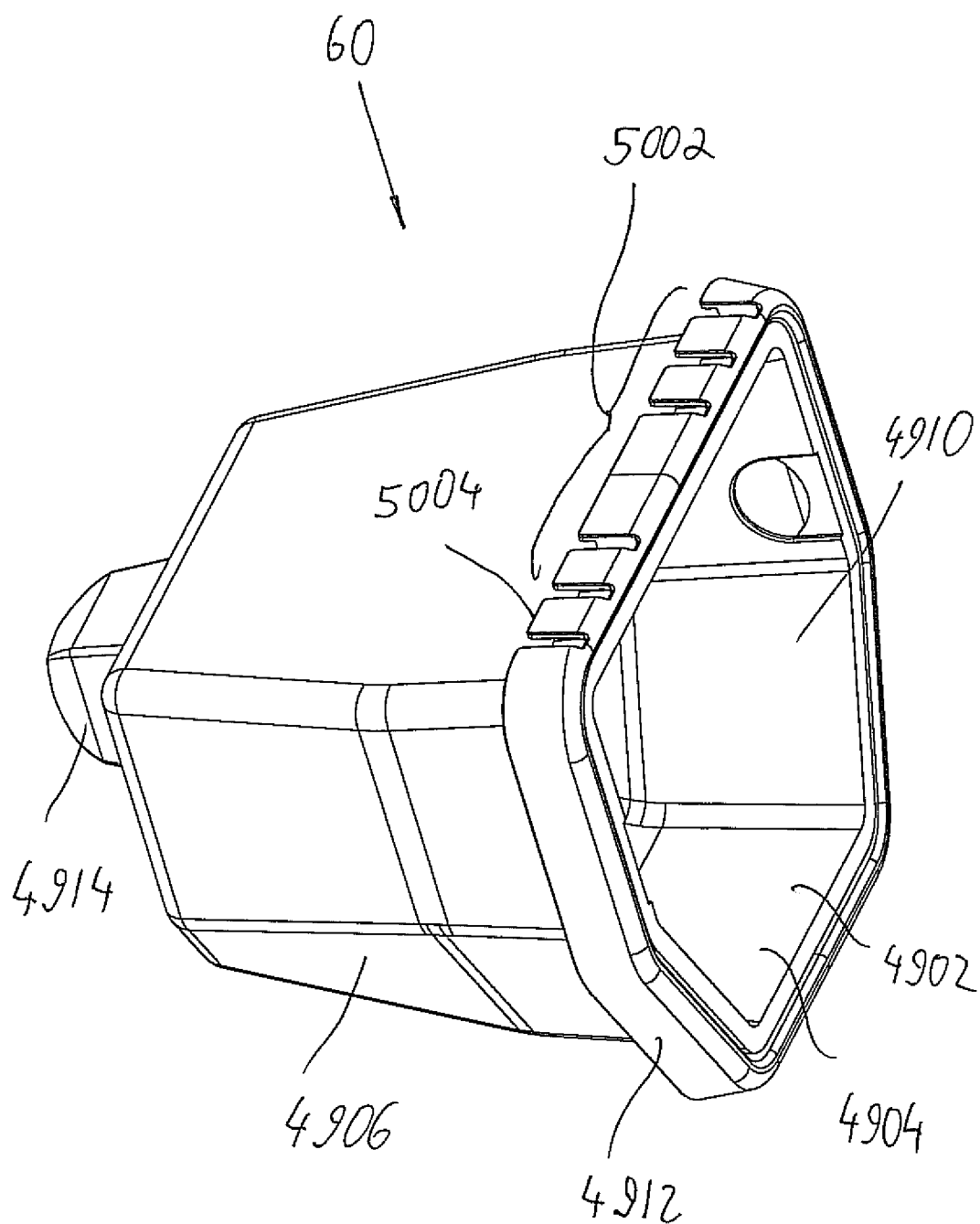

FIG. 50 is a perspective view from another angle of the example side planter assembly illustrated in FIG. 49.

Figure 51:
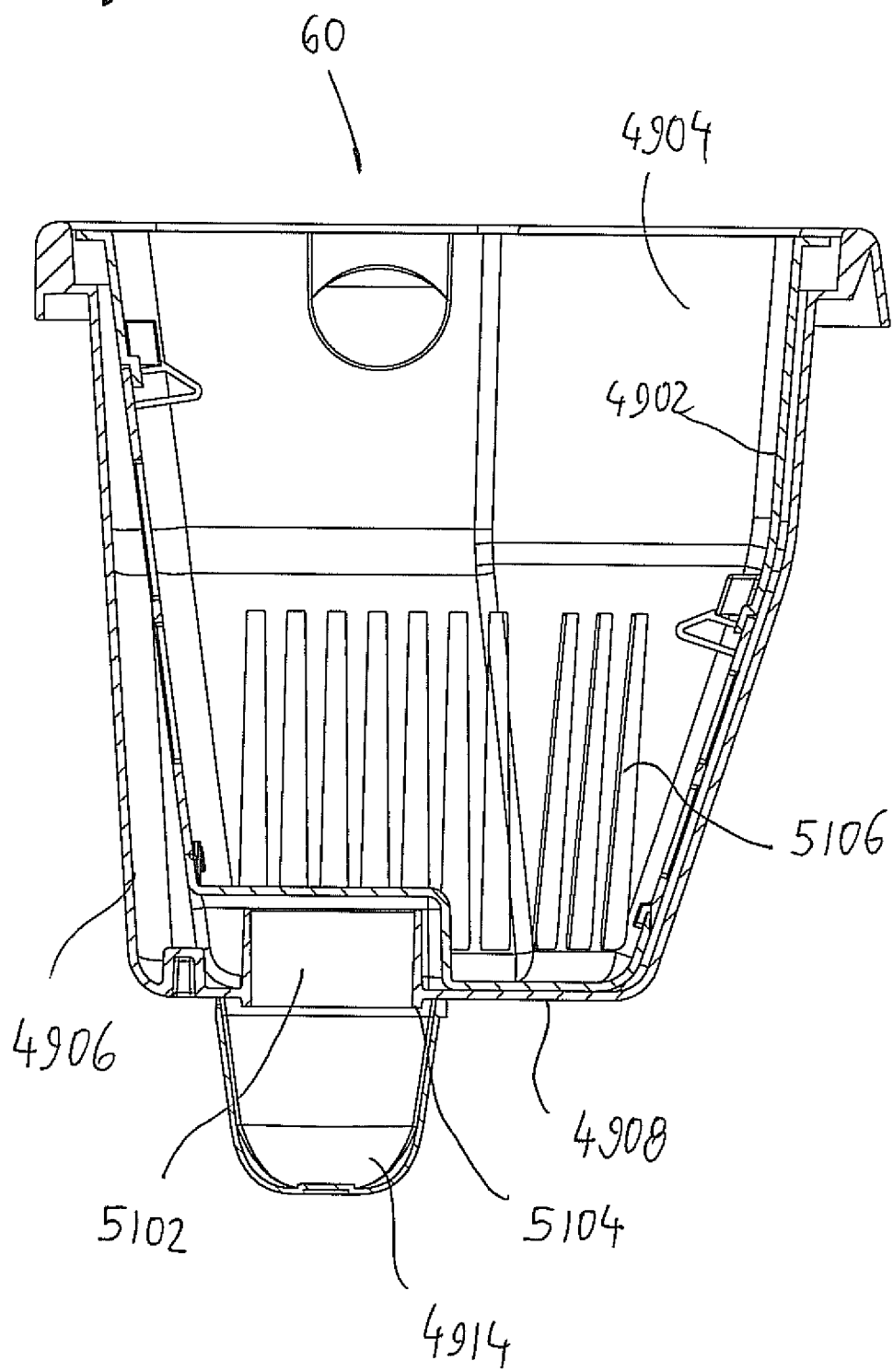

FIG. 51 is a view of a-a cross-section marked in FIG. 49.

Figure 52:
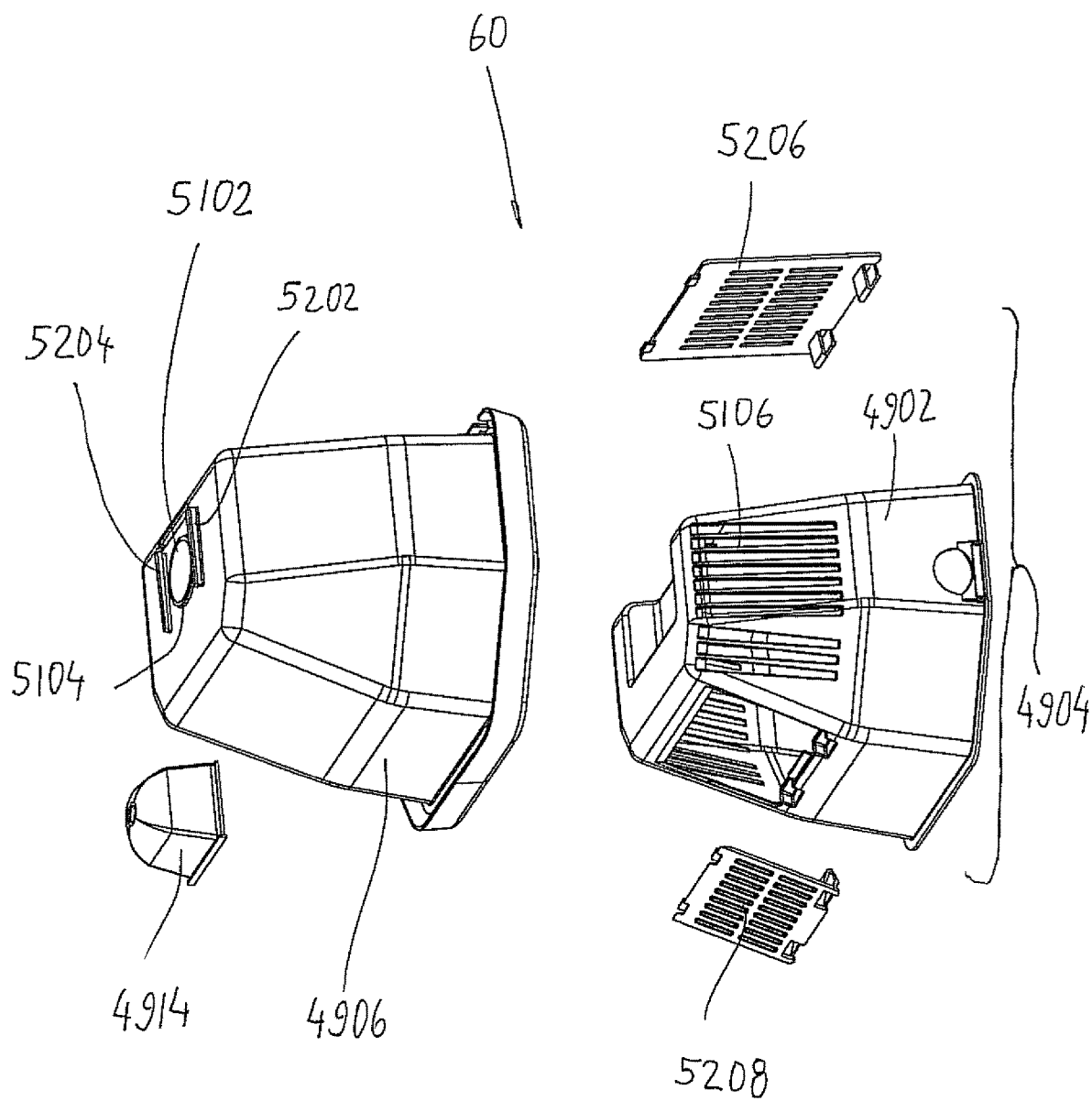

FIG. 52 is an "exploded" perspective view of elements of the example side planter assembly illustrated in FIG. 49.

Figure 53:
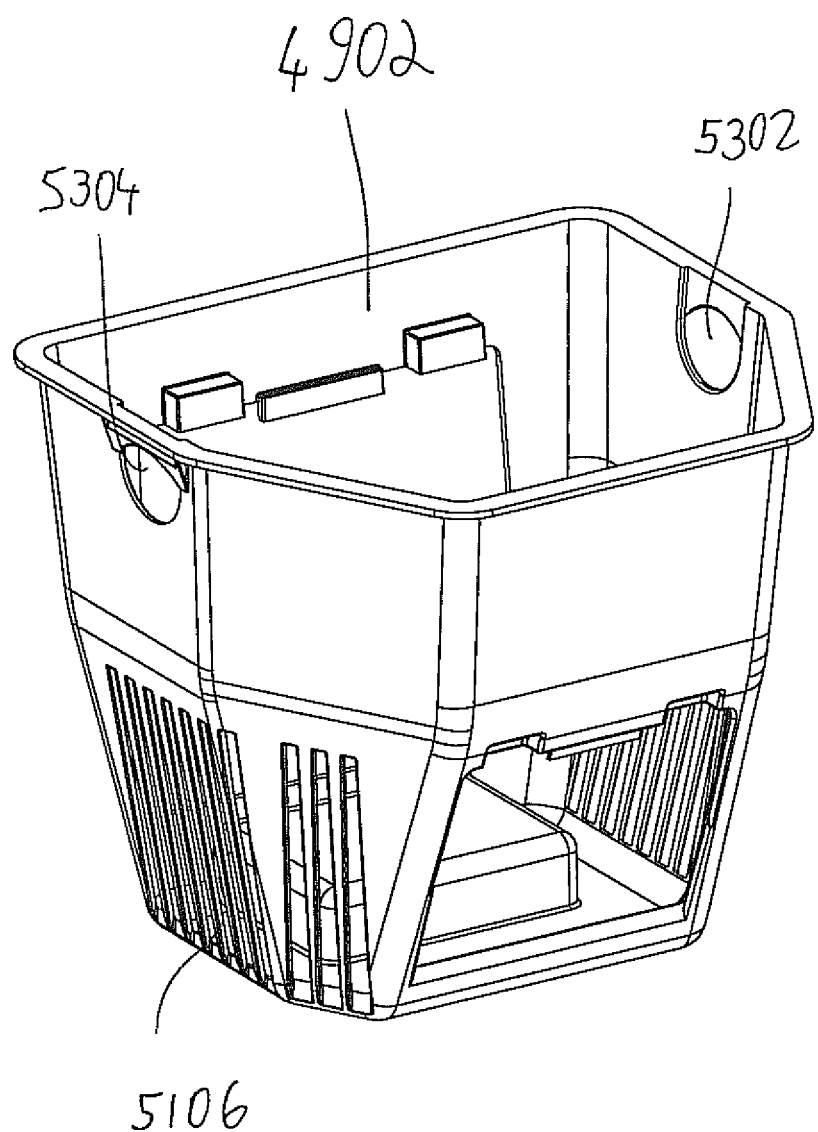

FIG. 53 is a perspective view of a roots accessible basket element that is mounted in the side planter assembly illustrated in FIG. 49.

Figure 54:
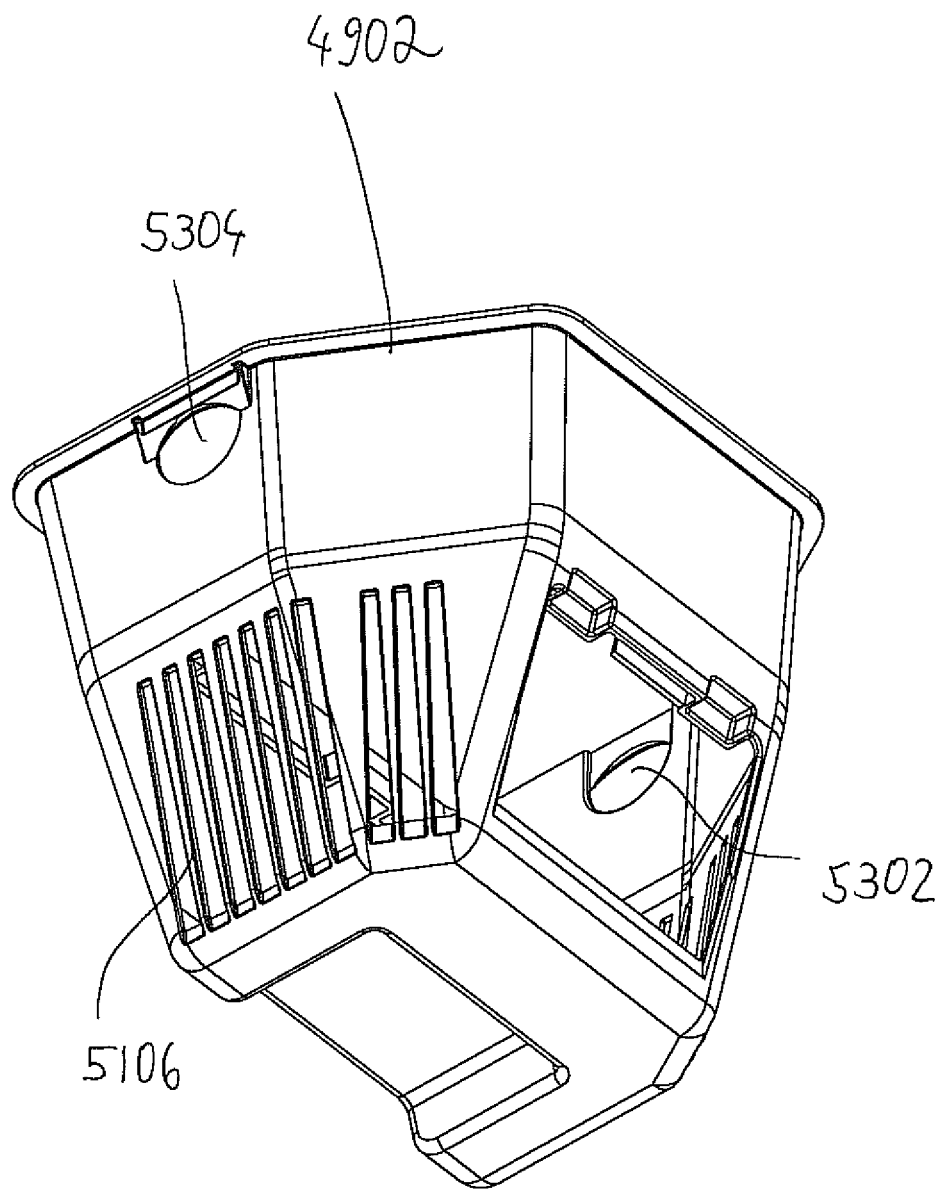

FIG. 54 is a perspective view from another angle of a roots accessible basket element that is mounted in the side planter assembly illustrated in FIG. 49.

Figure 55:
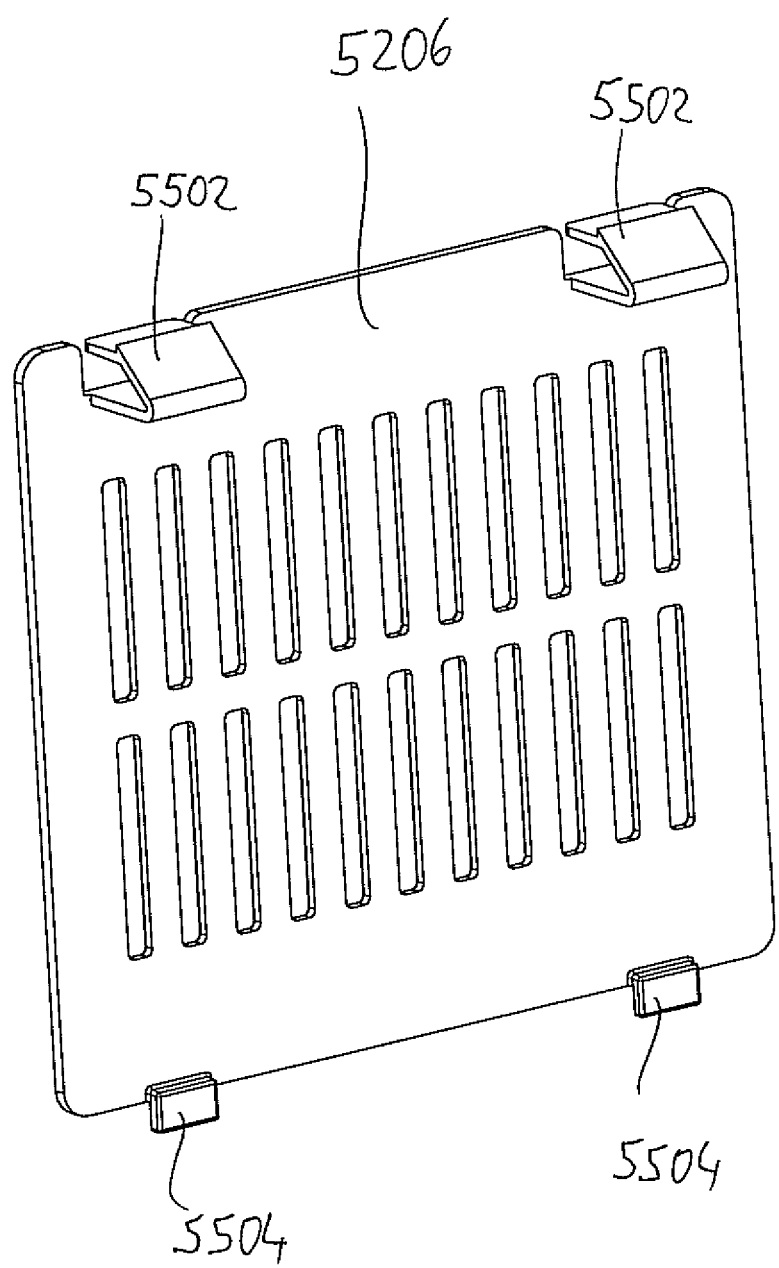

FIG. 55 is a perspective view of one access door mounted in the roots accessible basket element that is mounted in the side planter assembly illustrated in FIG. 49.

Figure 56:
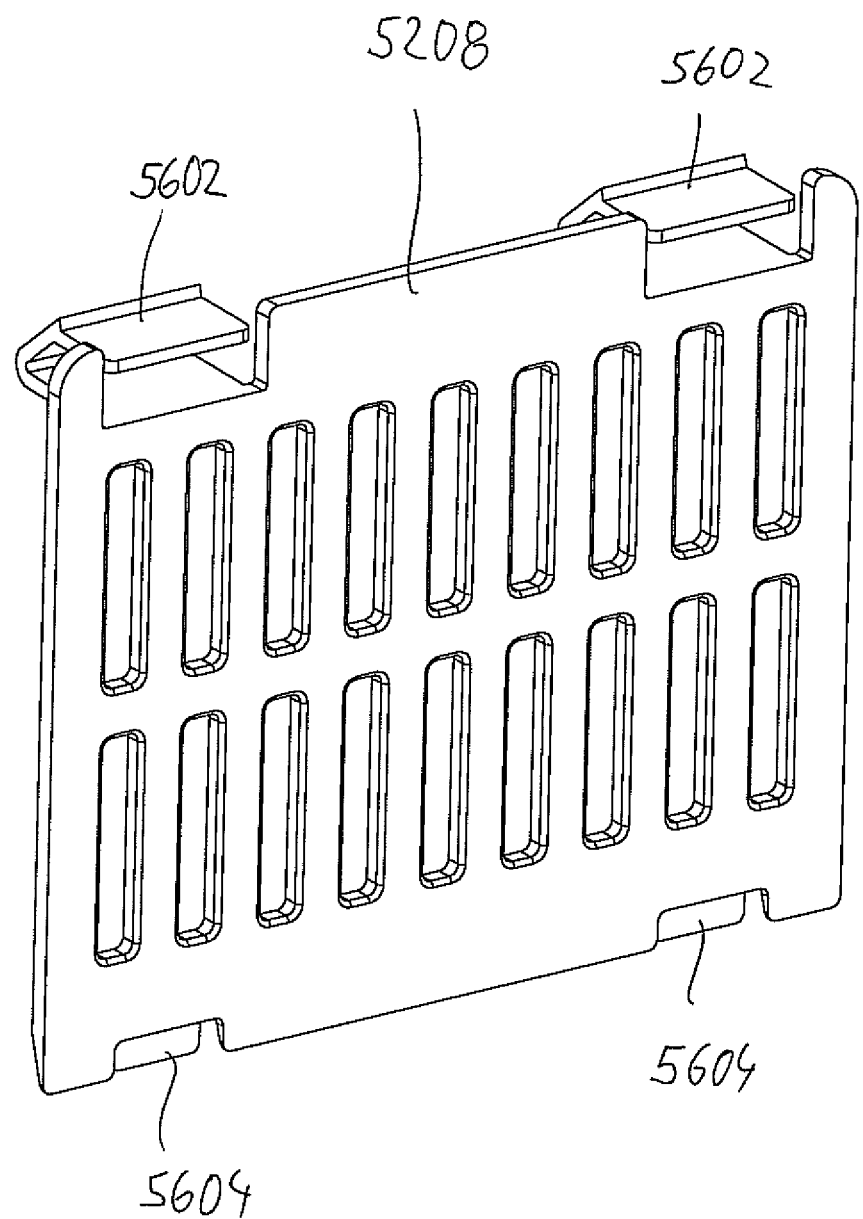

FIG. 56 is a perspective view of a second access door mounted in the roots accessible basket element that is mounted in the side planter assembly illustrated in FIG. 49.

Figure 57:
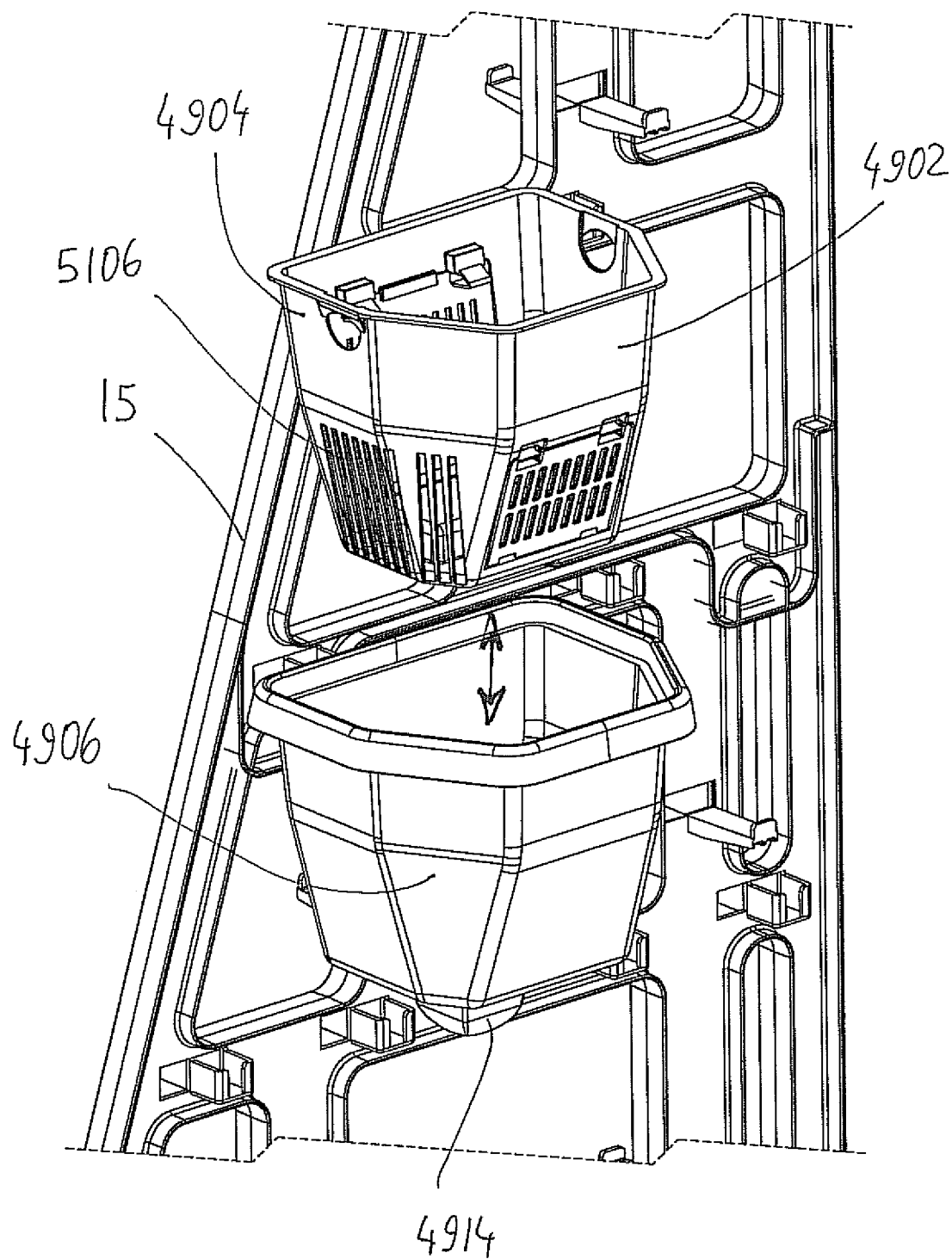

FIG. 57 is a perspective view of a connection of the example side planter illustrated in FIG. 49 in a disassemblable mounting fashion, with the outer side of the support element in a modular multi-tiered planter kit according to the invention, wherein a roots accessible basket assembly is retrievable from the side planter assembly.

Figure 58:
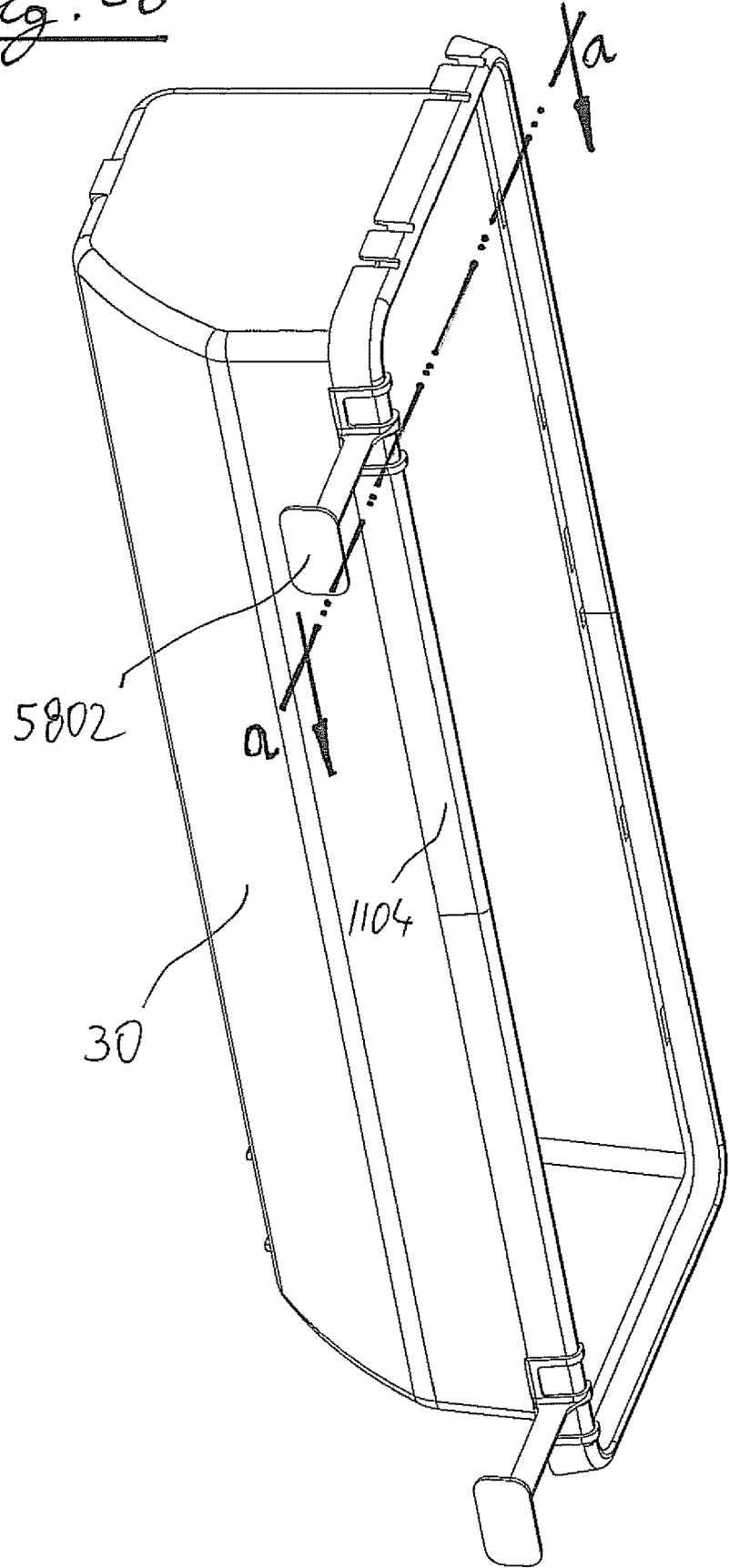

FIG. 58 is a perspective view of connection of an example spacer means, in a disassemblable mounting fashion, on the example unified planter element, which enables positioning the coverage means with a gap from a modular multi-tiered planter kit according to the invention.

Figure 59:
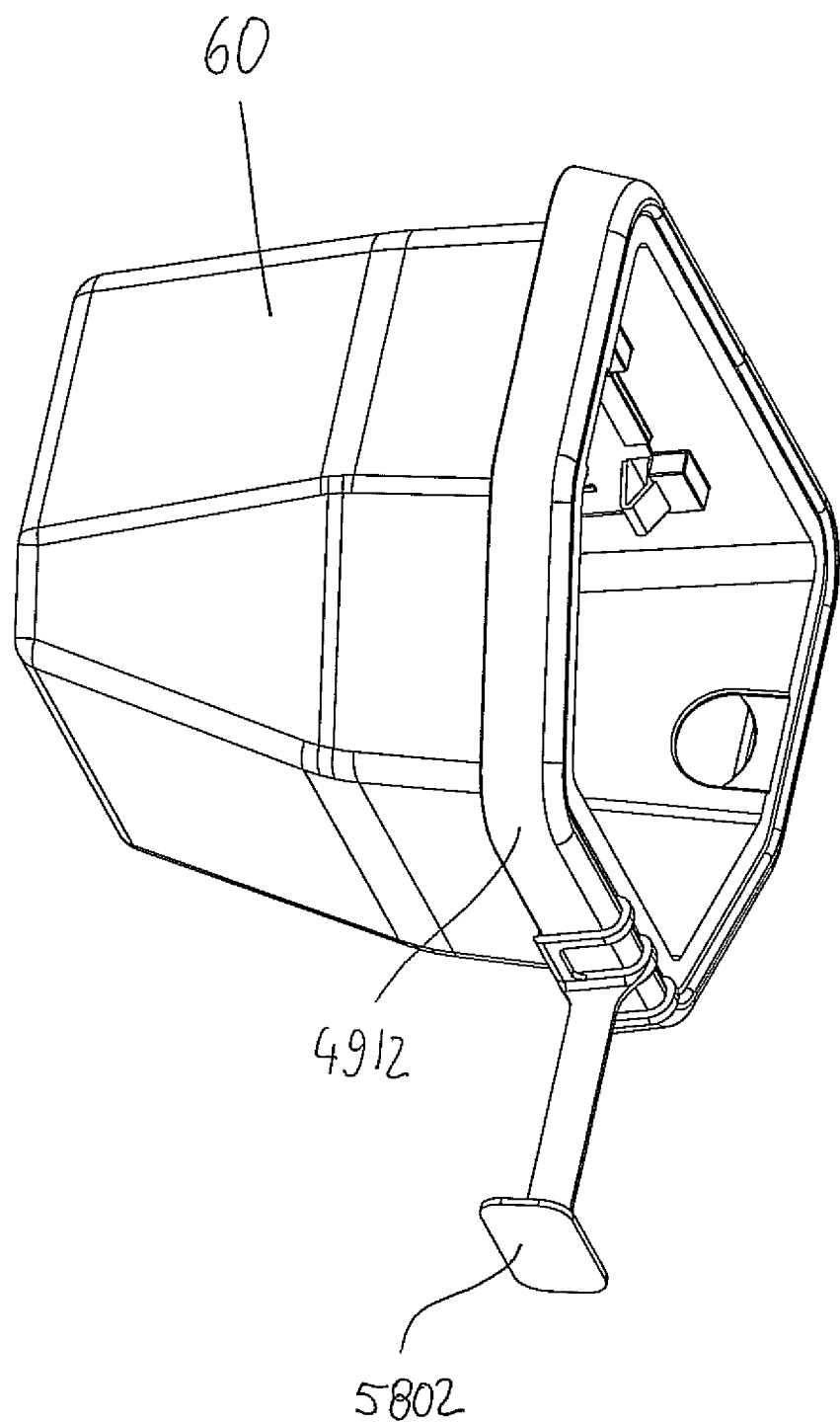

FIG. 59 is a perspective view of a connection of the spacer means illustrated in FIG. 58 in a disassemblable mounting fashion, on a side planter assembly, which as stated, enables positioning the coverage means with a gap from a modular multi-tiered planter kit according to the invention.

Figure 60:
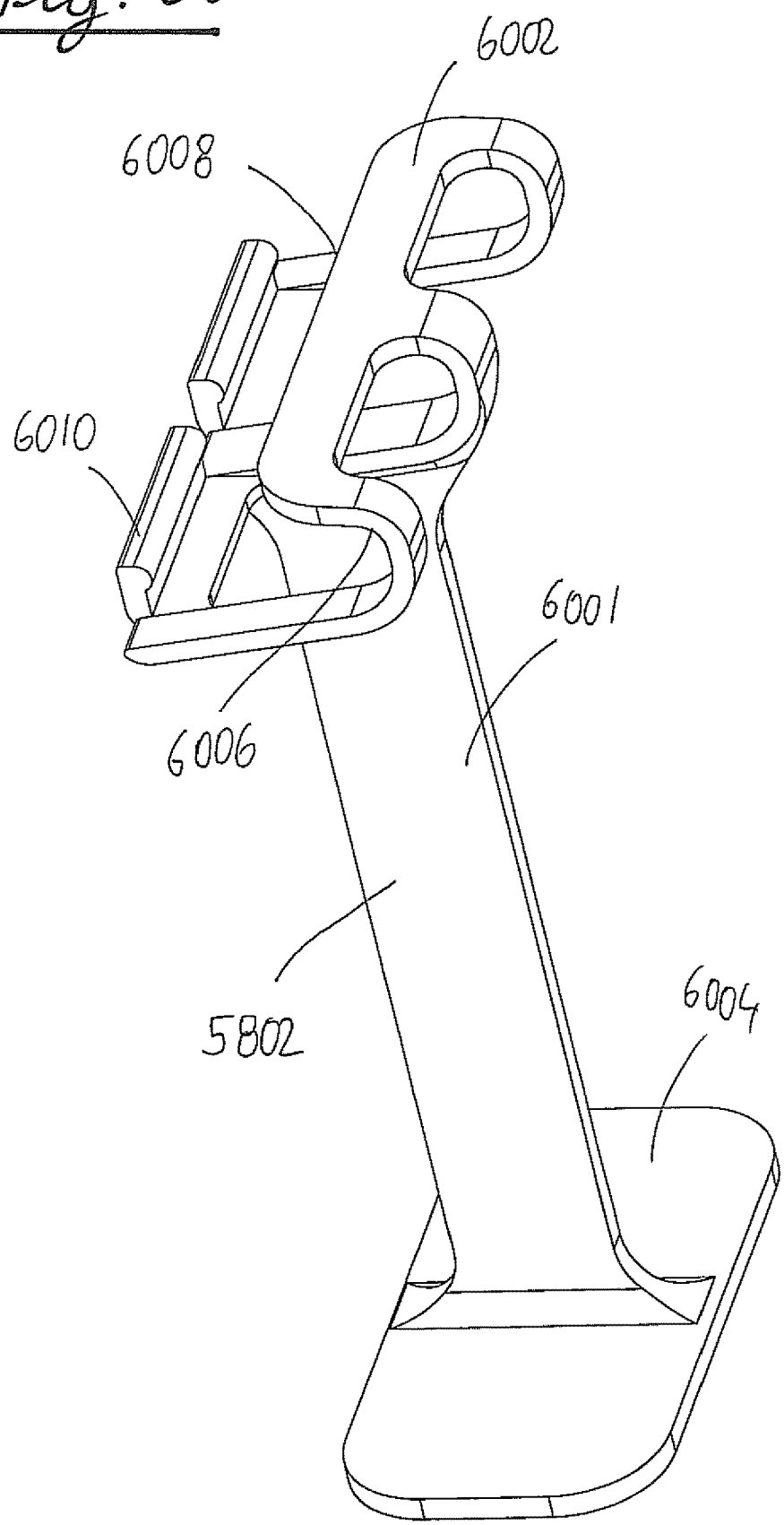

FIG. 60 is a perspective view of an example spacer means used in the mountings illustrated in FIGS. 58 and 59.

Figure 61:
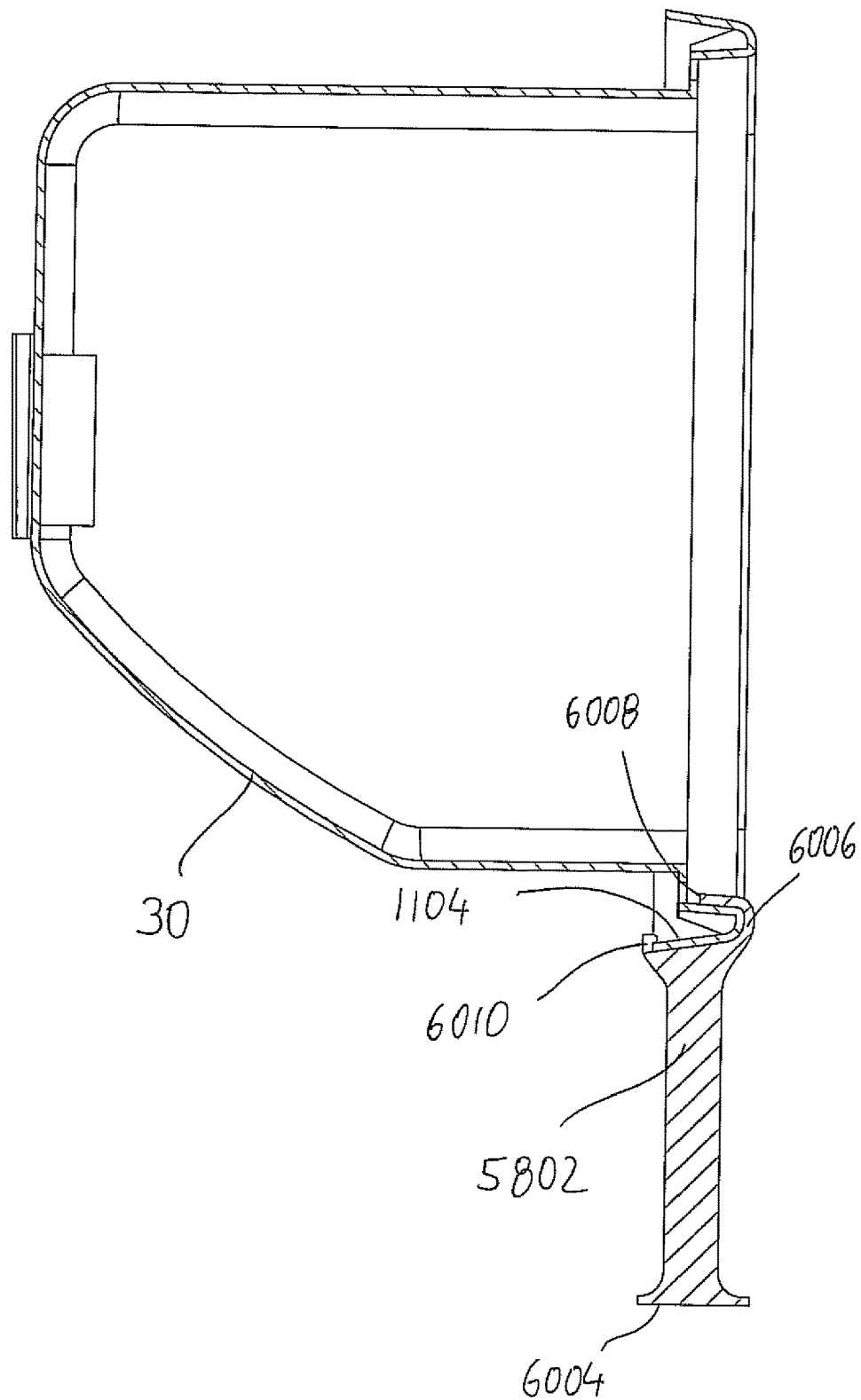

FIG. 61 is a view of a-a cross-section marked in FIG. 58.

Figure 62:
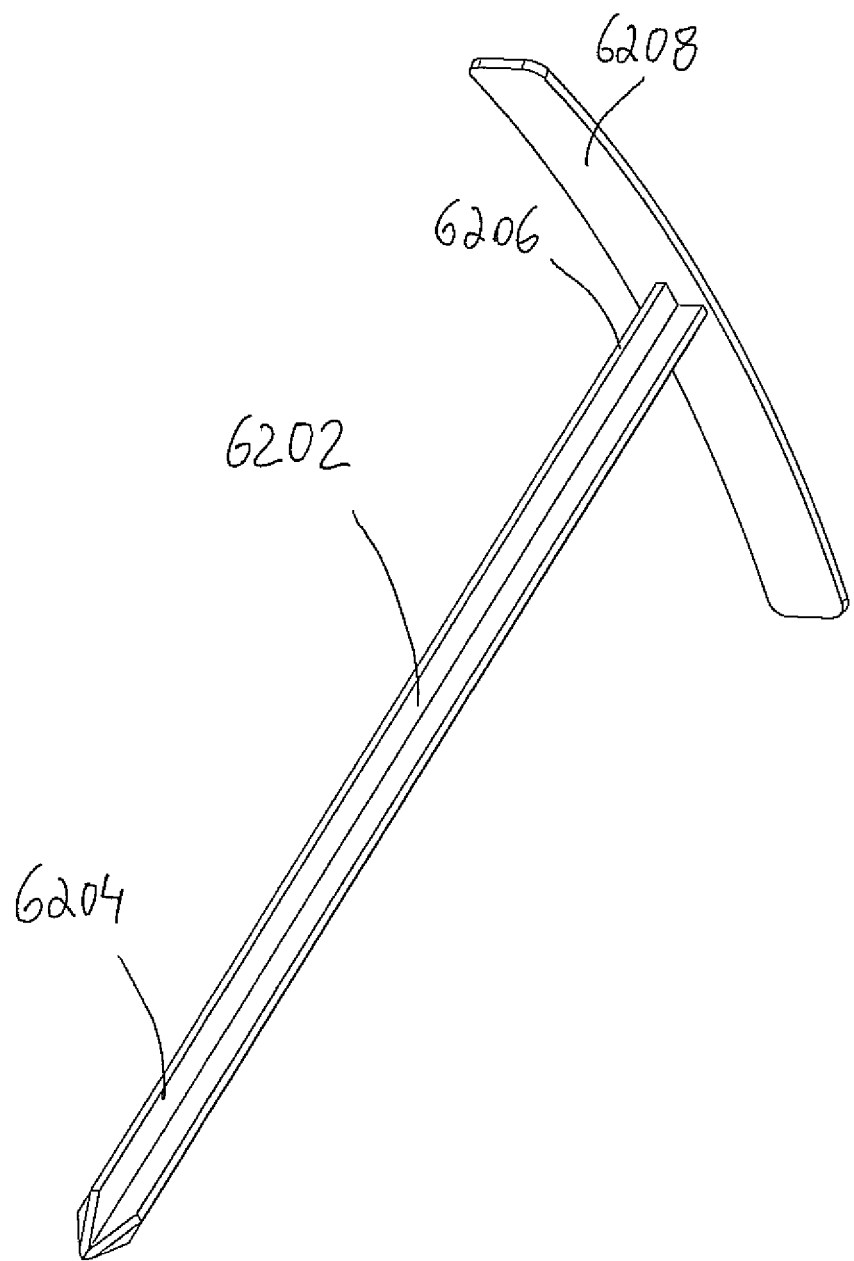

FIG. 62 is a perspective view of a second example of a spacer means that is fitted for mounting by staking as a peg into a growth substrate, which is comprised in a unified planter element or in a side planter assembly, thereby enabling positioning coverage means with a gap from a modular multi-tiered planter kit according to the invention.

Figure 63:
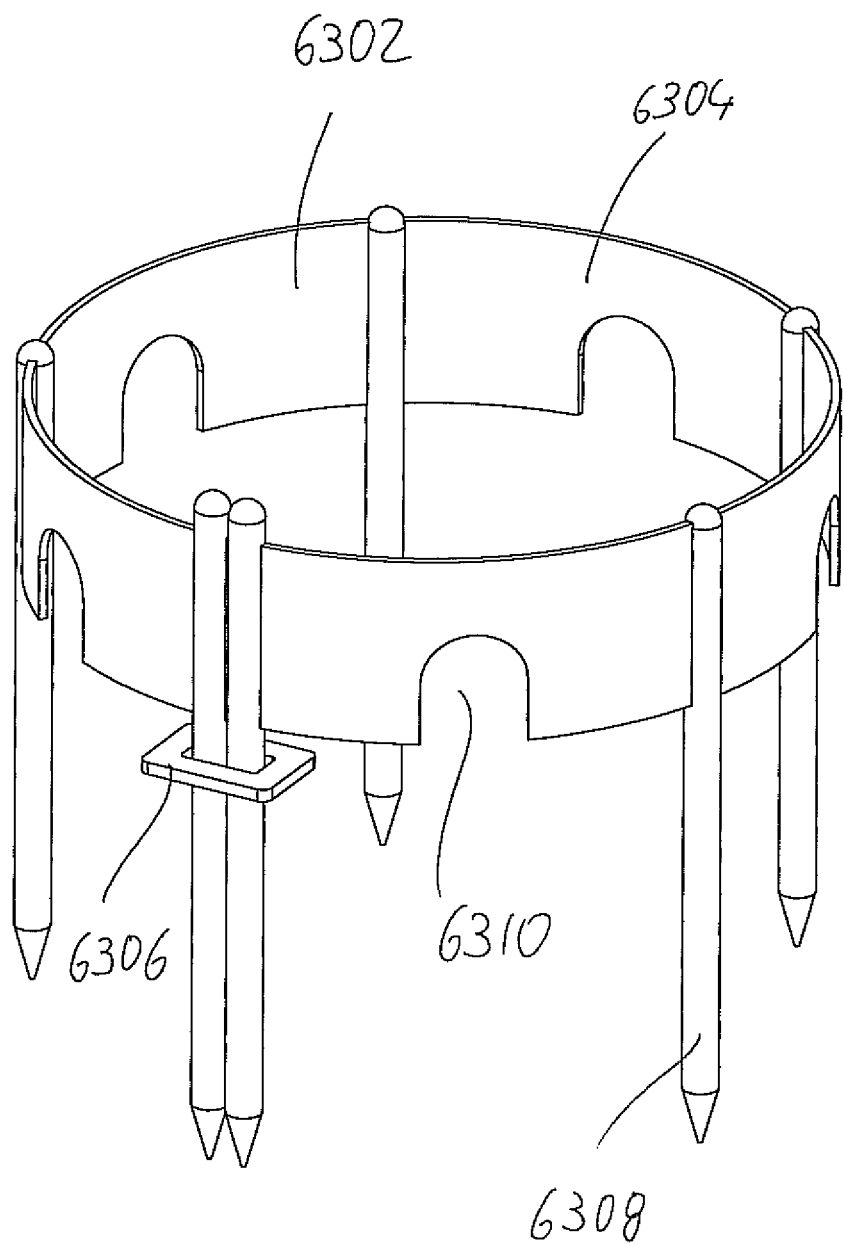

FIG. 63 depicts a perspective of an example delimitation means for delimitating a plant in a planter mounted in a modular multi-tiered planter kit according to the invention and routing an irrigation pipe, when it is assembled.

Figure 64:
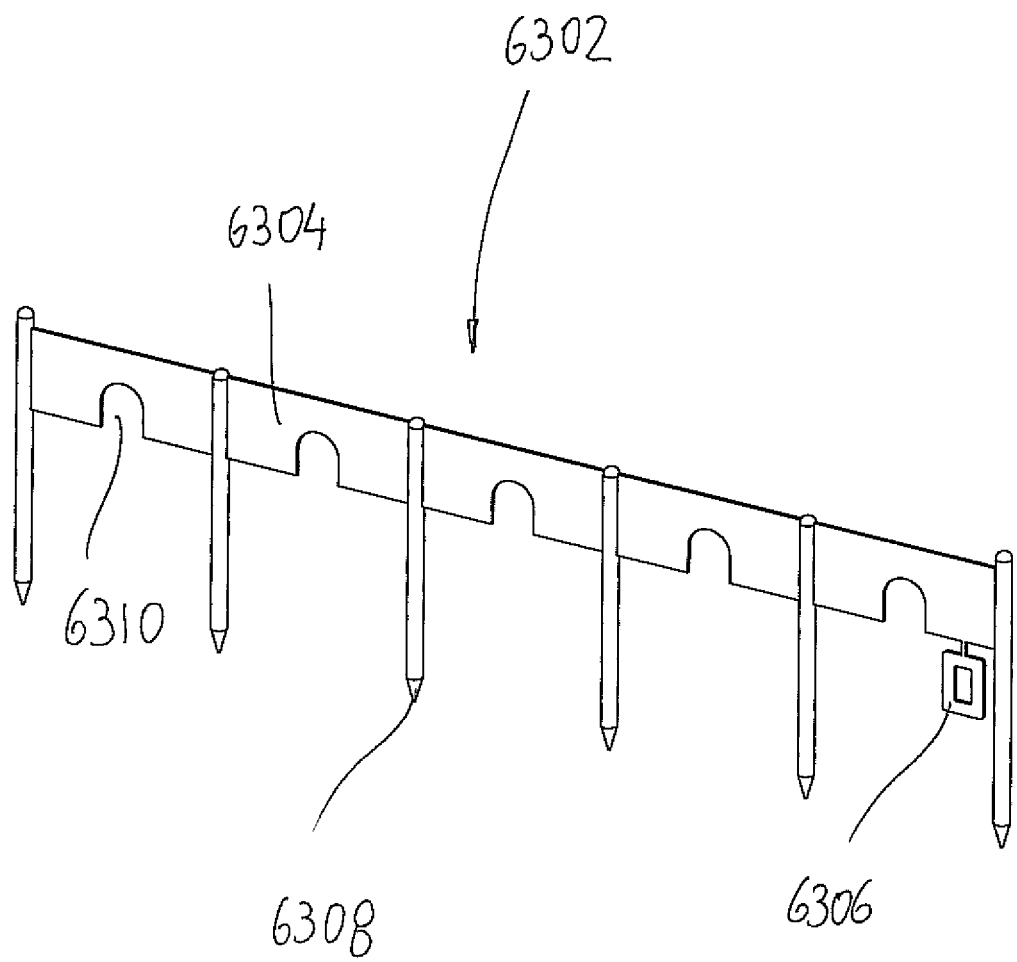

FIG. 64 is a perspective view of a delimitation and routing of the irrigation pipe means illustrated in FIG. 63, before it is assembled.

Figure 65:
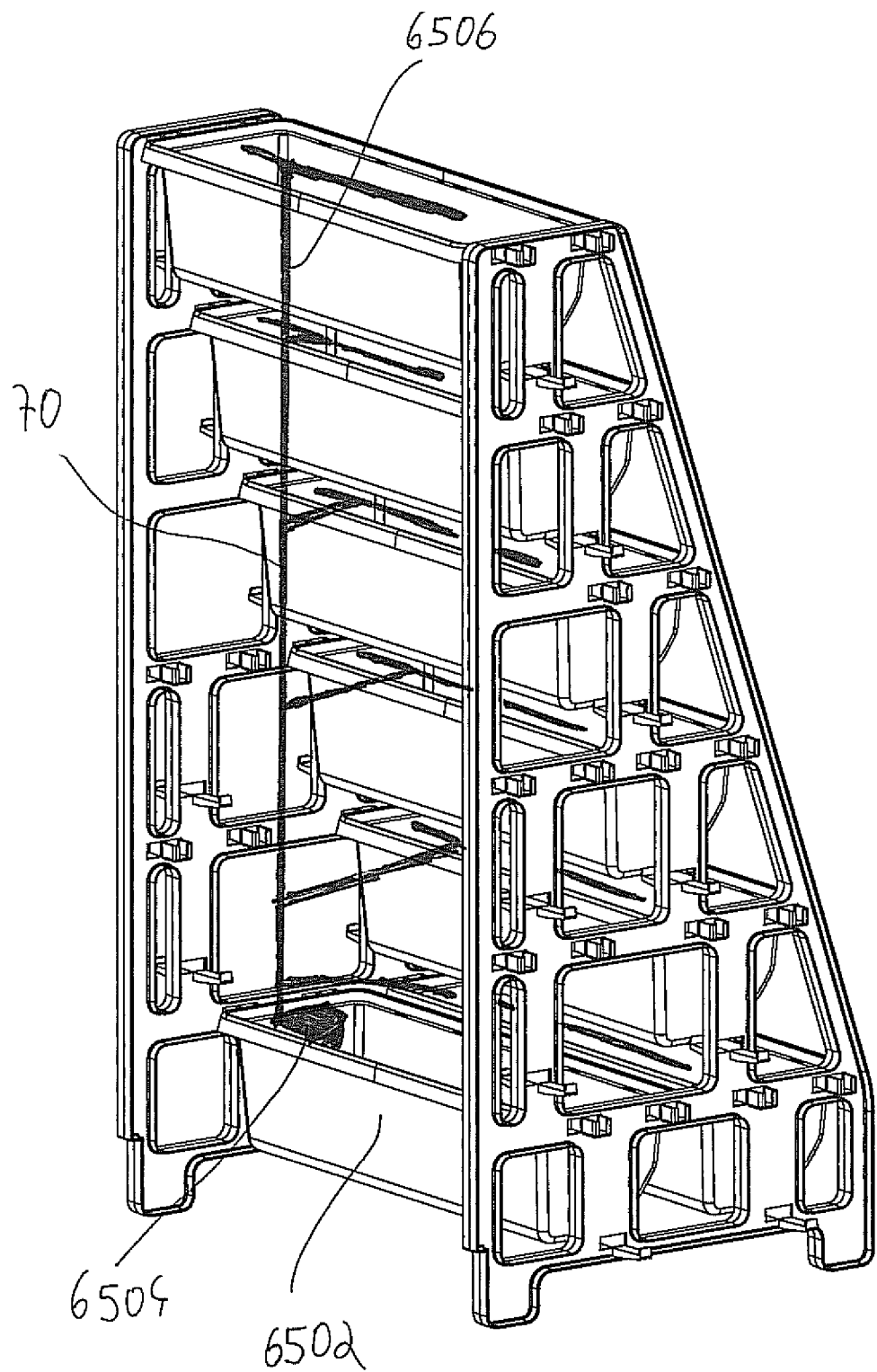

FIG. 65 is a perspective view of a modular multi-tiered planter kit according to the invention, which also comprises an irrigation system for the planter assemblies mounted in it.

Figure 66:
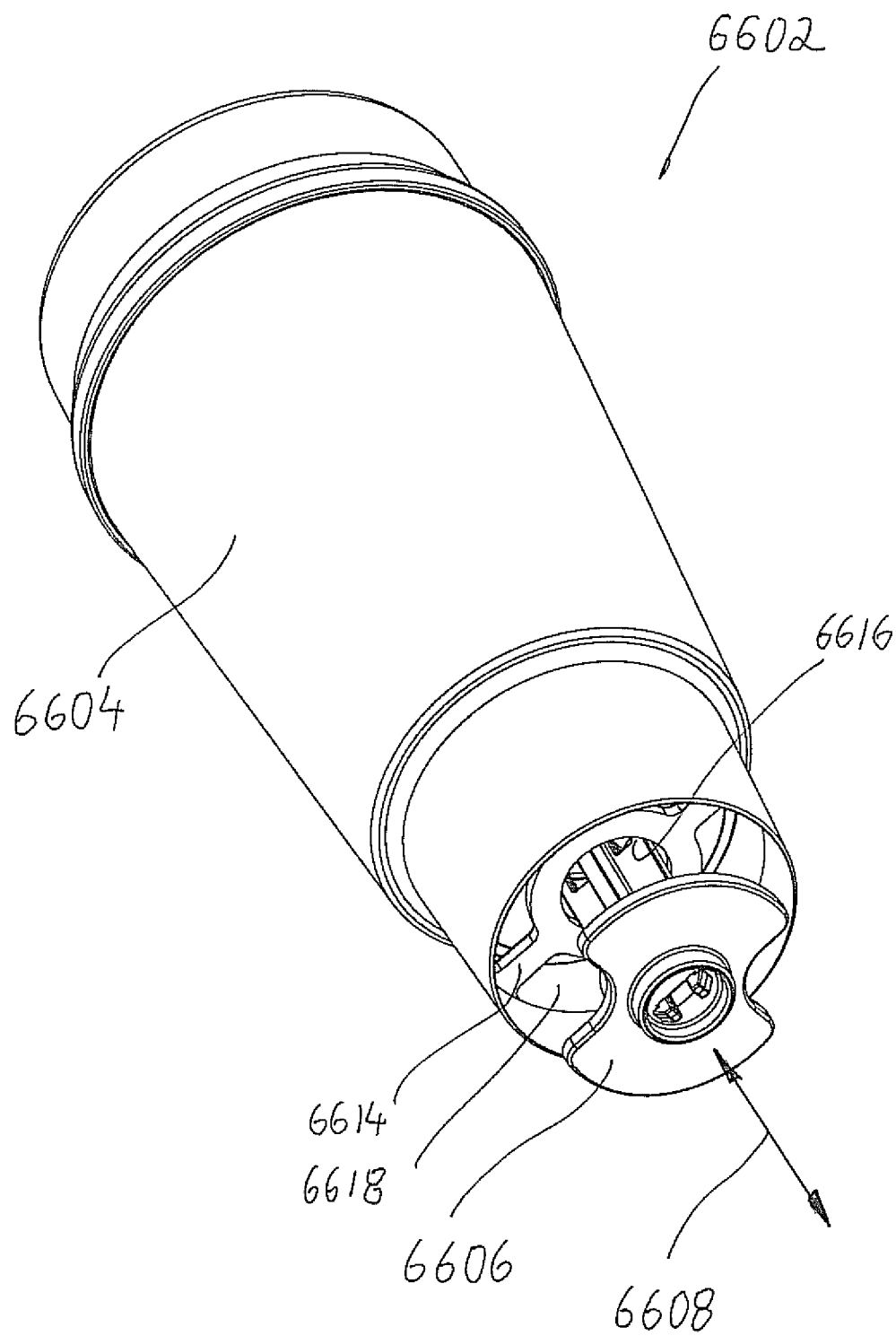

FIG. 66 is a perspective view of a water bottle that may be mounted, for example, in a modular multi-tiered planter kit according to the invention, in the said second-type, third-type and fourth-type planter assemblies, and comprises a mechanism that enables turning the bottle completely upside down, as needed to mount it, without water leaking from it, and it opens by itself to the passage of water from it, once it is mounted.

Figure 66A:
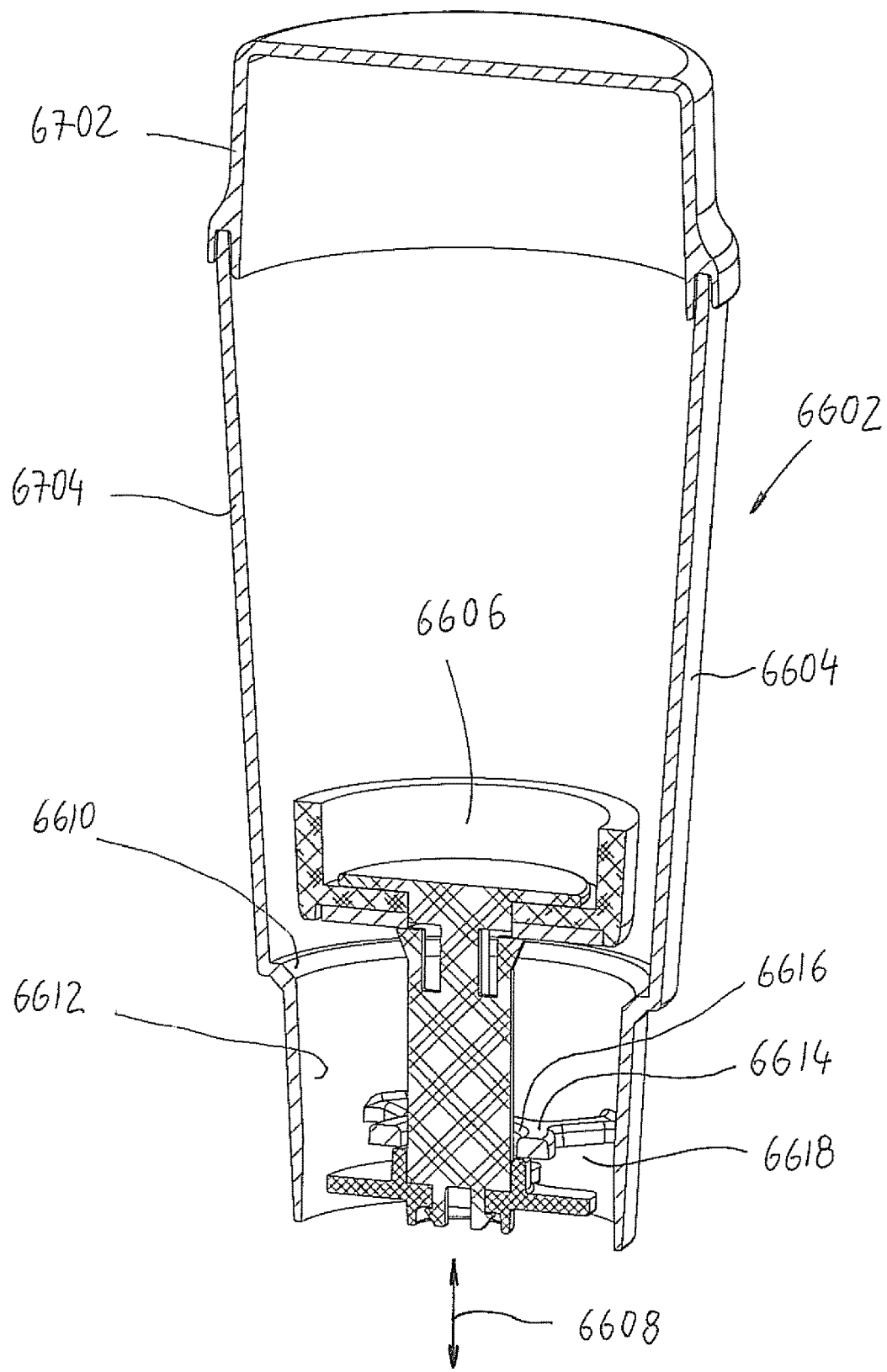

FIG. 66a is a cross section view of the water bottle illustrated in FIG. 66.

Figure 67:
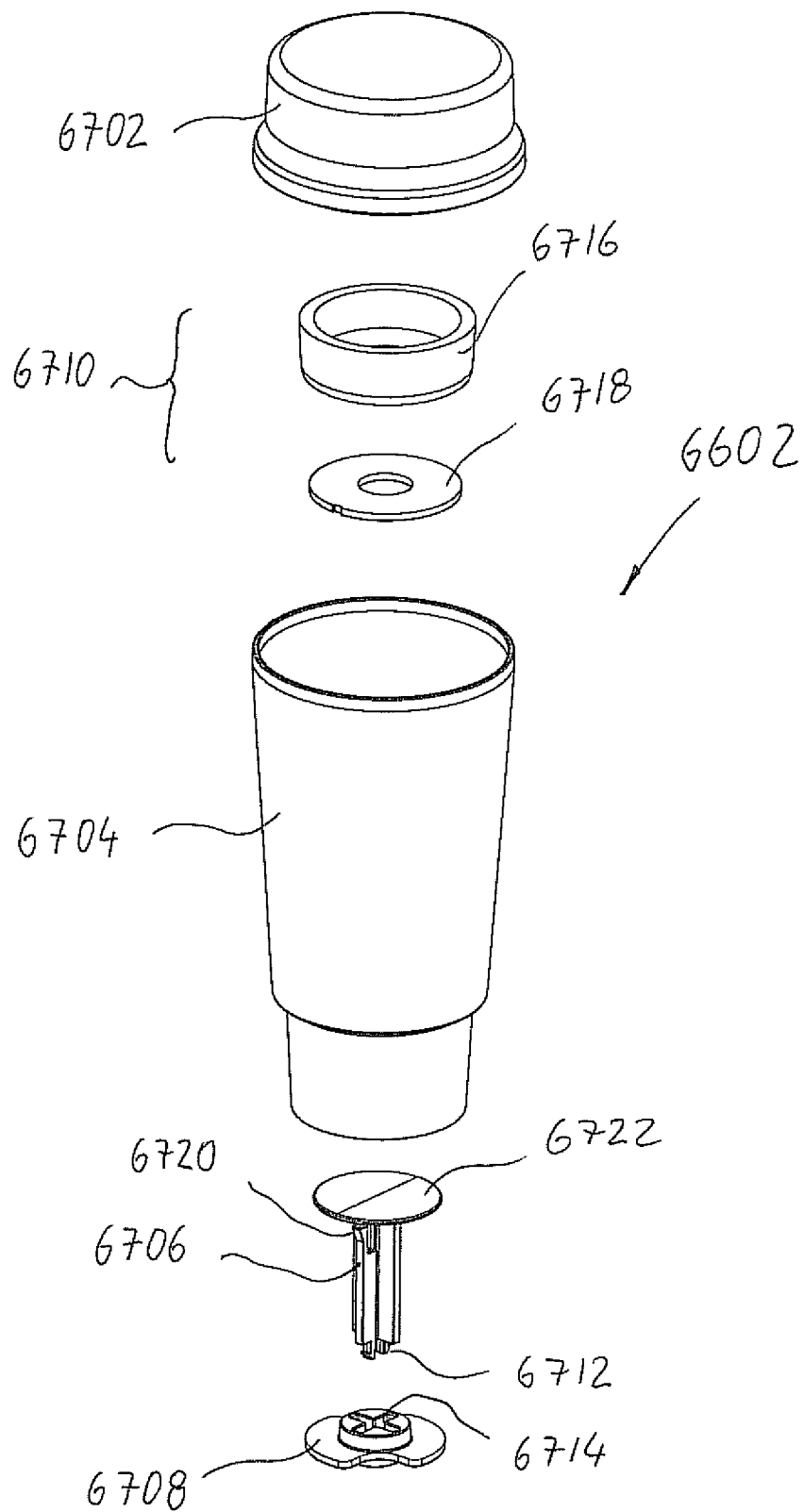

FIG. 67 is an "exploded" perspective view of elements of the example bottle illustrated in FIG. 66.

Figure 68:
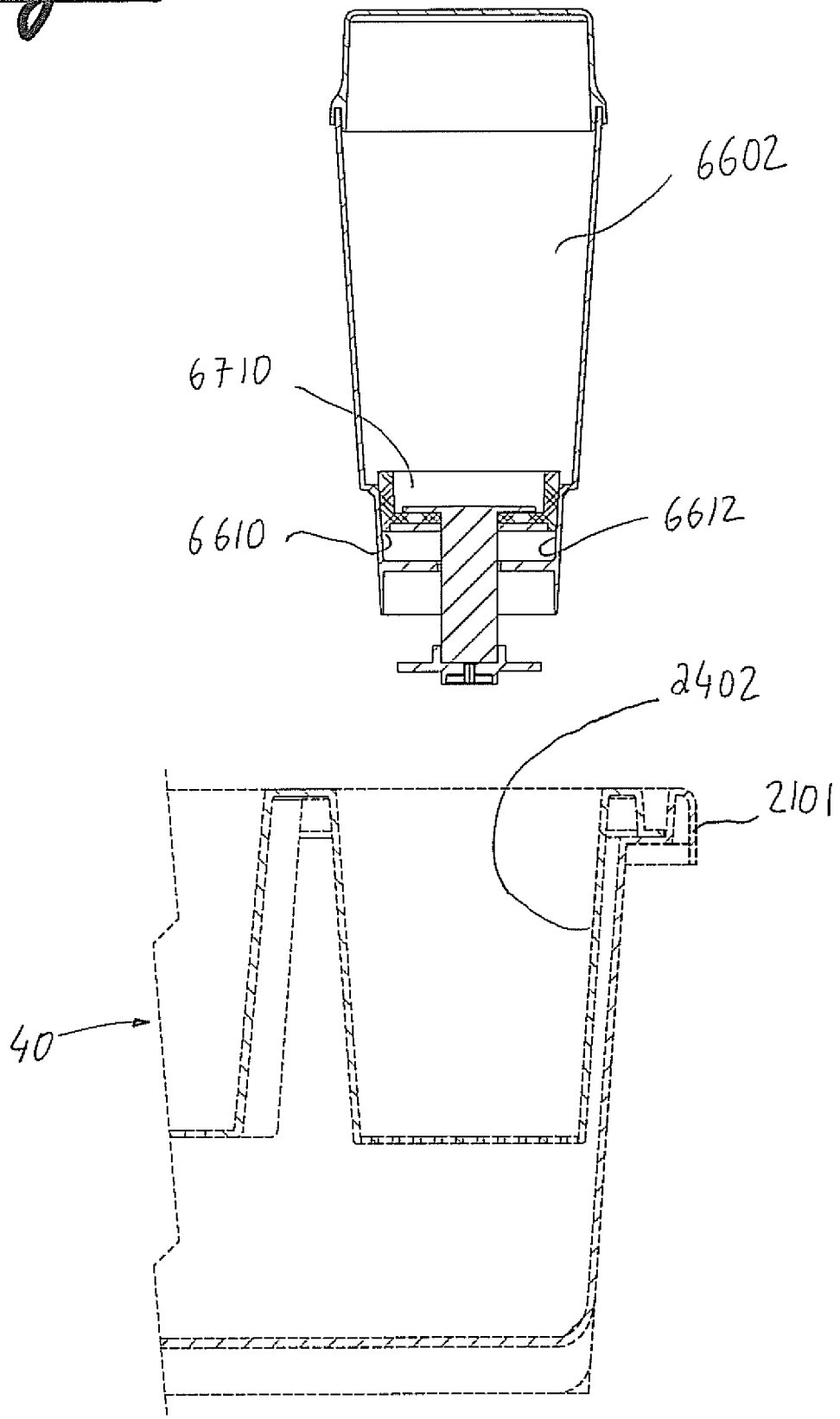

FIG. 68 is a (partial) cross-section view that depicts placing a bottle according to FIG. 66, before it is mounted, for example, in a second-type planter assembly (the assembly illustrated in FIGS. 21-27), without water leaking from it.

Figure 69:
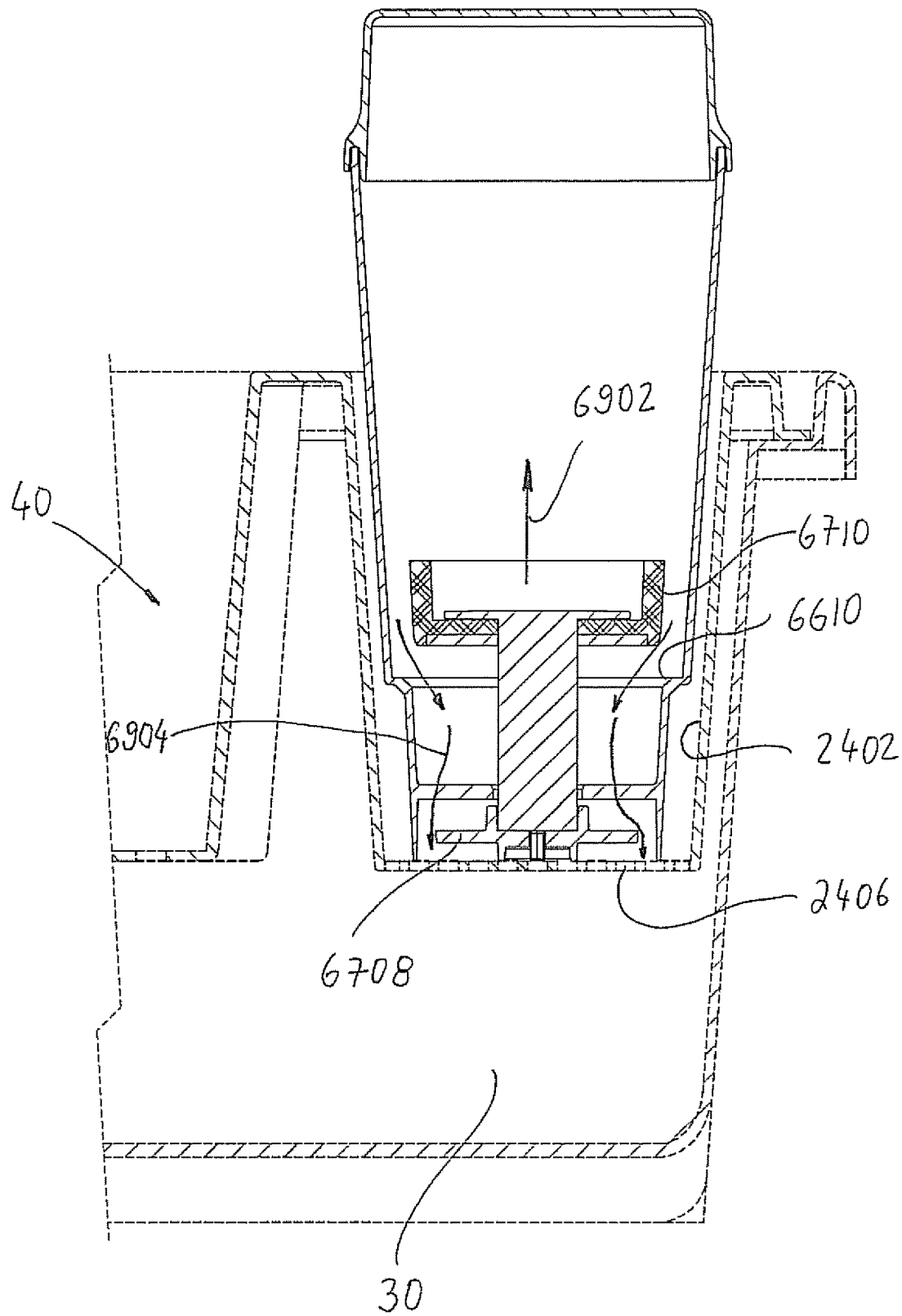

FIG. 69 is a (partial) cross-section view that depicts the mounting of a bottle according to FIG. 66, for example, in a second-type planter assembly (the assembly illustrated in FIGS. 21-27), in a way that provide for it self-opening for water passage from it.

Figure 69A:
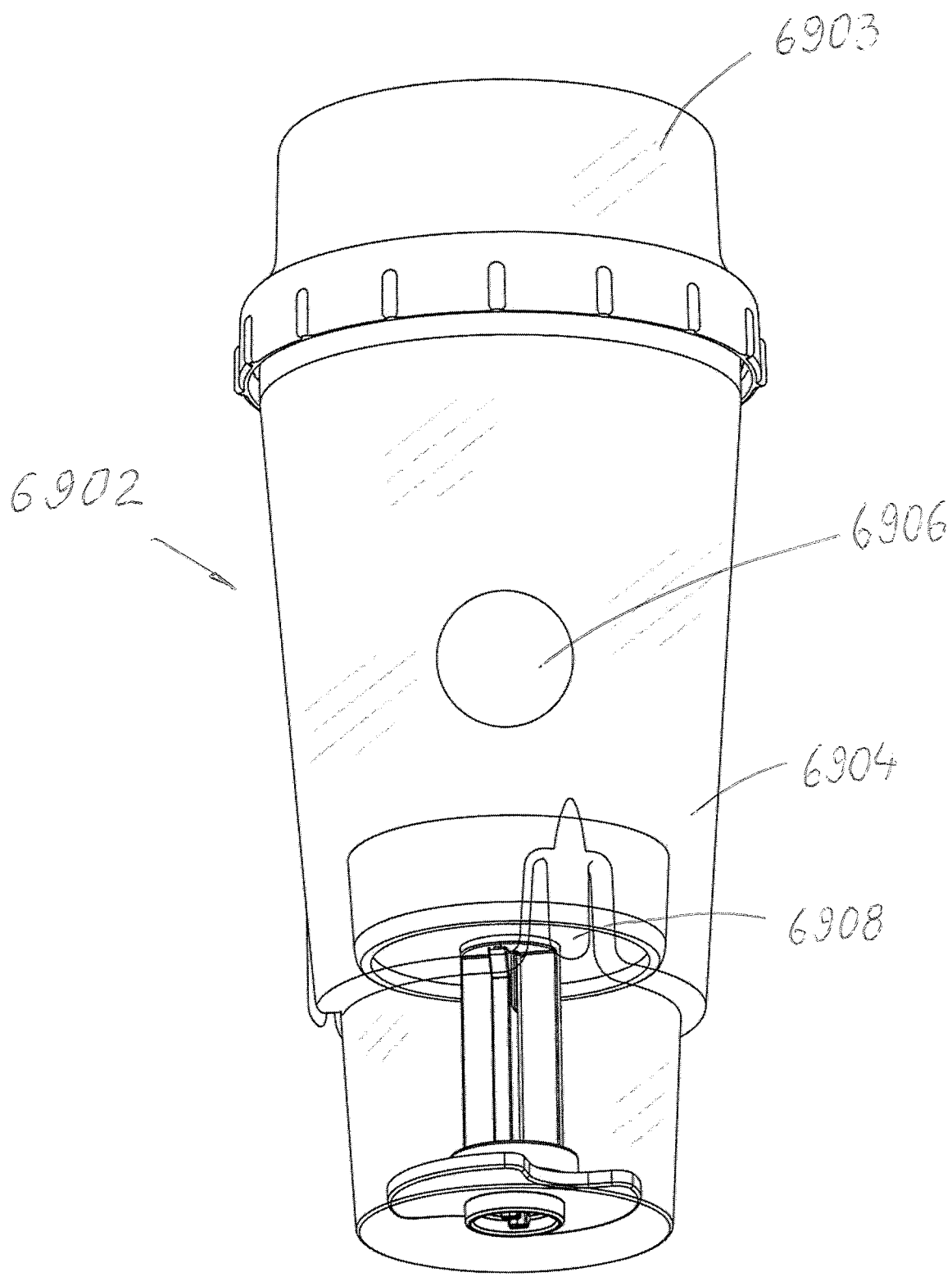

FIG. 69a is a perspective view of an additional version of a water bottle that may be mounted, for example, in a modular multi-tiered planter kit according to the invention.

Figure 69B:
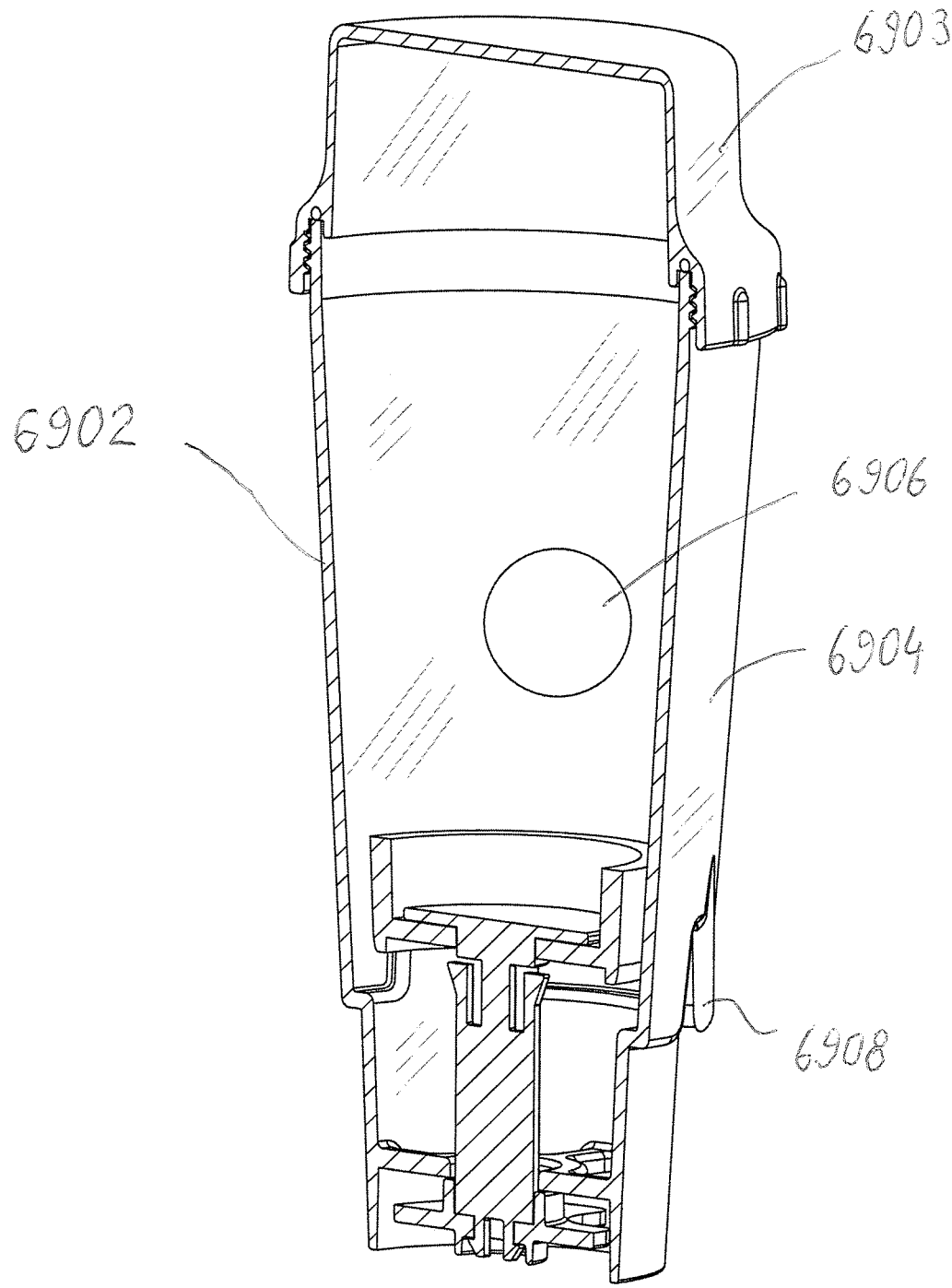

FIG. 69b is a cross section view of the water bottle illustrated in FIG. 69a.

FIG. 69c is an "exploded" perspective view of elements of the example bottle illustrated in FIG. 69a.

Figure 70:
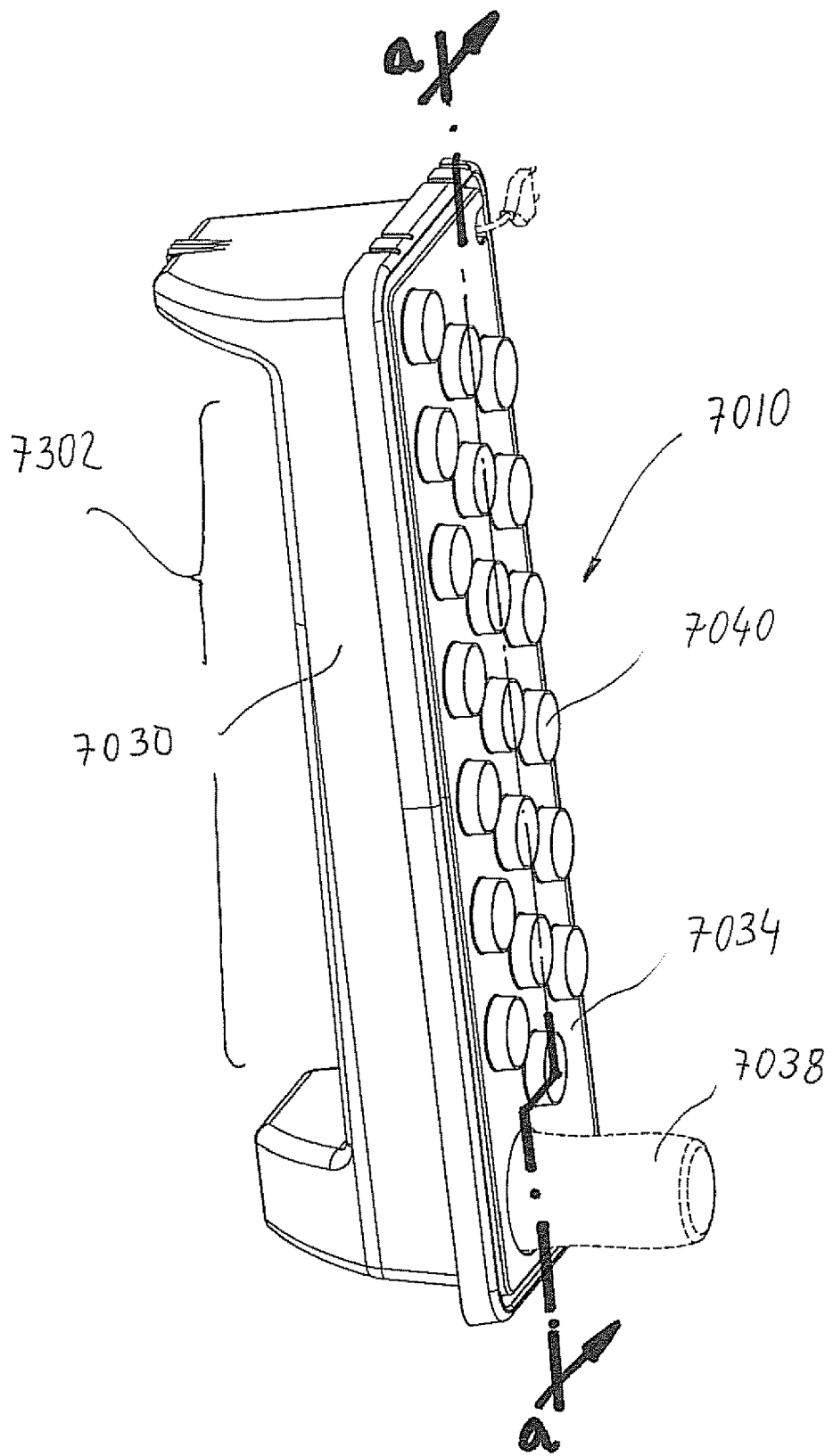
Figure 71:
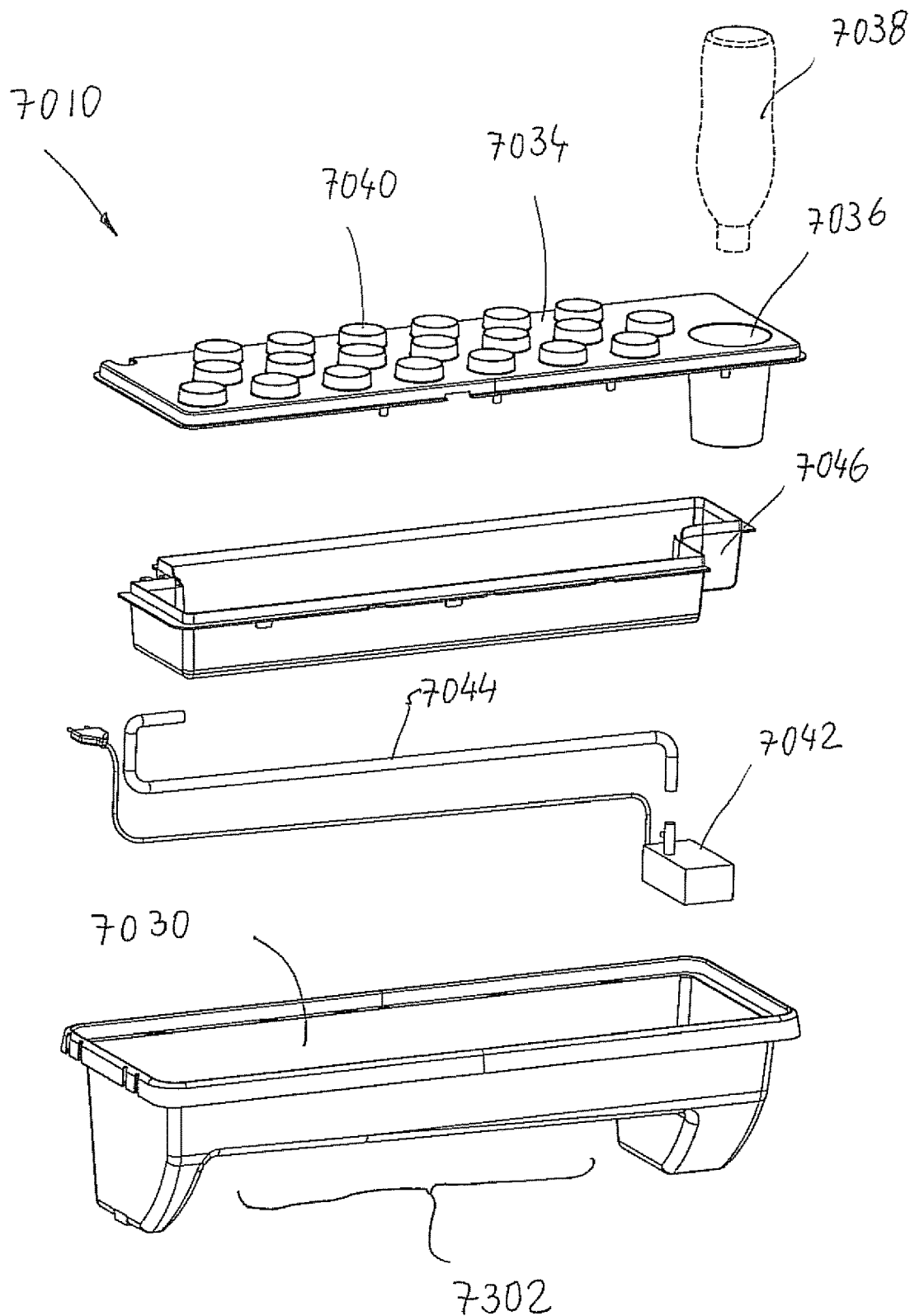

FIG. 70 is a perspective view of one example of a sixth-type planter assembly, which is fitted for connection in a disassemblable fashion, in modular multi-tiered planter kit according to the invention FIG. 71 is an "exploded" perspective view of elements of the planter assembly illustrated in FIG. 70.

Figure 72:
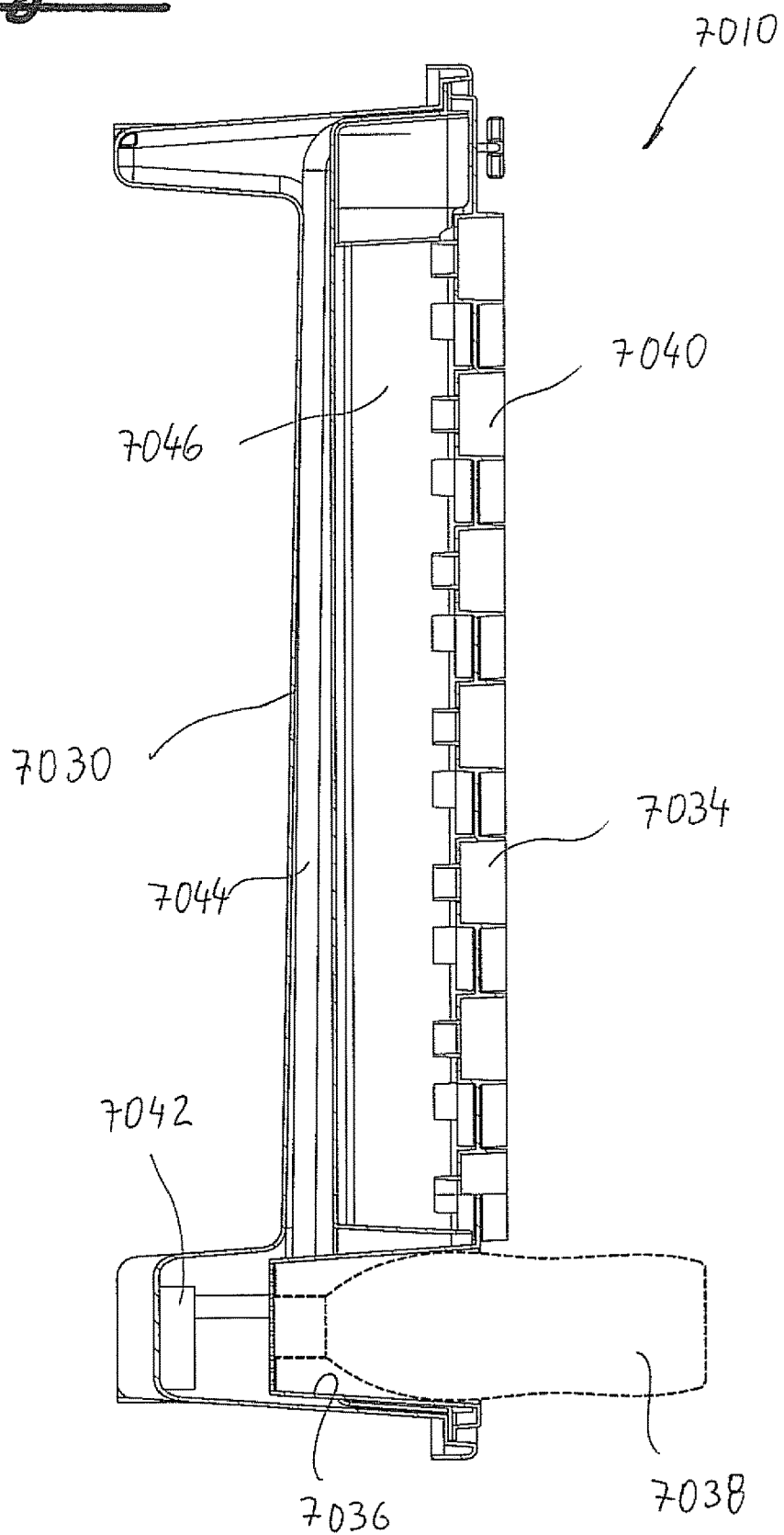

FIG. 72 is a view of a-a cross-section marked in FIG. 70.

DETAILED DESCRIPTION OF PREFERRED EMBODIMENTS

Various devices and elements will be described below strictly for the purpose of providing examples of embodiments of the claimed invention. The embodiments described below does not limit the claimed invention, and the latter may apply to different apparatuses than those described below. The claimed invention does not have to include all aspects of the apparatuses, elements and methods described below, and is not strictly limited to those that exist in all the embodiments described below. For the sake of completeness, it should be noted that the set of claims on the invention may be revised by way of amendment and/or by filing a divisional application. The skilled person will also understand that, for the sake of clarity, the embodiments are described without delving into a lengthy description of elements, methods and processes that are already basic principles in the field and for which no tagged reference was provided in the figures.

Figure 1:
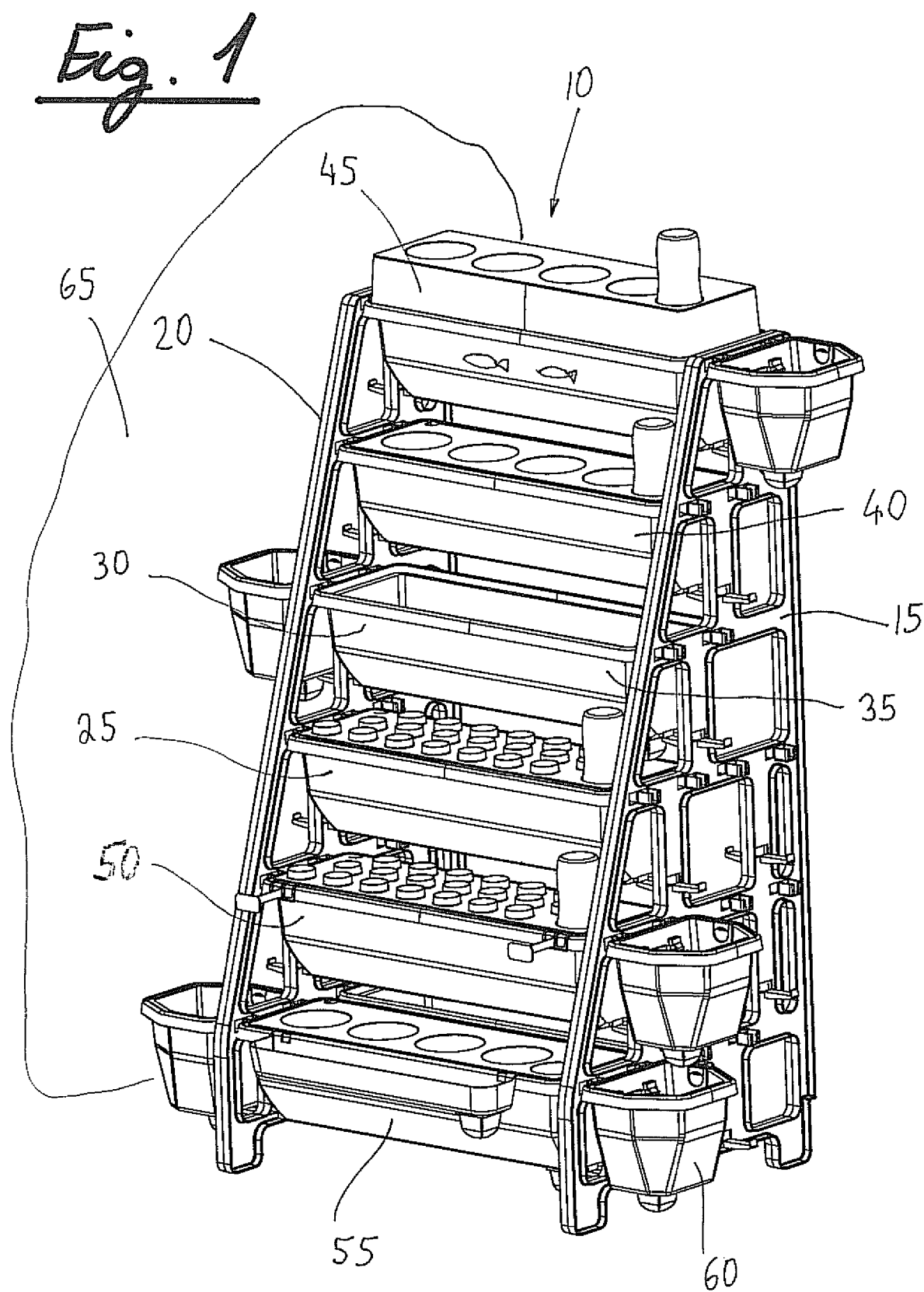
FIG. 1 is a perspective illustration of a mounted (assembled) example of a modular multi-tiered planter kit according to the invention, and contains growth substrates and plants.
Figure 2:
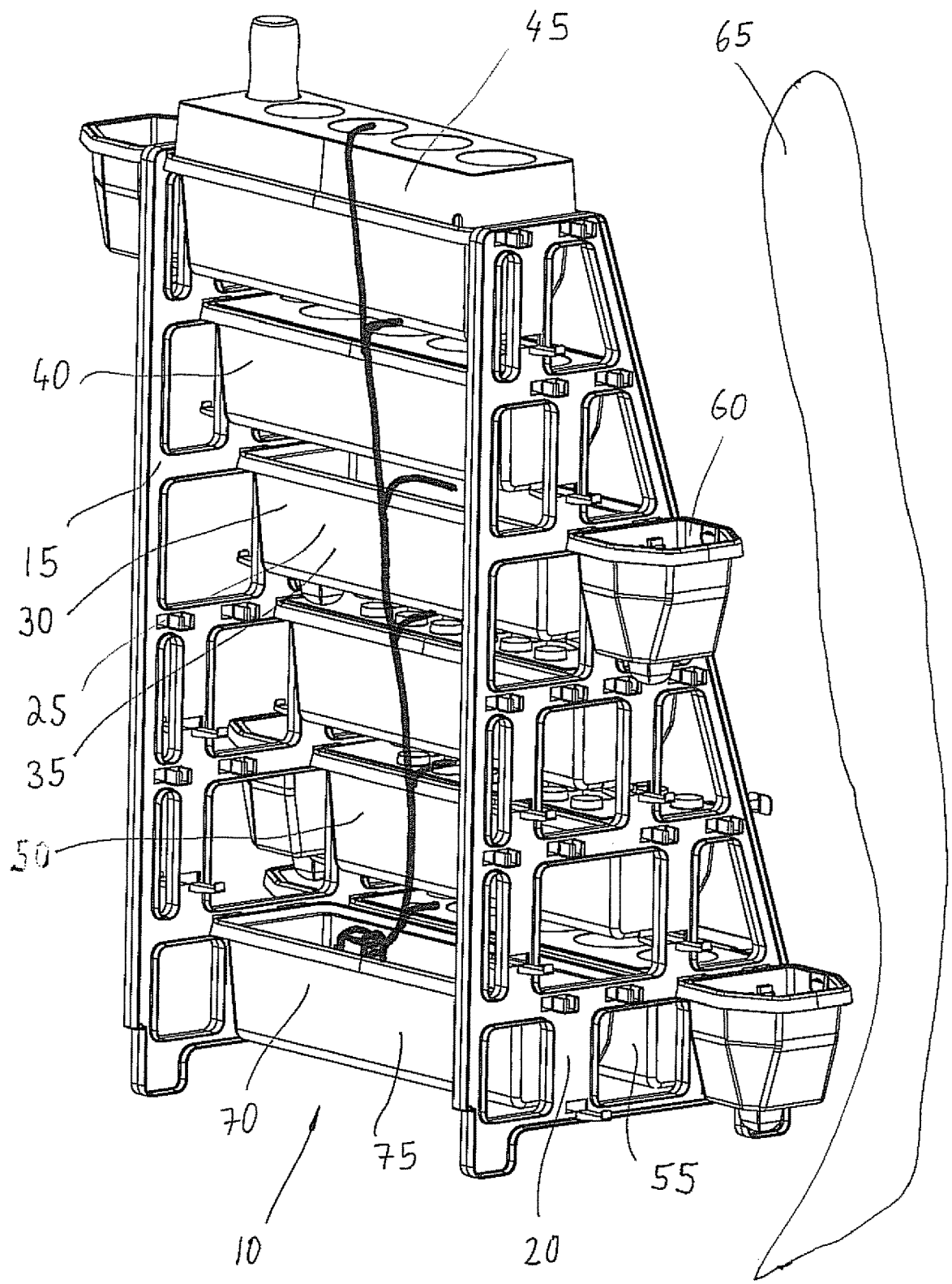
FIG. 2 is a perspective illustration of another angle of the example of a modular multi-tiered planter kit according to the invention that is illustrated in FIG. 1.

Reference is made to FIGS. 1 and 2. FIG. 1 is a perspective illustration of a mounted (assembled) example of a modular multi-tiered planter kit 10 according to the invention, and contains growth substrates and plants. FIG. 2 is a perspective view from another angle of kit 10 illustrated in FIG. 1.

The base elements of kit 10 comprise two support elements —15 and 20 that are fitted for placing on a surface (e.g. on a balcony floor of an apartment or in the yard of a home (not illustrated)), perpendicular to the surface and spaced from each other, as well as a plurality of planter assemblies 25 that are fitted for connection in a disassemblable mounting fashion, with two support elements 15 and 25, in a multi-tier configuration, wherein they each extend in an essentially horizontal direction, in the gap between the two support elements.

Kit 10 provides the customer with a range of design and usage options. Kit 10 can be marketed and mounted in a wide array of different types of planter assemblies 25 that can be mounted in conjunction or separately, which contain an array of plant growth substrates (e.g. soil, mixture, substrate bags, water (for hydroponic cultivation)).

As to be explained below, in kit 10, the various types of planter assemblies 25, all comprise a unified planter element 30 that is used in each of the planter assemblies, but as stated, this unified element is just a "building block" that may be used in a wide array of diverse planter assemblies.

As depicted in FIGS. 1 and 2, in kit 10 various types of planter assemblies 25 are mounted (the group):

First-type planter assembly 35, which, as will be clarified further below, in addition to unified planter element 30 also comprises elements that are mounted on back of unified planter element 30 in a manner that can be disassembled and enable efficient drainage of excess irrigation water.

Second type planter assembly 40, which, as will be clarified further on, in addition to unified planter element 30 also comprises an element that is mounted on the back of unified planter element 30, in a manner that can be disassembled and allows for semi-automatic irrigation of the planter (by means of the bottle) and hydroponic growth.

Third-type planter assembly element 45, which, as will be explained below, in addition to unified planter unit 30, also comprises an element that is mounted on the back of unified planter element 30, in a manner that can be disassembled and allows for semi-automatic irrigation of the planter and hydroponic growth. Moreover, in addition to hydroponic cultivation of pot plants, it may also be used, for instance, for raising aquarium fish—once the planter is made of a transparent material and made usable as an aquarium.

Fourth-type type planter assembly 50, which, as will be clarified below, in addition to unified planter element 30, also comprises elements that are mounted on unified planter element 30 in a disassemblable manner and also enable, in addition to hydroponic cultivation of pot plants, also raising, for instance, aquarium fish—once both the planter and an internal container element, are both made of a transparent material and can be used as an aquarium.

Fifth-type planter assembly 55, which, as will be clarified below, in addition to unified planter element 30, also comprises an assembly that is mounted on unified planter element 30 in a disassemblable manner and enables, for instance, preliminary sprouting next to and parallel to the plant to be grown or that is already growing in the unified planter element.

Any skilled person will understand that the group of planter assemblies of the various types—first-type 35, second-type 40, third-type 45, fourth-type 50, and fifth type 55, all of which use a unified basic element—unified planter element 30, and are all adapted for mounting on support elements 15 and 20, offers a variety of assembly (mounting) options of sets of modular multi-tiered planters, all of which will be according to the invention. Thus, for example, a modular multi-tiered planter kit according to the invention may be assembled (mounted) with only one type of planter assembly among the different types included in the group, or with a variety of types—two different types and up to five different types (as in kit 10 illustrated in FIGS. 1 and 2).

Any skilled person will also understand that additional types of planter assemblies can be mounted in a kit according to the invention, provided that the planter element is formed in a way that does not detract from its ability to connect similarly, in a disassemblable mounting fashion, with two support elements in a modular multi-tiered mounting according to the invention, and this is parallel to unified planter element 30 (one or more), to said planter assemblies of first-type to fifth-type (inclusive) or separately (see, for example, the sixth-type planter assembly to be described further on in relation to FIGS. 70-73).

Modular multi-tiered planter assemblies' kit 10 is illustrated, wherein it also comprises a plurality of side planter assemblies 60, which are suited for mounting on support elements 15 and 20 in a multi-tier configuration, wherein they are positioned on the outer side of the support elements.

Modular multi-tiered planter kit 10 is illustrated wherein it also comprises coverage means 65 for removable coverage of the mounted kit, in a manner that gives the kit according to the invention a quasi-greenhouse capacity and protects the plants growing inside it from the ravages of the weather.

Modular multi-tiered planter assembly kit 10 is illustrated, wherein it also comprises irrigation system 70 for planter assemblies mounted in them (the various types). As to be clarified further on, the irrigation system according to the invention is characterized in that water container 75 is formed in a disassemblable manner in a modular multi-tiered planter kit, similar to the method of mounting planter assembly 25 in the kit. Unified planter element 30 can be used as a water container for the irrigation system.

Any skilled person will understand that such additional assemblies (mountings), (side planter assemblies, coverage means or irrigation system) in a modular multi-tiered planter kit according to the invention are purely optional, which demonstrates the great modular versatility of the kit according to the invention.

Moreover, a modular multi-tiered planter kit according to the invention could be assembled (mounted) in a strap down configuration, while using a pair of support elements and a number of unified planter assemblies.

Figure 4:
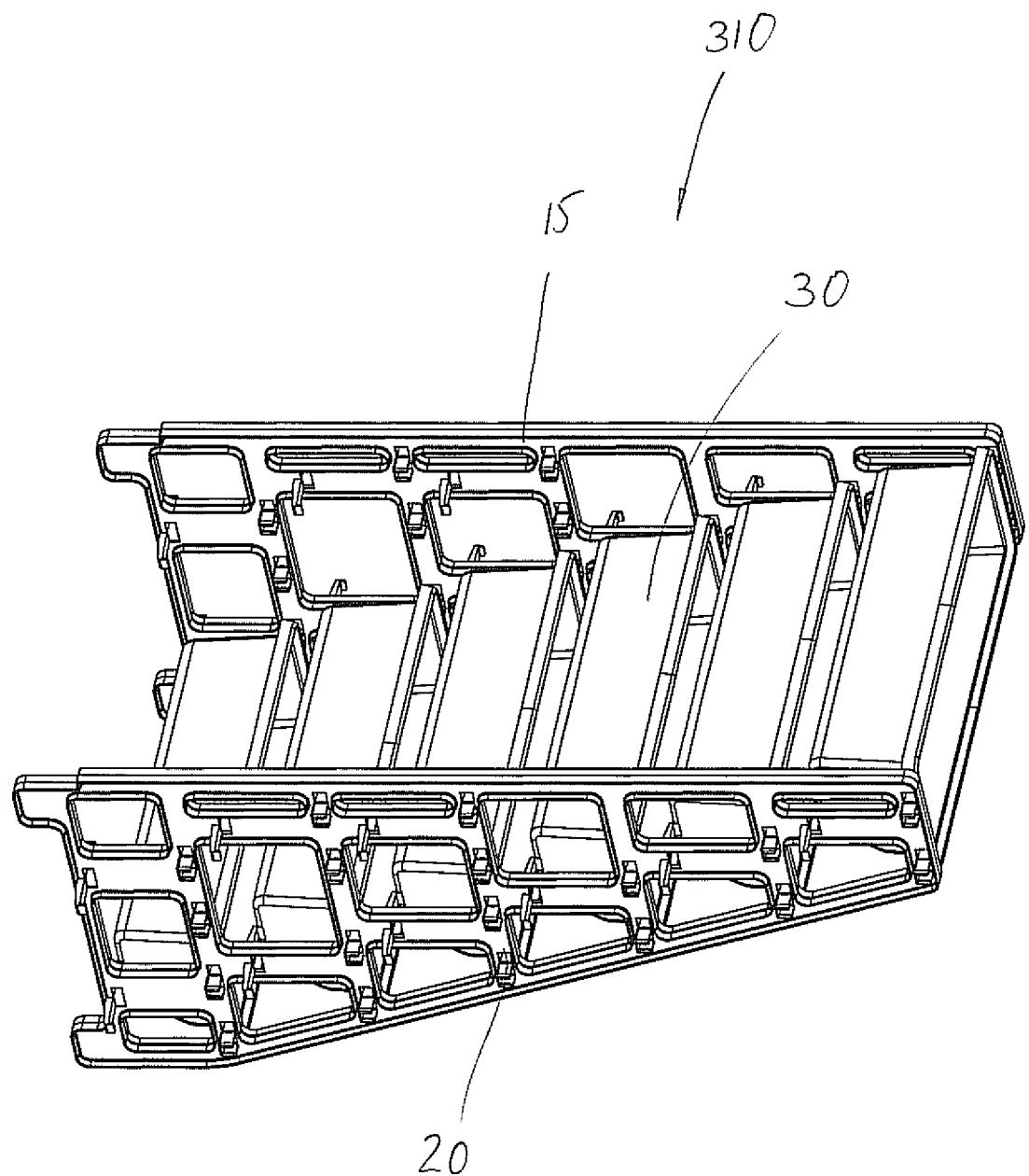
FIG. 4 is a perspective view of another angle of the example kit illustrated in FIG. 3.
Figure 5:
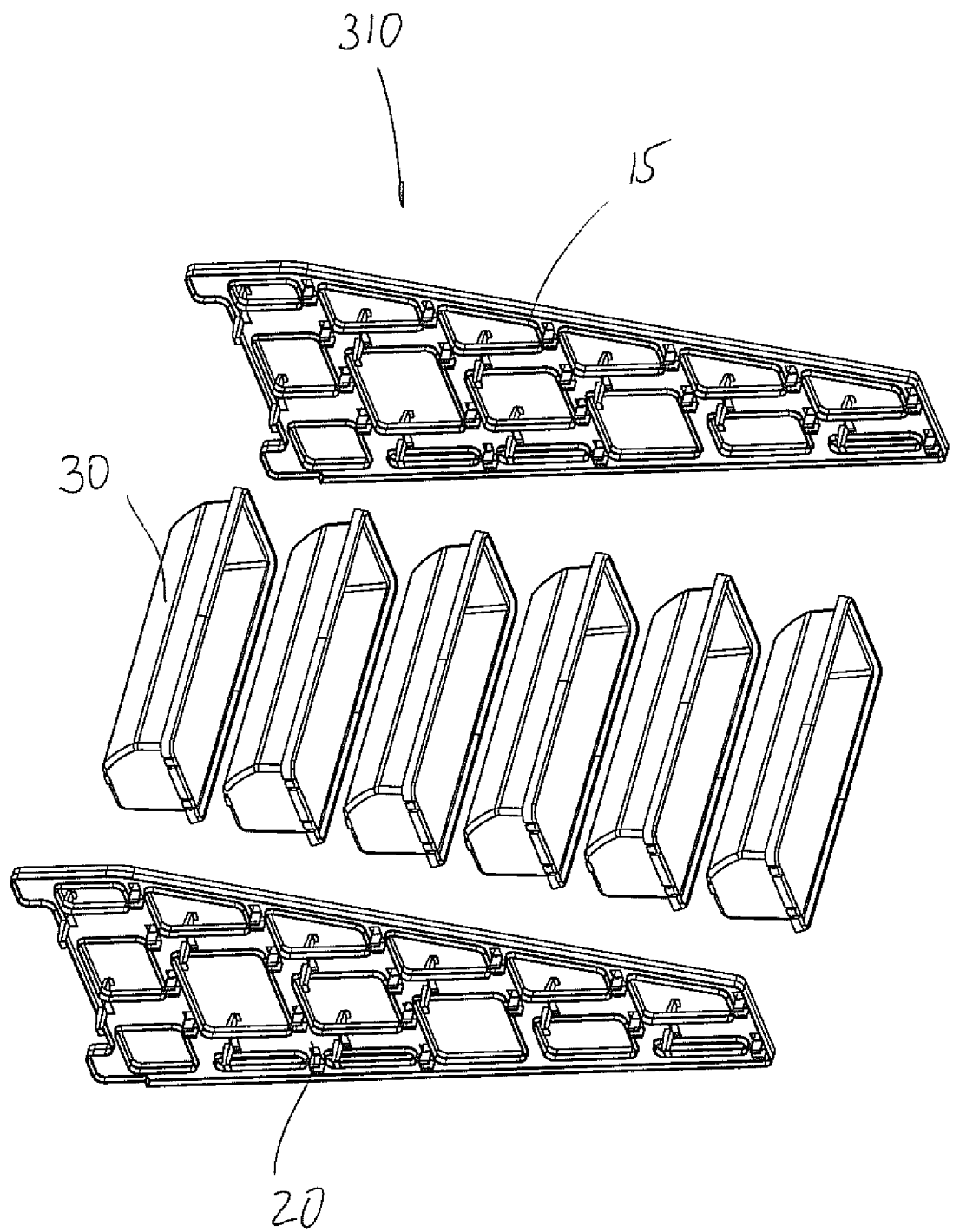
FIG. 5 is an "exploded" perspective view of elements of the example kit illustrated in FIG. 3.

Reference is made to FIGS. 3-5. FIG. 3 is a perspective view of an example of a modular multi-tiered planter kit 310 according to the invention, wherein it is mounted (assembled) from two support elements 15 and 20 and a plurality of unified planter elements 30. FIG. 4 is a perspective view from another angle of kit 310. FIG. 5 is an "exploded" perspective view of elements of kit 310.

Thus, a modular multi-tiered planter kit according to the invention could be marketed as a "standard" multi-tiered planter kit, without mounting planter assemblies of the first-type to the fifth type, which were defined above in relation to FIGS. 1 and 2. Furthermore, it may be seen that the kit enables mounting a second row of planters (not illustrated) in the back of the illustrated row of unified planters (or planter assemblies), at least in back of some of the illustrated planters.

Any skilled person will understand that the way in which the modular multi-tiered planter kit according to the invention is designed as a multi-tiered kit, which is delimited on both of its sides by surfaces (a pair of support elements), enables positioning a plurality of kits in a row, close together and side by side.

Figure 6:
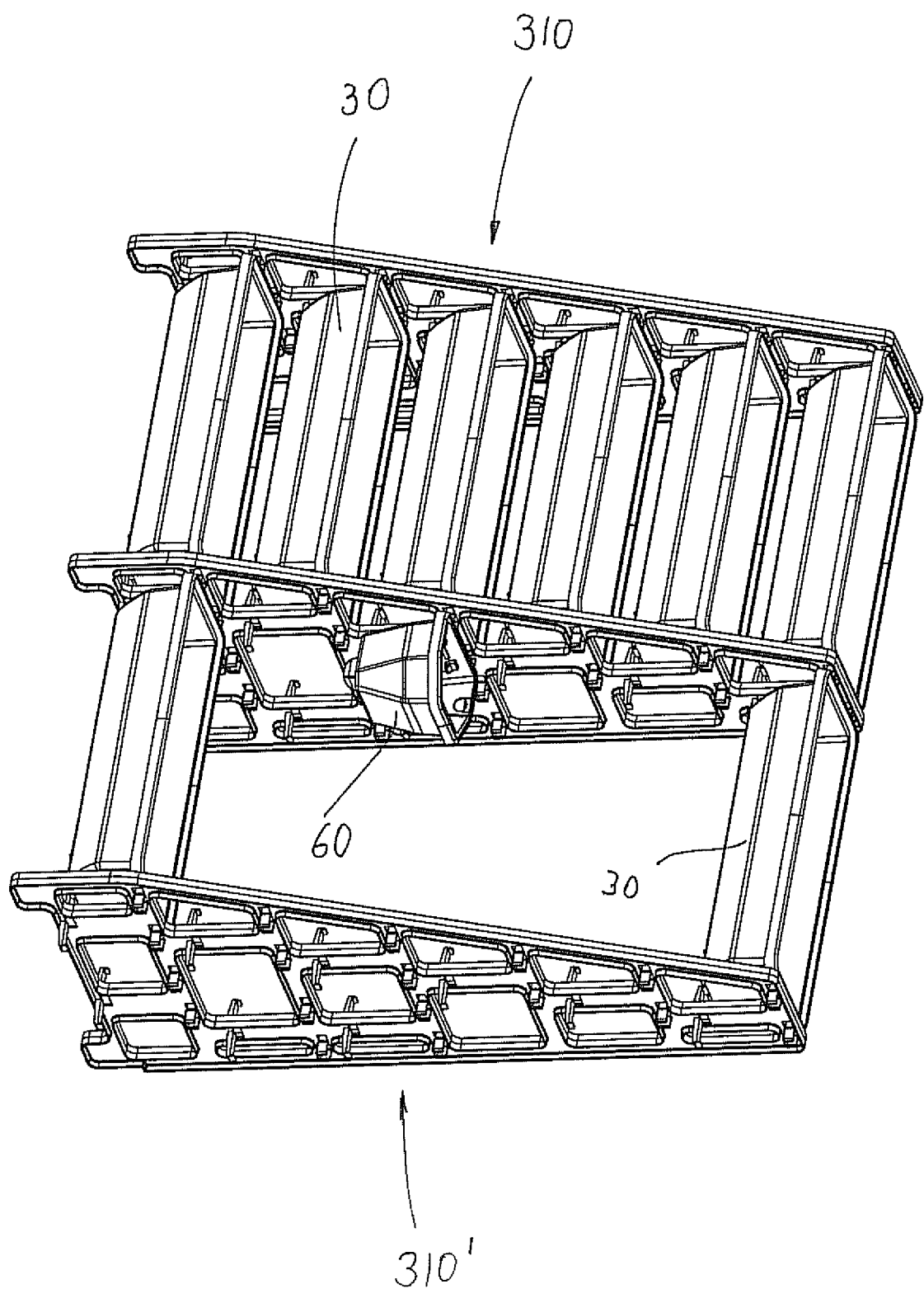
FIG. 6 is a perspective view of the example kit illustrated in FIG. 3, wherein the kit is lengthened by placing another support element in a side-by-side configuration.

Reference is made to FIG. 6. FIG. 6 is a perspective view of kit 310 that is illustrated in FIG. 3, wherein an additional array —310' of unified planters 30, is mounted in a side-by-side configuration next to kit 310.

It should be noted that in order to lengthen kit 310, according to the illustrated example, it is enough to position just one more support element—615. As will be explained further on in relation to FIGS. 9 and 10, the support elements are formed on both sides with sets of identical means that allow for disassemblable mounting of planter assemblies on both sides of the support elements (as a joint support element).

Furthermore, in the illustrated example, array 310' is illustrated as only including two unified planter elements 30 (compared to six such elements that are mounted in kit 310 next to it) and side planter 60, in a manner that also demonstrates the versatility and modularity of a modular multi-tiered planter kit according to the invention. Thus, skilled persons will understand that the kit and the second array can be mounted with planter assemblies or with a combination of unified planter and planter assemblies of the various types and side planter assemblies on both sides of the support elements.

As previously stated, a modular multi-tiered planter kit according to the invention can also be mounted with side planters.

Figure 7:
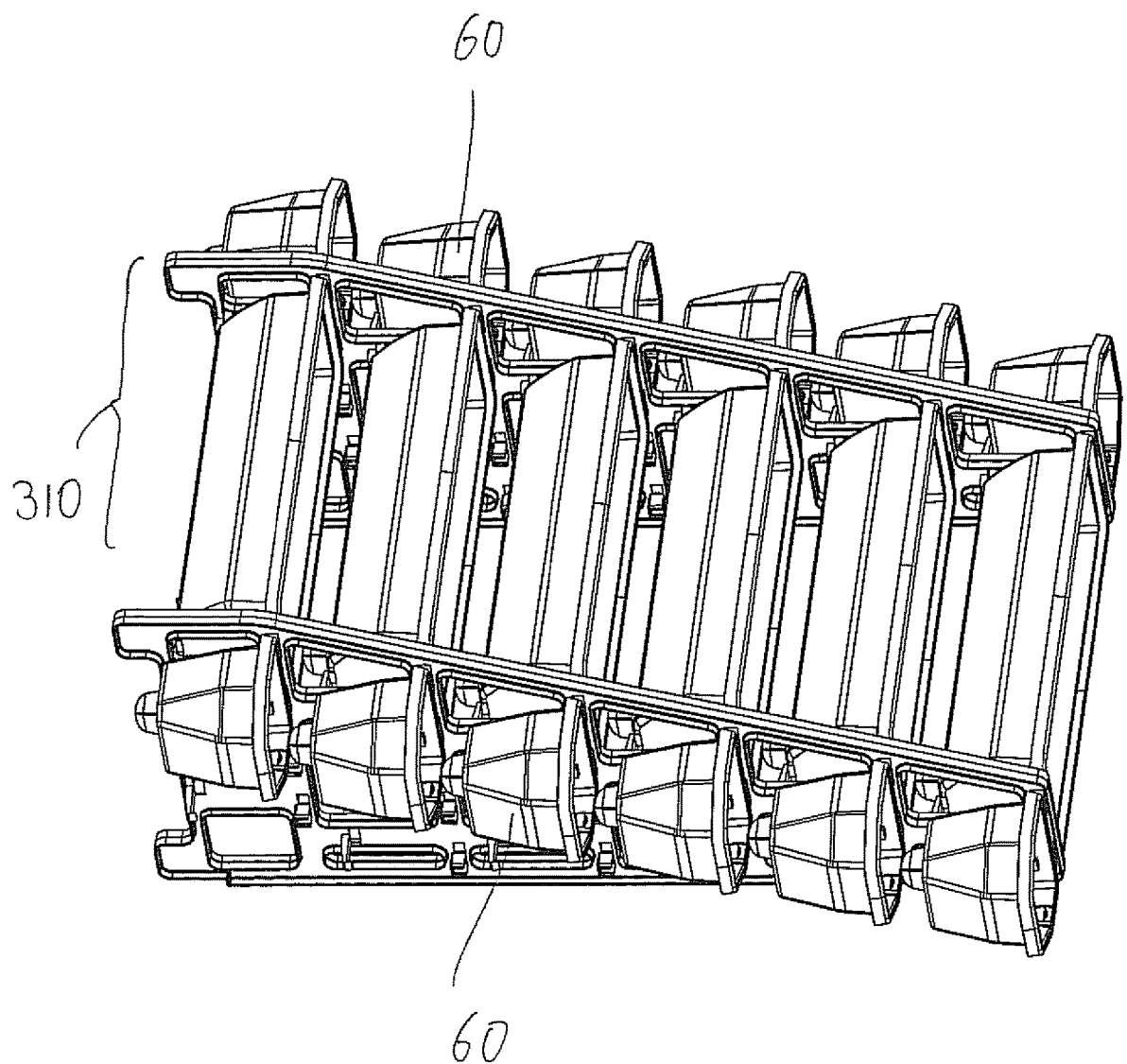
FIG. 7 is a perspective view of the example kit illustrated in FIG. 3, wherein side planter assemblies are mounted on its both sides.

Reference is made to FIG. 7. FIG. 7 is a perspective view of an example of kit 310 illustrated in FIG. 3, wherein side planter assemblies 60 are mounted on either side.

Thus, a modular multi-tiered planter kit according to the invention can be mounted with side planters on either side, regardless of the type of horizontal planters amounted on it—whether unified planter elements 30 (as illustrated in FIGS. 3-5), the various types of planter assemblies—from the first to the fifth type, as defined above in relation to FIGS. 1 and 2, or any combination of them. In addition, any skilled person will understand (see FIG. 6) that side planter assemblies 60 may be mounted next to and parallel to unified planters and planter assemblies of the various types, also on the inner side of the support elements (all that is need is one or more unified planters (or a planter assembly) for setting up and positioning the kit). In the examples of a modular multi-tiered planter kit according to the invention, as described above in relation to FIGS. 3-7—310 and 310', we illustrate the multi-tiered mounting of planter elements while taking advantage of the given potential of six levels (floors). Furthermore, the mounting was illustrated in a terraced fashion (without an additional parallel row of planters). However, any skilled person will understand that this is only an example, and a modular multi-tiered planter kit according to the invention could be marketed with support elements of varying heights, in a manner that will provide another and different potential for planter levels.

Reference is made to FIG. 8. FIG. 8 is a perspective view of another example—810—a modular multi-tiered planter kit according to the invention, which like example kit 310 illustrated in FIG. 3, is also illustrated wherein it is mounted (assembled) from two support elements—815 and 820 and a plurality of unified planter elements 30, but is differentiated from kit 310 in height (support elements 815 and 820 are shorter than corresponding elements 15 and 20). Kit 810 therefore enables mounting a different number of tiers of planter assemblies (three tiers compared to six tiers in Example kit 310).

Therefore, any skilled person will understand that in a modular multi-tiered planter kit according to the invention, the support elements may be provided in a variety of heights, in a manner that enables mounting a different number of tiers of planter assemblies depending on the height of the given support element. This aspect also demonstrates the versatility and modularity of a kit according to the invention.

Reference is made to FIGS. 9 and 10. FIG. 9 is a perspective view of an example of support element 915 used in a modular multi-tiered planter kit according to the invention. FIG. 10 is a zoom-in perspective view of support element 915.

According to the examples of kits according to the invention described above in relation to FIGS. 1, 2, 3, 6 and 8, the support elements that are illustrated when mounted (15, 20, 815, 820) are each formed, similar to support element 915, as a surface in a right-angled triangle configuration, but any skilled person will understand that this is just one of many configurations that can be used to design a support element of the kit.

The said right-angled triangle configuration, which as stated forms support element 915, comprises openings array 917 that are circumferentially delimited by protruding rim 919. Any skilled person will understand that the design of the support element with openings and a protruding rim delimited around each one helps to economize on raw material (and weight), while providing rigidity to the flat element.

Any skilled person will also understand that such support elements may be mass-produced from polymeric materials in an injection molding process.

Support element 915 is formed with first means array 921 for a disassemblable mounting of planter assemblies (not illustrated), which is formed on the one side—923 of the support element, which once the kit is mounted faces the second support element. A second array means—925, for disassemblable mounting of planter assemblies (not illustrated), is formed on the second side—927 of the support element, which once the kit is mounted makes up its external side.

According to the illustrated example, first means array 921 for disassemblable mounting of the planter assemblies is formed wherein it comprises array of brackets 929, each of which are formed in an L-shaped configuration and extends wherein each protrudes from the surface of the support element perpendicular to it, in a manner where protrusion 931 at the end of each one is adapted for integration in a disassemblable mounting inside the positioning brackets, which as to be described further on, are formed at the bottom of the unified planter elements which, as stated, are used in each of the various types of planter assemblies (as defined above in relation to FIGS. 1 and 2) (and also in side planters). First array means 921 also comprises an array of brackets 933, which are each formed in a U-shaped configuration and lie adjacent to the surface of the support element, wherein an opening of each one —935, faces upwards, whereby these openings are fitted for integrating into them, in a disassemblable mounting, teeth-like means as to be described below, that are formed on the circumferential rim of openings of the unified planter elements in their upper parts (and in the side planter elements).

In addition, according to the illustrated example, first array of means—921 and second array of means —925, are identical arrays that are formed as stated from both two sides of the support elements, in a manner that enables mounting unified planter elements (and side planters) on both sides of the support element for lengthening the kit, while needing only one additional support element (as illustrated in FIG. 6 above).

Reference is made to FIGS. 11-14. FIG. 11 is a perspective view of an example of unified planter element 30, which, as mentioned, could be used in a modular multi-tiered planter kit according to the invention, either as a stand-alone mounting (as illustrated, for example, in FIGS. 3-8) or as part of the various types of planter assemblies (as defined above in relation to FIGS. 1 and 2). FIG. 12 is a perspective view from another angle of unified planter element 30. FIG. 13 is a perspective view of a connection of unified planter element 30 in a disassemblable mounting with two support elements 15 and 20 in a modular multi-tiered planter kit according to the invention. FIG. 14 is a b-b cross-section marked in FIG. 13, and depicts the manner in which the unified planter element is connected with the two support elements.

Unified planter element 30 is formed as elongated cavity 1202 formed with bottom 1204 at its bottom part and opening 1206 at its top.

Unified planter element 30 is formed with positioning brackets 1102, which are fitted for integration in a disassemblable mounting (see FIGS. 13 and 14) with first array of means 921, which is formed on one side of support element 15 or 20, which once the kit is mounted, faces the second support element (see above in relation to FIGS. 9 and 10), for disassemblable mounting of the various types of planter assemblies (including for mounting, as stated, the unified planter elements itself). In the illustrated example, positioning brackets 1102 are formed as recesses on both sides of the planter.

Unified planter element 30 is also formed with external circumferential rim 1104, which delimits the opening of the planter element at top part 1206. Rim 1104 is formed wherein it slants (from the rim of the planter opening to the bottom of the planter on its outer side). According to the illustrated example, rim 1104 is formed to comprise teeth-like means 1106, which are also fitted for integration in a disassemblable mounting with first array of means 921, which as stated, is formed on the one side of support element 15 or 20, which once the kit is mounted faces the second support element (see above in relation to FIGS. 9 and 10). According to the illustrated example, a pair of teeth-like means 1106 are formed on both sides of the planter element, each in a tab-like configuration that is delimited on both sides by slots.

Outer rim 1104, which, as mentioned above, delineates the upper part of planter opening 1206, is formed with openings array 1108, which as to be explained below, are fitted for integration in a disassemblable mounting with at least one upper supporting element and with teeth that are formed with a range of covers that can be mounted in various types of planter assemblies.

Bottom 1204 of the planter element is formed with a closable opening 1110 (see FIG. 11). Opening 1110 is delimited by rim 1112 that protrudes from the outer side of bottom 1204. Tracks 1114 and 1116 are formed next to the opening, which as to be clarified below, when unified planter element 30 is implemented in the first-type planter assembly (as defined above in relation to FIGS. 1 and 2), tracks 1114 and 1116 are fitted for mounting on a drainage bowl (not illustrated here), whereby once mounted, the opening of the drainage bowl is aligned with opening 1110, which as stated is formed at the bottom of the planter element for possible collection of runoff water from inside the planter element into the bowl.

Any skilled person will understand that unified planter element 30 may be mass-produced by a polymer injection molding technology. Closable opening 1110, which as stated is formed at the bottom of the unified planter elements, may be formed in an open or closed state, from the planter element manufacturing stage (by using a suitable mold). In addition and alternatively, the closable opening, which as stated is formed at the bottom of the unified planter elements, may be closed by another element—a removable cap (not illustrated), which may be mounted in the opening.

FIGS. 13 and 14 depict, as stated, the manner in which unified planter element 30 is connected in a disassemblable mounting with two support elements 15 and 20 in a modular multi-tiered planter kit according to the invention. Array of brackets 929, which according to the illustrated example (see also FIGS. 9 and 10) are each formed in an L-shaped configuration and extend wherein they each protrude from the surface of the support element and perpendicular to it, so that protrusion 931 at the end of each one, integrates in a disassemblable mounting into positioning brackets 1102, which are formed as recesses in the bottom of the unified planter elements. Array of brackets 933, which according to the illustrated example (see also FIGS. 9 and 10), are each formed in a U-shaped configuration and lie adjacent to the surface of the support element, wherein an opening of each one faces upwards, whereby these openings incorporate in a disassemble mounting manner, teeth-like means 1106, which are formed on rim 1104 of the openings on the upper part of the unified planter elements.

Any skilled person will understand that the manner of attachment of the single-element element in a disassembled installation with two support components, as described above in relation to FIGS. 13 and 14, is also applied in the connection of the various plantings assemblies (as defined above with respect to FIGS. 1 and 2), in which all of the unified planter element is implemented, and also suitable for installing side planters.

Reference is made to FIGS. 15-20. The figures illustrate an example of first-type planter assembly 35 (as defined above in relation to FIGS. 1 and 2), which is found in the group of various types of planter assemblies, which as stated may be assembled (mounted) in a modular multi-tiered planter kit according to the invention, including in various combinations of various types of assemblies and next to basic unified planter elements.

FIG. 15 is a perspective view of one example of first-type planter assembly 35, which is fitted for connection in a disassemblable manner in modular multi-tiered planter kit according to the invention. FIG. 16 is a perspective view from another angle of planter assembly 35. FIG. 17 is a view of a-a cross-section marked in FIG. 16. FIG. 18 is an "exploded" perspective view of elements of the example planter assembly 35. FIG. 19 is a perspective view of multiple-opening base spacer element 1602 that is mounted in the example planter assembly 35 (or in a unified planter element in general). FIG. 19a is perspective view of another configuration of multiple-opening base spacer element 1903, which may be mounted in the planter assembly. FIG. 20 is a perspective view of drainage bowl element 1502, which is mounted in an example of the planter assembly illustrated in FIG. 11.

First-type planter assembly 35 comprises unified planter element 30' and in addition multiple-opening base spacer element 1602, which is characterized in that it is fitted for disassemblable mounting inside unified planter element 30 on the bottom 1204 at its bottom part. Base spacer element 1602 is formed with array of protrusions 1702, whereby once mounted inside planter element 30 (see FIG. 17), the element openings—1604—enable supporting a bag of growth substrate (e.g. a bag of substrate mix) to be placed with a gap from the bottom of the planter element. FIG. 19a is an illustration of another configuration of multiple-opening basic spacer—1903, which can be installed in the example planter assembly illustrated in FIG. 11 (or in a unified planter element in general). Spacer element 1903 is characterized in that it is formed with dense mesh 1905 (which can be added as an integral part in an over molding process), so that once mounted inside unified element 30, the mesh enables supporting bulk (unpackaged) growth substrate to be found with a gap from the bottom of the planter element.

First-type planter assembly 35 also comprises drainage bowl 1502, which is characterized in that (see FIG. 20) it is formed with protrusions 2002 and 2004, which are fitted for mounting on tracks 1114 and 1116 (see above in relation to FIGS. 11-14), which are formed at the bottom outer side of planter element 30, in a manner that enables moving drainage bowl 1502 in a linear movement to its place, so that the opening of drainage bowl 1502 is aligned with the opening that is formed at the bottom of the planter for possible collection of runoff water from inside the planter element into the bowl, or for retrieving it from there and emptying it. The drainage bowl may be made by plastic injection molding made of transparent polymer (all of it or a lengthwise strip) to enable visually monitoring the level of runoff water collecting inside (and therefore providing an indication of the moisture status of the growth substrate in the planter).

According to the illustrated example, planter assembly 35 also comprises upper supporting element 1608. The upper support element is fitted for disassemblable mounting in openings array 1108 (see above in relation to FIGS. 11-14), which is formed on outer rim 1104, which delineates the opening of the upper part of unified planter element 30. The application of one or more upper support elements contributes to the rigidity of the planter assembly (and could be assembled on unified planter element on its own). Mounting one or more upper support elements could also delineate the level of growth substrate, so that it does not spill over the edge of the planter.

Thus, a skilled person will understand that a first-type planter assembly, such as assembly 35, as described above in relation to FIGS. 15-20, comprises, in addition to the unified planter element, also other elements (multiple-opening base spacer element and a drainage bowl element), which are mounted on the unified planter element in a disassemblable way, and enables efficient drainage of excess irrigation water, if it runs off from the growth substrate (e.g. bag of substrate mixture), which is placed inside the planter element on the base element.

Reference is made to FIGS. 21-27. The figures illustrate an example of second-type planter assembly 40 (as defined above in relation to FIGS. 1 and 2), which is found in the group of various types of planter assemblies, which as stated may be assembled (mounted) in a modular multi-tiered planter kit according to the invention, including in various combinations of various types of assemblies and merely next to basic unified planter elements.

FIG. 21 is a perspective view of one example of second-type planter assembly 40, which is fitted for connection in a disassemblable fashion in modular multi-tiered planter kit according to the invention. FIG. 22 is a perspective view from another angle of an example of planter assembly 40. FIG. 23 is a view of a-a cross-section marked in FIG. 21. FIG. 24 is a view of b-b cross-section marked in FIG. 21. FIG. 25 is an "exploded" perspective view of elements of the example of planter assembly 40. FIG. 26 is a perspective view of cover element 2102 that is mounted in the example of planter assembly 40. FIG. 27 is a perspective view from another angle of cover element 2102.

Second-type planter assembly 40 comprise unified planter element 30 and in addition cover element 2102. Cover element 2102 is characterized in that it is formed as a surface, which once mounted on unified planter element 30, is fitted to be supported on outer circumferential rim 1104. According to the illustrated example, cover element 2102 is formed with one bracket 2402, which enables mounting water bottle 2104 inside it. The water bottle may be a common drinking water bottle or a special purpose bottle, e.g. a bottle comprising a mechanism that provide for completely turning the bottle upside down, as needed for mounting it, without water leaking from it, and it opens by itself to the passage of water from it, once mounted (see the example bottle illustrated in FIGS. 66-69 to be addressed further on). Therefore, the bottle is an optional added element that may not constitute an integral part of the assembly, as to be marketed, and it is therefore illustrated with a broken line. Moreover, a skilled person will understand that a cover element may be formed with a plurality of brackets for mounting a plurality of bottles in those brackets. Bracket 2402 is formed as an embedded cavity that protrudes from the surface of cover element 2102 and comprises a multiple-opening bottom—2406, on its one side, which protrudes from the surface of the cover, and opening 2602 that enables placing a water bottle through it at its other side that is on the surface of the cover. Cover 2102 is also formed with a plurality of brackets 2106, which enable mounting pot plants inside (four brackets are depicted in the illustrated example, but any skilled person will understand that a cover element could be formed with another number of brackets for mounting another number of pot plants inside). Each of brackets 2106 is formed as an embedded cavity that protrudes from the surface of the cover, and the cavity comprises multiple-opening bottom 2108 on the other side, which protrudes from the surface of the cover, and opening 2110 that allows for placing a pot plant through it on the other side that is on the surface of the cover.

According to the illustrated example, planter assembly 40 also comprises upper supporting element 1608. As stated, the upper support element is fitted for disassemblable mounting in a pair of openings from openings array 1108 (see above in relation to FIGS. 11-14), which is formed on outer circumferential rim 1104, which delineates the opening of the upper part of unified planter element 30. According to the illustrated example, cover element 2102 is designed with a suitable "release"—2703 (see FIG. 27) for positioning the upper support element under it.

Cover element 2102 is also formed with array of protrusions 2702, which are also fitted for mounting in openings array 1108, which is formed in the outer circumferential rim that, as mentioned, delineates the opening of the upper part of unified planter element 30.

According to the illustrated example, the level of the multiple-openings bottom 2406, through which the runoff water is collected once bottle 2104 is put in place, corresponds with bottom levels 2108 of each of pot plant brackets 2106 (see FIG. 23). In addition, according to the illustrated example, opening 1110, which is formed at the bottom of unified planter element 30, is in closed position (see FIG. 24) (according to the illustrated example—by manufacturing the bottom of unified planter element with a closed opening from the outset), and in any case, the assembly does not include a drainage bowl. These structural aspects also make it possible to designate second-type planter assembly for hydroponic growth of plants (without soil), except for the contents of the pot plants located in the brackets).

Therefore, a skilled person will understand that a second-type planter assembly, such as an example of assembly 40 described above in relation to FIGS. 21-27, comprises, in addition to the unified planter element, also another element (a cover element that is formed with at least one bracket to enable fitting a bottle inside, and with at least one bracket for fitting a pot plant inside), which is mounted on the unified planter element in a disassemblable manner, to enable "semi-automatic" irrigation of the planter and hydroponic growth.

Reference is made to FIGS. 28-34. The figures illustrate an example of third-type planter assembly 45 (as defined above in relation to FIGS. 1 and 2), which is found in the group of various types of planter assemblies, which as stated may be assembled (mounted) in a modular multi-tiered planter kit according to the invention, including in various combinations of various types of assemblies and next to basic unified planter elements.

FIG. 28 is a perspective view of one example of third-type planter assembly 45, which is fitted for connection in a disassemblable manner in modular multi-tiered planter kit according to the invention. FIG. 29 is a perspective view from another angle of an example of planter assembly 45. FIG. 30 is a view of a-a cross-section marked in FIG. 28. FIG. 31 is a view of b-b cross-section marked in FIG. 28. FIG. 32 is an "exploded" perspective view of elements of example planter assembly 45. FIG. 33 is a perspective view of elevated cover element 2802 that is mounted in an example planter assembly 45. FIG. 34 is a perspective view from another angle of elevated cover element 2802.

Third-type planter assembly 45 comprise unified planter element 30 and in addition elevated cover element 2802. As opposed to the flat configuration of cover element 2102, as described above in relation to the second-type planter assembly 40, cover element 2802 is formed as an elevated surface that is added therefore, as an additional cavity to the elongated cavity of unified planter element 30 once the elevated cover element is mounted on the planter element, while it is supported by the outer circumferential rim 1104 of the unified planter. According to the illustrated example, elevated cover element 2802, similar to the said cover element 2102, is formed with one bracket 3102, which enables mounting water bottle 2804 inside it. As already mentioned, the water bottle may be a standard drinking water bottle or a special purpose bottle, e.g. a bottle comprising a mechanism providing for completely turning the bottle upside down, as needed for mounting it, without water leaking from it, and its opens by itself while enabling the passage of water from it, once mounted (see the example bottle illustrated in FIGS. 66-69 to be addressed further on). Therefore, the bottle is an optional added element that may not constitute an integral part of the assembly, as to be marketed, and it is therefore illustrated with a broken line. Moreover, a skilled person will understand that an elevated cover element may be formed with a plurality of brackets for mounting a plurality of bottles. Bracket 3102 is formed as an embedded cavity that protrudes from the surface of elevated cover element 2802 (in the direction of the added cavity that the cover delineates once it is mounted on the rim of unified planter element 30), and comprises a multiple-openings bottom—3106, on the one side which protrudes from the surface of the cover, and opening 3202 that enables placing a water bottle through it from the other side that is on the elevated cover. Elevated cover 2802 is also formed with a plurality of brackets 2806, which enable mounting pot plants inside (four brackets are depicted in the illustrated example, but any skilled person will understand that an elevated cover element could be formed with another number of brackets for mounting another number of pot plants inside). Each of brackets 2806 is formed as an embedded cavity that protrudes from the surface of the cover, and the cavity comprises multiple-opening bottom 3002 on the one side, which protrudes from the surface of the elevated cover, and opening 2808 that allows for placing a pot plant through it on the other side that is on the elevated cover.

Any skilled person will understand that planter assembly 45 may also comprise an upper support element (one or more), similar to upper element 1608, which was described above in relation to planter assembly 40.

Elevated cover element 2802 is also formed with array of protrusions 3402, which is fitted for disassemblable mounting in openings array 1108 (see above in relation to FIGS. 11-14), which is formed on outer circumferential rim 1104 which delineates the opening of the upper part of unified planter element 30.

According to the illustrated example, the level of multiple-openings bottom 3106, through which the runoff water is collected once bottle 2804 is put in place, corresponds with bottom levels 3002 of each of pot plant brackets 2806 (see FIG. 30). In addition, according to the illustrated example, opening 1110, which is formed at the bottom of unified planter element 30, is in closed position (see FIG. 31), (according to the illustrated example—by manufacturing the bottom of unified planter element with a closed opening from the outset), and in any case, the assembly does not include a drainage bowl. These structural aspects enable designating third-type planter assembly 45, similar to second-type planter assembly 40, for hydroponic growing (without soil), (except for the contents of the pot plants located in the brackets), so that once elongated cavity 1202 of unified planter element 30 is filled with water, the upper water level will be near the bottoms of the pot plants to be placed in brackets 2806.

Moreover, use of the elevated cover allows internal cavity 1202 of unified planter element 30 to be filled with water (as is necessary for hydroponic growth), and is relatively large in volume. Given such a relatively large volume, planter assembly 45 may combine with hydroponic growth of potted plants, also the display of aquarium fish, for example. Making unified planter element 30 from a transparent material, entirely or at least one or more of its sides (e.g. by two-component injection molding) will enable using the element not just as a container for irrigating the pot plants placed in the elevated cover element, but also as an aquarium.

Therefore, a skilled person will understand that third-type planter assembly, such as example planter assembly 45 described above in relation to FIGS. 28-27, comprises, in addition to the unified planter element, also another element (precisely an elevated cover element that is formed with at least one bracket to enable fitting a water bottle inside, and with at least one bracket for fitting a pot plant inside), which is mounted on the unified planter element in a disassemblable manner, to enable "semi-automatic" irrigation of the planter and hydroponic growth' and further more—aside from hydroponic growth of pot plants, it can also be used, for example, for raising aquarium fish—once the planter is made of transparent material and is used as an aquarium.

Reference is made to FIGS. 35-43. The figures illustrate an example of fourth-type planter assembly 50 (as defined above in relation to FIGS. 1 and 2), which is found in the group of various types of planter assemblies, which as stated may be assembled (mounted) in a modular multi-tiered planter kit according to the invention, including in various combinations of various types of assemblies and next to merely basic unified planter elements.

FIG. 35 is a perspective view of one example of a fourth-type planter assembly 50, which as mentioned, is fitted for connection in a disassemblable manner in modular multi-tiered planter kit according to the invention. FIG. 36 is a perspective view from another angle of an example of planter assembly 50. FIG. 37 is a view of a-a cross-section marked in FIG. 35. FIG. 38 is a view of b-b cross-section marked in FIG. 35. FIG. 39 is an "exploded" perspective view of elements of planter assembly 50. FIG. 40 is a perspective view of cover element 3502 that is mounted in an example planter assembly 50. FIG. 41 is a perspective view from another angle of cover element 3502. FIG. 42 is a perspective view of internal water container element 3902 that is mounted in planter assembly 50. FIG. 43 is a perspective view from another angle of internal water container element 3902.

Planter assembly 50 comprise of unified planter element 30 and in addition cover element 3502. In the illustrated example, cover element 3502 is formed as a surface (similar to cover element 2102 described above in relation to planter assembly 40), but a skilled person will understand that a cover element in a fourth-type planter element can also be designed as an elevated cover (similar to elevated cover element 2802 described above in relation to planter assembly 45). The cover element is formed with array of protrusions 4102, which, similar to the arrays in cover element 2102 described above in relation to planter assembly 40, and elevated cover element 2802 described in relation to planter assembly 45, are also adapted for mounting in openings array 1108 (see above in relation to FIGS. 11-14), which is formed in outer circumferential rim 1104, which, as stated, delineates the opening of the upper part of unified planter element 30.

Cover element 3502 is also formed with at least one bracket that allows for mounting a water bottle inside (in the illustrated example, one bracket—3904, which enables mounting water bottle 3504), and with at least one bracket that enables mounting a potted plant inside (in the illustrated example—multiple brackets array 3506). A skilled person will understand that the brackets of the water bottle and the potted plants in the cover element designated for a fourth-type planter assembly, are in fact similar to the corresponding brackets as described above in relation to the various covers, as displayed in connection with second-type and third-type planter assemblies.

Also according to the illustrated example, cover element 3502 is also formed with opening 3508 for passing power and command wiring to pump assembly 3906.

Pump assembly 3906 comprises piping 3908, which from the time the planter assembly is mounted, lies next to internal water container element 3902 and directs the flow of water from the pump to the internal water container.

Internal water container element 3902, which is fitted as stated to be mounted inside unified planter element 30 while leaving gap 3702 between them. Internal water container element 3902 is formed as elongated cavity 3910 with bottom 3912 in its bottom part and opening 3914 at its top. One depression—3916, which is formed in the circumference of the internal water container element, enables passing water bottle bracket 3904 next to the water container element, in a manner that routes the flow of water from the bottle to gap 3702 between the bottom of the container and the bottom of the unified planter element. A second depression—3918 which is also formed in the circumference of the internal water container element, enables placing piping 3908 next to it.

In the fourth-type planter assembly, unified planter element 30 and the internal water container may be both made of a transparent material (all or at least some overlapping sides of them, once the assembly is mounted), in such a way as to enable using also the fourth-type planter assembly as an aquarium for fish. At the same time, pump assembly 3906 may also include means for filtering the recycled water and enriching the water with air as is customary in aquariums.

Therefore, a skilled person would understand that a fourth-type planter assembly, such as assembly 50 described above in relation to FIGS. 35-43, comprises, in addition to the unified planter element, also elements that are mounted on it in a disassemblable manner—a cover element that is formed with at least one bracket to enable fitting a bottle inside, and with at least one bracket for fitting a pot plant inside; an internal water container element that is suitable for fitting inside the unified planter element while leaving a gap between them; whereby the upper water level in the container will be close to the bottom of the pot plant, and in a way that by means of a pump assembly, which is also mountable inside the unified planter element next to the internal water container, a circulating of the flow of water from the bottle and collected in the gap to the internal water container, into the internal container will be enabled. In light of these structural aspects, a skilled person will understand that a fourth-type planter assembly can be used, in addition to hydroponic growth of plants, also for raising aquarium fish, for example, once the planter and the internal water container are both made of transparent material, and using them as an aquarium.

Reference is made to FIGS. 44-48. The figures illustrate an example of fifth-type planter assembly 55 (as defined above in relation to FIGS. 1 and 2), which is found in the group of various types of planter assemblies, which as stated may be assembled (mounted) in a modular multi-tiered planter kit according to the invention, including in various combinations of various types of assemblies and next to merely basic unified planter elements.

FIG. 44 is a perspective view of one example of a fifth-type planter assembly 55, which is fitted for connection in a disassemblable manner in modular multi-tiered planter kit according to the invention. FIG. 45 is a perspective view from another angle of an example of planter assembly 55. FIG. 46 is a view of a-a cross-section marked in FIG. 44. FIG. 47 is an "exploded" perspective view of elements of example add-on planter assembly 4402 that is mounted in planter assembly 55. FIG. 48 is a perspective view from of planter assembly 4402.

Planter assembly 55 comprise of unified planter element 30 and in addition, an add-on planter assembly 4402. Add-on planter assembly 4402 comprises add-on planter element 4404. Similar to unified planter element 30, add-on planter element 4404 is also formed as an elongated cavity with a bottom at the bottom part and an opening at its top. Add-on planter element 4404 is formed with outer rim 4406. Outer rim 4406, from the time it is mounted next to and parallel to unified planter element 30, extends along the edge of the elongated cavity of add-on planter element 4404, from the side that faces unified planter element 30, once installed, as stated, next to and parallel to unified planter element 30. Outer rim 4406 is formed wherein it is slanted and comprises teeth-like means 4408 (in the illustrated example—two such means). Teeth-like means 4408 are fitted to be integrated in a disassemblable mounting manner, with outer rim 1104, which, as noted, delineates the opening of unified planter element 30 at its upper part.

Similar to unified planter element 30, add-on planter element 4404 is also formed with closable opening 4502, which is formed at the bottom of add-on planter element. Opening 4502 (similar to opening 1110, which described above in relation to unified planter element 30), is delimited by a protruding rim on the outer side of the bottom of add-on planter element 4402, and formed next to it are tracks, which once the add-on planter element is implemented in fifth-type planter assembly 55, the tracks are fitted for mounting on drainage bowl 4410. Once drainage bowl 4410 is mounted, the opening of the drainage bowl is aligned with opening 4502, which is formed at the bottom of add-on planter element 4404, for possible collection of runoff water from inside the add-on planter element into the bowl. Drainage bowl element 4410 (similar to drainage bowl element 1502, which is described above in relation to planter assembly 35) is characterized in that it is formed with protrusions 4702 and 4704, which are fitted for mounting on the tracks that are formed at the bottom outer side of the add-on planter element, in a manner that enables moving drainage bowl 4410 in a linear movement to its place, so that the opening of drainage bowl 4410 is aligned with the opening that is formed at the bottom of the added planter for possible collection of runoff water from inside the added planter element into the bowl, or for retrieving it from there and emptying it. In any case, drainage bowl 4410 may also be made (all or part) of a transparent polymer material to allow for visually checking the level of runoff water collected inside (thus providing an indication of the moisture status of the growth substrate).

Any skilled person will therefore understand that in terms of the aspects of the opening and the possibility of mounting it with a drainage bowl, add-on planter assembly 4402 is similar to first-type planter assembly 35. The add-on planter assembly is smaller in its dimensions than the unified planter element to which it is connected. The elongated cavity, which is formed in the add-on planter element, is relatively smaller in length, width and depth than the corresponding dimensions of the elongated cavity that is formed in the unified planter element. At the same time, any skilled person will understand that the add-on planter assembly enables preliminary sprouting inside it, alongside or before growing in the unified planter element. Furthermore, in the add-on planter assembly, the drainage bowl can be used both in the add-on planter assembly and alternatively, after sprouting the sprouts and transferred to the unified planter element, in the unified planter element.

Therefore, a skilled person would understand that the fifth-type planter assembly, like the example of planter assembly 55 described above in relation to FIGS. 44-48, comprises in addition to the unified planter element, also an assembly that is mounted on the unified planter element in a disassemblable manner and enables, for instance, preliminary sprouting next to and parallel to the plants to be grown or that are already growing in the unified planter element. Reference is made to FIGS. 49-57. The figures illustrate an example of side planter assembly 60 (as defined above in relation to FIGS. 1 and 2). As already noted, a plurality of side planter assemblies may be mounted on the outside and inside of the support elements in a modular multi-tiered planter kit according to the invention, together with various combinations of the various planter assemblies listed above and next to merely unified planter elements.

FIG. 49 is a perspective view of one example of a side planter assembly 60, which is fitted for connection in a disassemblable manner in modular multi-tiered planter kit according to the invention. FIG. 50 is a perspective view from another angle of example side planter assembly 60. FIG. 51 is a view of a-a cross-section marked in FIG. 49. FIG. 52 is an "exploded" perspective view of elements of example side planter assembly 60. FIG. 53 is a perspective view of roots accessible basket element 4902 that is mounted in side planter 60. FIG. 54 is a perspective view of another angle of roots accessible basket element 4902. FIG. 55 is a perspective view of one access door mounted in roots accessible basket element 4902. FIG. 56 is a perspective view of a second access door mounted in roots accessible basket element 4902. FIG. 57 is a perspective view of a connection of example side planter assembly 60 in a disassemblable mounting, with the outer side of support element 15 in a modular multi-tiered planter kit according to the invention, wherein roots accessible basket assembly 4902 is retrievable from side planter assembly 60.

Side planter assembly 60 comprises side planter element 4906, which is formed as a cavity with bottom 4908 at its bottom part and opening 4910 at its top. Side planter element 4906 is formed with positioning brackets 5002. Positioning brackets 5002 are fitted for integration in a disassemblable mounting with means array 925 for disassemblable mounting of side planter assemblies, which is formed at the side of support element 15, which once the kit is mounted, faces outward or inward (see FIGS. 9, 10 and 57). According to the illustrated example, positioning brackets 5002 are formed as an array of tabs 5004, which are formed on outer circumferential rim 4912 that encircle opening 4910 of side planter element 4906. Side planter element 4906 is also formed with closable opening 5102, which is formed at bottom 4908. Opening 5102 is delimited by rim 5104 that protrudes from the outer side of the bottom.

Tracks 5202 and 5204 are formed next to opening 5102. The tracks are fitted for mounting on drainage bowl 4914 in a manner that once mounted; drainage bowl 4914 is aligned with opening 5102, which is formed at the bottom of the side planter element for possible collection of runoff water from inside the side planter element into the bowl. Similar to drainage bowl 1502 described above in relation to first-type planter assembly 35 and drainage bowl 4410 described above in relation to fifth-type planter assembly 55, drainage bowl element 4914 is also characterized in that it is formed with protrusions adapted for mounting on tracks, which in the context of the side planter are formed at the bottom outer side of the side planter element, in a manner that enables moving the drainage bowl in a linear movement to its place, so that the opening of the drainage bowl is aligned with the opening that is formed at the bottom of the side planter for possible collection of runoff water from inside the side planter element into the bowl, or for retrieving it from there and emptying it. Drainage bowl 4914 may be made, entirely or partly, of a transparent polymer material to enable visually checking the level of runoff water collected inside (thus providing an indication of the moisture status of the growth substrate).

Any skilled person will understand that in a configuration as described above, as an assembly that only comprises a side planter element—and at the most comes with a drainage bowl mounted at its bottom—the side planter assembly can already be mounted on a support element in the system. In other words, a modular multi-tiered planter kit according to the invention may be mounted with one or more strap-down side planter assembly (similar to the mounting of the kit with merely unified planter elements next to or instead of the various types of planter assemblies indicated above).

However, according to the example illustrated in the figures, side planter assembly 60 also comprises roots accessible basket assembly 4904. Roots accessible basket assembly 4904 is fitted for mounting inside the cavity of side planter element 4906. Basket assembly 4904 comprises basket element 4902, which is formed with openings array 5106. According to the illustrated example, the basket element is also formed with openings 5302 and 5304 to make it easy to manually retrieve it from inside side planter element 4906 ((by pushing the opening with one's finger).

According to the illustrated example, the basket assembly is comprised of two access doors 5206 and 5208, which are positioned opposite each other on both sides of basket element 4902. Access doors 5206 and 5208 are each fitted for disassemblable mounting in two matching openings, which are formed in openings array 5106 (according to the illustrated example, the opening array comprises additional openings—in addition to the opening in which the two access doors are mounted).

According to the illustrated example, the disassemblable mounting of the access doors is achieved, in each of the access doors, by a pair of tab means (5202 in door 5206 and 5602 in door 5208), which together with a pair of axial supports (5504 in door 5206 and 5604 in door 5208), are fitted to be connected with basket element 4902 in a disassemblable fashion as said.

Any skilled person will understand that this is only an example, and a basket assembly according to the invention may comprise only one access door or another and different number of such doors, which can be disassembled by similar or different mechanisms.

When retrieving the basket assembly from inside the cavity of the side planter element, when the basket contains a sapling inside, the access doors can be disassembled and removed, whereby the dimensions of the opening that are consequently exposed allow for manually accessing the plant roots.

Therefore, any skilled person will understand that a modular multi-tiered planter kit according to the invention may also comprise a plurality of side planter assemblies, such as assembly 60 described above in relation to FIGS. 49-57, which are fitted for mounting on the support elements of the system, and also provide for a multi-tiered configuration, and wherein they are positioned on the outer and inner sides of the support elements. A skilled person will also appreciate that the side planter assemblies may be of a type that also enables retrieving from time to time an inner basket from inside, in a manner that provides manual access to the roots growing inside (e.g. for harvesting bulbous plants).

Reference is made to FIGS. 58-62. The figures illustrate spacing means, which when mounted in a modular multi-tiered planter kit according to the invention, provide for the implementation of coverage means 65 on top of them (see FIGS. 1 and 2) for removable coverage of the mounted kit, in a manner that provide a kit according to the invention, with a quasi-greenhouse capacity and protects the plants growing inside it from the ravages of the weather.

FIG. 58 is a perspective view of an example of spacer 5802 in a disassemblable mounting of it on example unified planter element 30, which enables as said, positioning the coverage means (not illustrated) in a distance (gap) from a modular multi-tiered planter kit according to the invention. FIG. 59 is a perspective view of the connection of spacer means 5802 in a disassemblable mounting fashion, on side planter assembly 60, which as stated, enables positioning the coverage means) in a distance (gap) from modular multi-tiered planter kit according to the invention. FIG. 60 is a perspective view of spacer means 5802. FIG. 61 is a view of a-a cross-section marked in FIG. 58. FIG. 62 is a perspective view of a second example of spacer means 6202 that is fitted for mounting by staking as a peg into a growth substrate contained in a unified planter element or in a side planter assembly, thereby enabling positioning a coverage means in the gap from a modular multi-tiered planter kit according to the invention.

In order to allow the installation of a coverage means (such as a thermal sheet) for removable coverage of the mounted kit, the kit may comprise, as stated, an array of spacer means (e.g. 5802 or 6202), which are mountable in a disassemblable fashion, on the various types of planter assemblies or on a unified planter, so that once the coverage means is spread and covers the mounted kit, the coverage means is positioned for contact with the spacer means and therefore spaced from the mounted kit. The spacer means, which, as stated, plurality of which are used in an array, is a unified spacer element that is fitted for disassemblable mounting, as stated, both on a unified planter element and on a side planter assembly, in a manner that it protrudes from them. Spacer 5802 is formed as elongated part 6001, which at one end is formed with means 6002 for disassemblable connection, as stated, with outer circumferential rim 1104, which delineates the opening of unified planter element 30 or with rim 4912 that encircling the top section of the opening of a planter element in side planter assembly 60. At the other end, unified spacer 5802 is formed with support means 6004, which enables laying the coverage sheet (not illustrated) on top. According to the illustrated example, the connection means 6002 with the outer circumferential rim of the planter element, comprises bent tab 6006 having edge 6008, which is formed perpendicular to the elongated part 6001 of the spacer means. Bent tab 6005 is fitted for embracing the outer circumferential rim of the planter element, which is slanted in its direction, so that once the spacer means is mounted, the edge of the surrounding tab is incorporated in the planter element, and connector 6010 that is formed with the second end of the bent tab is fitted for snap wise anchoring of the spacer means to the outer circumferential rim of the planter element. According to the illustrated example, support means 6004 is formed as a surface that is formed perpendicular to elongated part 6001 of the spacer means. Another example of a spacer means that may be mounted in a kit next to spacer means 5802 or separate from it, is spacer means 6202, which is formed as an elongated part, one end of which—6204 is fitted for mounting by staking it as a peg into a growth substrate contained in the cavity of unified planter element 30 or in the cavity of side planter assembly 60 (not illustrated), and at its other end —6206, the unified spacer means is formed with support means 6208, which according to the illustrated example, is formed as an arched surface, and enables laying the coverage sheet on top.

Thus, any skilled person will understand, that by implementing a spacer means, such as those described above in relation to FIGS. 58-62, a modular multi-tiered planter kit according to the invention may also comprise a coverage means for removable coverage of the mounted kit, which may thereby provide the kit according to the invention, a quasi-greenhouse capacity and protects the plants growing inside it from the ravages of the weather.

Reference is made to FIGS. 63-64. The figures illustrate means 6302 for the physical delineation of plants sprouting from the planter assemblies or from a unified planter element in a modular multi-tiered planter kit according to the invention.

FIG. 63 depicts a perspective of an example of means 6302 for delimiting the boundaries of plants growing in a modular multi-tiered planter kit according to the invention, and enables also routing of an irrigation pipe to the growing plants. FIG. 64 is a perspective view of a delimitation means and the routing of the irrigation pipe illustrated in FIG. 63, before it is assembled.

Means 6302 for drawing the boundaries of different plants and routing the irrigation pipe to it is formed as elongated sheet 6304, which can be folded into shape in a configuration that delimits the plants growing inside (according to the illustrated example—folded to form a delimiting circle). Means 6302 also includes locking element 6306, which is fitted to lock the sheet in its delimiting configuration, as described above, in a manner that preserves its condition as such. Means 6302 also includes means 6308, which enables anchoring the means in the growth substrate in the planter around the plants delimited by it. Anchoring means 6308 is an array of pegs (six in the illustrated example), which are formed as a unified and integral part together with the elongated sheet, wherein they protrude on the one side and are fitted for staking into the growth substrate (not illustrated). According to the illustrated example, locking element 6306 is a ring-like element that is also formed as a unified and integral part together with the elongated sheet, wherein it protrudes from it and is detachable from it. Once detached, locking means 6306 allows for integrating two protrusions that protrude from the edges of the elongated sheet inside, and in this way preserve the delimiting configuration of the sheet when folded. According to the illustrated example, the two protrusions that may be encased by locking means 6306 are two of the pegs that are formed wherein they protrude from the elongated sheet. However, any skilled person will understand that the delimitation means may be formed with encaseable protrusions on the other side of the sheet. In addition, according to the illustrated example, elongated sheet 6304 is formed with at least one opening 6310 (in the illustrated example there are multiple openings), which allows for routing the irrigation pipe through it to the delimited plants by using the delimitation means. Any skilled person will understand that multiple openings may be formed on the sheet, so as to allow for routing an irrigation lateral to a passage through the delimited area.

Therefore, any skilled person will understand that by implementing a delimitation means, such as the one described above in relation to FIGS. 63 and 64, as part of a modular multi-tiered planter kit according to the invention, the kit may also provide abilities for physically delimiting various plants sprouting from the various planter assemblies or unified planter elements in the kit as well as to precisely direct irrigation means to them.

Reference is made to FIG. 65. FIG. 65 is a perspective view of a modular multi-tiered planter set according to the invention, which also comprises irrigation system 70 for the planter assemblies mounted in it.

System 70 comprises as usual, water storage container 6502 (which in the illustrated example is unified planter element 30 that has been converted for use as a water container of the system), pumping means 6504 for pumping water from container 6502 and piping array 6506 (with appropriate branch? connectors) for routing the pumped water to the growth substrate contained in the planter assemblies (e.g. by drip emitters or sprinklers). The irrigation system is characterized in that, water container 6502 is formed in a design that is mountable in a disassemblable manner in the modular multi-tiered planter kit, similar to the way in which a planter assembly or a unified planter element is mounted in the kit. In other words, water container 6502 is designed with similar positioning brackets as those formed in unified planter element 30, and are fitted for integration in a disassemblable mounting manner with the first means array that is formed on the one side of support element 15 or 20, which once the kit is mounted, faces the second support element.

Thus, any skilled person will understand that by implementing unified positioning brackets—both in unified planter element 30, which in itself is used in the kit or as part of the various types of planter assemblies in the system, and in the water container in the irrigation system of the kit, this enables modularly mounting of the irrigation system while integrating it in the kit.

We mentioned above in reference to accompanying figures a number of planter assemblies that allow for mounting a water bottle inside them (see above regarding second-type, third-type and fourth-type planter assemblies), and we mentioned the possibility that the water bottle will be a special purpose water bottle that has a mechanism for turning the bottle completely upside down, as needed to mount it, without water leaking from it, and it opens by itself to the passage of water from it, once it is properly mounted inside the planter assembly. Reference is made to FIGS. 66-69. FIG. 66 is a perspective view of such special purpose water bottle, 6602, which has a mechanism that allows for turning the bottle completely upside down, as needed to mount it, without water leaking from it, and it is self-opening to the passage of water from it, once mounted. FIG. 66a is a cross section view of water bottle 6602. FIG. 67 is an "exploded" perspective view depicting the elements of bottle 6602. FIG. 68 is a (partial) cross-section view that depicts placing bottle 6602 before mounting, for example, in a second-type planter assembly (such as assembly 40 illustrated in FIGS. 21-27), without water leaking from it. FIG. 69 is a (partial) cross-section view that depicts the mounting of bottle 6602 in a second-type planter assembly (as stated, assembly 40 illustrated in FIGS. 21-27), in a manner that causes it to be open by itself and enable the passage of water from it, when properly mounted inside the planter assembly.

Bottle 6602 comprises refillable bottle assembly 6604 and movable assembly 6606, which is adapted for linear movement (see in the direction of the arrows 6608) in and out of the bottle assembly for opening and closing as needed. Bottle assembly 6604 is comprised of cap 6702 and container 6704. Cap 6702 is fitted for mounting on one end of container 6704 (e.g. by a screw connection (not illustrated), soldering, or gluing). At the other end, container 6704 is formed with circumferential bracket 6610, hollow stem 6612, and wall 6614, which is formed inside the cavity of stem 6612 and comprises opening 6616 at its center, which is fitted for routing movable assembly 6606 through it, and a plurality of openings 6618, which are formed around opening 6616 and allow for the passage of water through them. Movable assembly 6606 is comprised of piston element 6706, piston head element 6708 and sealing assembly 6710. Once the movable assembly is installed, the piston element is fitted for linear movement through opening 6616.

According to the illustrated example, piston element 6706 is formed with a typical cross-shaped cross section and so is opening 6616, thereby allowing for routing and guiding the movable assembly for linear movement through it. The piston head element that is configured for mounting at one end of the piston element (by an array of snap connectors 6712, which are formed at one end of the piston element and are fitted to be passed through opening 6714 formed on the piston head element before locking on the other side, so as to fasten the piston head element to the piston element). One should also notice that in the illustrated example, the piston head element is shaped in a rather fingers graspable shape in order to facilitate potential manual moving of the movable assembly 6606. Sealing assembly 6710 comprise of sealing element 6716 and disk 6718. Sealing assembly 6710 is fitted for mounting at the other end of the piston element (by an array of snap connectors 6720, which are formed at the other end of the piston element and are fitted to tightly mount sealing element 6716 and disk 6718 between them and wall 6722 that protrude from the piston element (see FIG. 66a)).

Bottle 6602 is filled with water whether by opening cap 6702 or through openings 6618. After the bottle is filled with water, the mode of operation of the bottle is depicted as stated in FIGS. 68 and 69. According to the illustrated sample (see FIG. 68), the bottle filled with water is conveyed into mounting in bracket 2402, which is formed in cover element 2101 (see above in relation to second-type planter assembly 40 illustrated in FIGS. 21-27). In this state, water cannot leak from the bottle, as sealing assembly 6710 is in sealing contact with circumferential bracket 6610 and prevents the passage of water into hollow stem 6612. Once the full bottle is pushed into bracket 2402 (see FIG. 69), piston head element 6708 comes into contact with multiple-opening bottom 2406 (see above for second-type planter assembly 40 illustrated in FIGS. 21-27). In this state, when the bottle continues to be pushed into bracket 2402, movable assembly 6606 is forced to shift upward in a linear movement (in the direction of arrow 6902), thereby disconnecting sealing assembly 6710 from contact with circumferential bracket 6610 and allows for the passage of water into hollow stem 6612, and from there to flow through openings 6618 towards the multiple-openings bottom 2406 (see arrows 6904), and from there to inside planter 30.

Therefore, bottle 6602 enables mounting it without water dripping from it and to open by itself to the passage of water from inside it, only once properly mounted to inside the planter assembly.

Any skilled person will understand that the elements of bottle 6602 may be manufactured by injection of polymeric materials, that the sealing element 6716 may also comprise an elastomeric element for securing the sealing, and that the elements may be mounted to each other also by other and different means than those described above and depicted in the attached figures, for example purposes only.

A skilled person will also understand that a bottle such as bottle 6602 may also be used in other planters and potted plants that are different from the various types of planter assemblies described above with reference to the accompanying figures. Planters and potted plants that are formed with a suitable bracket for fitting the special purpose bottle inside them, so as to enable its opening by itself for the passage of water from inside, but only once properly mounted into the planter or potted plant.

Reference is made to FIGS. 69*a*-69*c*. FIG. 69*a* is a perspective view of an additional version of a special purpose water bottle 6902 (similar to bottle 6602 described above with reference to FIGS. 66-69), that may be mounted, for example, in a modular multi-tiered planter kit according to the invention. FIG. 69*b* is a cross section view of the water bottle 6902 and FIG. 69*c* is an "exploded" perspective view of elements of the example bottle 6902.

Similar to bottle 6602, bottle 6902 too has a mechanism that allows for turning the bottle completely upside down, as needed to mount it, without water leaking from it, and it is self-opening to the passage of water from it, once mounted.

Characterized feature of bottle 6902 is that it enable monitoring of the water level within the bottle, by eye inspection from the outside. In the illustrated example, both the bottle's cap 6903 and container 6904 are manufactured from the outset from a transparent polymeric material (marked in the figures with few diagonally slashed shade lines on the areas representing the transparent surfaces), and a floatable indicator (ball 6906 in the illustrated example) is positioned within the bottle assembly, therefore enabling as said, eye monitoring of the water level within the bottle.

Any skilled person will understand that similar feature can be implemented for achieving same eye monitoring capabilities (e.g.—producing the bottle container with an elongated transparent window along its length, positioning of a floatable indicator which is not in a shape of a ball).

Additional features depicted in bottle 6902 (eventually implementable in a non-transparent bottles too), are the mounting of cap 6903 to container 6904 by a threaded (screw) connection (and therefore enabling periodical cleaning of the container and refiling it with water), and the forming of the other end of container 6904, with a circumferential array of connecting means 6908 (in the illustrated example—snap-fit type of connecting means), that provide further stability to the bottle upon properly mounted to the planter assembly.

Therefore, bottle 6902 in addition to enabling its mounting without water dripping from it and open by itself to the passage of water from inside it, only once properly mounted to inside the planter assembly (as described above in reference to bottle 6602 while referring to FIGS. 66-69), provide additional advantages—the ability to eye monitoring the water level within the bottle (provided by the transparent container (or at least part of it) and the floatable indicator), re-filling of the bottle while mounted in the planter (through the openable cup), and better stability upon mounting (provided by the circumferential array of connecting means).

A skilled person will also understand that a bottle such as bottle 6902 may also be used in other planters and potted plants that are different from the various types of planter assemblies described above with reference to the accompanying figures. Planters and potted plants that are formed with a suitable bracket for fitting the special purpose bottle inside them, so as to enable its opening by itself for the passage of water from inside, but only once properly mounted into the planter or potted plant.

Furthermore, unified planter element 30, which is used in all the different types of planter assemblies, from the first type to the fifth type (inclusive), as indicated above with reference to the accompanying figures, may be designed differently from the design that serves, as stated, as a "building block" in all the aforesaid planter assemblies. A different design that does not detract from the planter's ability to similarly connect in a disassemblable mounting fashion, with two support elements 15 and 20, in a modular multi-tiered mounting according to the invention, and this is parallel to unified planter element 30 (one or more), parallel to the said planter assemblies of types one to five (inclusive), or separately and independently. Reference is made to FIGS. 70-72. FIG. 70 is a perspective view of one example of sixth-type planter assembly 7010, wherein planter element 7030 that is used therein, as aforesaid, is formed differently than planter element 30 that is described above as a "building block" of each of the planter assemblies from the first-type to the fifth-type (inclusive), which we pointed out above with reference to the accompanying figures, but element 7030 too is also fitted for connection in a disassemblable mounting fashion in a modular multi-tiered planter kit according to the invention. FIG. 71 is an exploded perspective view of planter assembly elements 7010. FIG. 72 is a view of a-a cross-section marked in FIG. 70.

Planter assembly 7010, comprises planter element 7030, which similar to unified planter element 30, is formed with the same positioning brackets and teeth-like means that are fitted for integration in a disassemblable mounting fashion, with first means array that is formed on one side of support element 15 or 20 (not illustrated, see above in relation to FIGS. 11 and 14), so as to enable its disassemblable connection with the two support elements. Unlike unified planter element 30, planter element 7030 has depression 7032 along its length. Cover element 7034 is mounted in a disassemblable fashion on planter element 7030. Cover element 7034 is formed with bracket 7036, which once the cover element is mounted on the planter, it is positioned on one side of the planter element and enables mounting water bottle 7038 inside it. The water bottle may be a commonplace water bottle or a special purpose water bottle (e.g. bottle 6602 described above in relation to FIGS. 66-69). Cover element 7034 is formed in addition with multiple-brackets array 7040 that allows for mounting potted plants inside. Similar to the fourth-type planter assembly (as described above with reference to FIGS. 35-43), planter assembly 7010 comprises internal water container 7040, which is fitted for mounting inside planter element 7030, electric pump 7042 that is fitted for mounting at one end of the planter element and is connected to the pumping of water pouring from the bottle into the planter element and flowing through pipe 7044, which extends from one end of the planter element along the planter element to the other end of the planter element, and into internal water container element 7046.

Any skilled person will understand that this is only an example, and a modular multi-tiered planter kit according to the invention may be mounted with other and additional planter assemblies and planter elements, provided that the planter element that serves as a "building block" (as an element in a unified assembly) or as a stand-alone planter will have positioning brackets and teeth-like means in its structure (see above in relation to FIGS. 11-14), which are fitted for integration in a disassemblable mounting fashion with first means array that is formed on one side of the support element in the kit, so as to enable its disassemblable connection with the two support elements. In other words, the invention is not limited to a specific design of a unified planter, but also covers planters with other and different designs, provided that the connection means implemented in them are unified and compatible for disassemblable connection with the support elements of the kit.

Any skilled person will also understand that kits according to the invention may be made in a variety of colors and color schemes. Kits according to the invention may be fitted with wheels at the bottom, so that after assembly and during their years of service, they can be easily moved from place to place. The relative dimensions of the unified planter elements, side planters and potted plant brackets that are used in the kit according to the invention may be different from those illustrated as an example only in the accompanying figures.

Therefore, in light of the description given above with reference to the accompanying figures, any skilled person will appreciate the fact that a modular multi-tiered planter kit according to the invention appropriately meets the demand described above in the background to the invention chapter for DIY kits that will enable growing decorative plants, spices and vegetables by oneself. At the same time and from the point of view of planners, manufacturers and distributors of potted plants, planters and home greenhouses, a modular multi-tiered planter kit according to the invention embodies a design scalable for mass production, with a minimum of components, relatively inexpensive, and utilizes existing and proven technologies (e.g. mass production of plastic injection molding components). The design of a modular multi-tiered planter kit according to the invention also enables packaging, shipping, storage and marketing a compact kit (as a dismounted kit) and its simple and quick assembly on-site by the end customer on the balcony of his apartment in a residential high-rise or in the yard of a single-story home (and does not require technicians or other professionals).

The patent Applicant provided the above description in referring to the accompanying figures for illustrative purposes only. The description above should not be limited to the illustrated figures. On the contrary, the description provided should be seen as also covering a wide range of alternatives, adjustments and equivalents, all without deviating from the embodiments defined in the following set of claims.

The invention claimed is:

1. A modular multi-tiered planter kit, comprising:
   two support elements configured to support the planter kit on a surface, wherein the two support elements are perpendicular to the surface and a first support element of the two support elements is spaced apart from a second support element of the two support elements; and
   a plurality of planter assemblies configured to removably couple with the two support elements in a multi-tier configuration, wherein each of the plurality of planter assemblies extends between the two support elements in a horizontal direction and spans a first gap between the two support elements;
   wherein each of the plurality of planter assemblies comprises a unified planter element
   wherein the unified planter element comprises:
      an elongated cavity having a bottom surface adjacent a bottom of the unified planter element and an opening at a top of the unified planter element;
      a plurality of positioning brackets configured to removably couple with the two support elements; and
      an outer circumferential rim surrounding the opening, the outer circumferential rim having a slanted surface and springy teeth configured to removably couple with the two support elements.

2. The modular multi-tiered planter kit of claim 1, further comprising a third support element spaced apart from the second support element, wherein a second plurality of planter assemblies removably couples with and extends between the second support element and the third support element.

3. The modular multi-tiered planter kit of claim 1, wherein a number of tiers of planter assemblies is dependent on a height of the two support elements.

4. The modular multi-tiered planter kit of claim 1, further comprising a first set of additional components comprising a multiple-opening base spacer element and a drainage bowl element, the unified planter element further comprising a closable opening extending through the bottom surface, wherein the drainage bowl element of the first set of additional components is configured to align with the closable opening and collect water when water exits the unified planter element through the closable opening, the unified planter element further comprising a track configured to couple with the drainage bowl element.

5. The modular multi-tiered planter kit of claim 1, further comprising a first set of additional components comprising a multiple-opening base spacer element and a drainage bowl element, the multiple-opening base spacer element of the first set of additional components configured to removably couple with a bottom surface of the unified planter element and having a plurality of protrusions and a plurality of spacer openings, wherein the multiple-opening base spacer element is configured to support a bag of growth substrate with a gap between a bottom surface of the unified planter element and the bag of growth substrate, the drainage bowl element having a plurality of protrusions configured to couple with a track on a bottom outer side of the unified planter element and align with an opening extending through the bottom surface of the unified planter element.

6. The modular multi-tiered planter kit of claim 1, further comprising a second set of additional components comprising a cover element having at least one water bottle bracket configured to hold a water bottle and at least one pot plant bracket configured to hold a pot plant, the cover element of the second set of additional components further having a surface, wherein the at least one water bottle bracket is an embedded cavity extending into the surface of the cover element and a bottom of the at least one water bottle bracket has a plurality of openings and a top of the at least one water bottle bracket is configured to receive the water bottle, wherein the at least one pot plant bracket is an embedded cavity extending into the surface of the cover element and a bottom of the at least one pot plant bracket has a plurality of openings and a top of the at least one pot plant bracket is configured to receive the pot plant.

7. The modular multi-tiered planter kit of claim 1, further comprising a third set of additional components comprising an elevated cover element having at least one water bottle bracket configured to hold a water bottle and at least one pot plant bracket configured to hold a pot plant, wherein, when the unified planter element is filled with water, an upper level of water is adjacent a bottom of the pot plant, the elevated cover element of the third set of additional components further having a surface, wherein the at least one water bottle bracket is an embedded cavity extending into the surface of the elevated cover element and a bottom of the at least one water bottle bracket has a plurality of openings and a top of the at least one water bottle bracket is configured to receive the water bottle, wherein the at least one pot plant bracket is an embedded cavity extending into the surface of the elevated cover element and a bottom of the at least one pot plant bracket has a plurality of openings and a top of the at least one pot plant bracket is configured to receive the pot plant, the elevated cover element configured to couple with the unified planter element, wherein the surface of the elevated cover element sits above the unified planter element.

8. The modular multi-tiered planter kit of claim 1, further comprising a fourth set of additional components comprising a cover element having at least one water bottle bracket configured to hold a water bottle and at least one pot plant bracket configured to hold a pot plant and an internal water container element configured to mount inside the unified planter element with a second gap between the internal water container element and the unified planter element, wherein a pump assembly within the unified planter element next to the internal water container is configured to pump water from the second gap into the internal water container, the cover element of the fourth set of additional components further having a wire opening, wherein wiring for the pump assembly extends through the wire opening, the pump assembly comprising a pipe extending alongside the internal water container and configured to route water from the pump to the internal water container, and the internal water container comprising an elongated cavity with a bottom surface adjacent a bottom of the internal water container and an opening at a top of the internal water container, the internal water container further comprising a first depression configured to route water from the water bottle bracket to the second gap and a second depression configured to hold the pipe.

9. The modular multi-tiered planter kit of claim 1, further comprising a fifth set of additional components comprising an add-on planter assembly configured to mount on and extend parallel to the unified planter element, the add-on planter of the fifth set of additional components comprising an elongated cavity with a bottom surface adjacent a bottom of an internal water container and an opening at a top of the internal water container, an outer circumferential rim surrounding the opening, the outer circumferential rim having a slanted surface and springy teeth configured to removably couple with the unified planter element, a closable opening extending through the bottom surface and having a protruding rim surrounding the closable opening on a bottom side of the bottom surface of the elongated cavity, and a track adjacent the closable opening configured to couple with a drainage bowl and align the drainage bowl with the closable opening, wherein the drainage bowl has protrusions configured to couple with the track.

10. The modular multi-tiered planter kit of claim 9, wherein the length, width, and depth of the add-on planter element are each smaller than the corresponding dimensions of the unified planter element.

11. The modular multi-tiered planter kit of claim 1, further comprising a plurality of side planter assemblies configured to mount on either side of the two support elements in a multi-tier configuration, wherein each of the plurality of side planter assemblies comprises:
a side planter element having a cavity with a bottom surface adjacent a bottom of the side planter element and an opening at a top of the side planter element
a plurality of positioning brackets configured to removably couple with the two support elements;
a closable opening extending through the bottom surface and having a protruding rim surrounding the closable opening on a bottom side of the bottom surface of the cavity; and
a track adjacent the closable opening and configured to couple with a drainage bowl and align the drainage bowl with the closable opening, wherein the drainage bowl has protrusions configured to couple with the track.

12. The modular multi-tiered planter kit of claim 11, each of the plurality of side planter assemblies further comprising a roots accessible basket assembly configured to mount inside the cavity of the side planter assembly, the basket assembly comprising a basket element with an opening and at least one access door configured to mount inside of the opening, wherein the access door can be opened to provide access to the roots of a plant through the opening.

13. The modular multi-tiered planter kit of claim 1, further comprising an irrigation system having a water collection container, a pump configured to pump water from the water collection container, and a plurality of pipes configured to route the pumped water to growth substrates contained in the plurality of planter assemblies, wherein the water collection container is configured to removably couple with the two support elements, extending between the two support elements in a horizontal direction and spanning the first gap between the two support elements.

14. The modular multi-tiered planter kit of claim 1, further comprising a second set of additional components comprising a cover element having at least one water bottle bracket configured to hold a water bottle, wherein the water bottle comprises a mechanism configured to restrict the flow of water from the water bottle when the water bottle is turned upside down until the water bottle is mounted in the water bottle bracket.

15. The modular multi-tiered planter kit of claim 14, wherein the water bottle mechanism is a linear valve configured to open the water bottle when the water bottle contacts the water bottle bracket and close the water bottle when the water bottle loses contact with the water bottle bracket.

16. A modular multi-tiered planter kit, comprising:
two support elements configured to support the planter kit on a surface, wherein the two support elements are perpendicular to the surface and a first support element of the two support elements is spaced apart from a second support element of the two support elements;
a plurality of planter assemblies configured to removably couple with the two support elements in a multi-tier configuration, wherein each of the plurality of planter assemblies extends between the two support elements in a horizontal direction and spans a first gap between the two support elements, wherein each of the plurality of planter assemblies comprises a unified planter element;

a coverage element configured to cover the modular multi-tiered planter kit; and a spacer element configured to removably couple with the planter assemblies and separate the coverage element from the modular multi-tiered planter kit when the coverage element covers the modular multi-tiered planter kit.

17. The modular multi-tiered planter kit of claim 16, the spacer element having an elongated body, a first end, and a second end, wherein the first end is configured to removably couple with the unified planter element and the second end is configured to support the coverage element, wherein the first end has a bent tab with an edge perpendicular to the elongated body, the bent tab configured to couple with an outer circumferential rim of the unified planter element, the bent tab having a springy connector configured to snap anchor the spacer element to the unified planter element.

18. A modular multi-tiered planter kit, comprising:

two support elements configured to support the planter kit on a surface, wherein the two support elements are perpendicular to the surface and a first support element of the two support elements is spaced apart from a second support element of the two support elements;

a plurality of planter assemblies configured to removably couple with the two support elements in a multi-tier configuration, wherein each of the plurality of planter assemblies extends between the two support elements in a horizontal direction and spans a first gap between the two support elements, wherein each of the plurality of planter assemblies comprises a unified planter element; and a plant marker configured to delimit the location of sprouting plants, wherein the plant marker is an elongated sheet configured to be folded into a shape to delimit the sprouting plants, the plant marker having a locking element configured to lock the sheet in the delimiting configuration and an anchoring element configured to anchor the plant marker in a growth substrate contained in the plurality of planter assemblies.

19. The modular multi-tiered planter kit of claim 18, wherein the anchoring element is a plurality of pegs integral with the elongated sheet and located along a side of the elongated sheet, the plurality of pegs configured to stake into the growth substrate, and wherein the locking element is a ring-like element configured to encase two protrusions from the elongated sheet and preserve the delimiting configuration of the elongated sheet when folded.

* * * * *